Nov. 16, 1937.   A. G. F. KUROWSKI   2,099,565
TYPEWRITING AND CALCULATING MACHINE
Filed Aug. 31, 1933   21 Sheets-Sheet 1

Inventor
Alfred G. F. Kurowski.

Nov. 16, 1937.  A. G. F. KUROWSKI  2,099,565
TYPEWRITING AND CALCULATING MACHINE
Filed Aug. 31, 1933  21 Sheets-Sheet 7

Inventor
Alfred G. F. Kurowski.
By L. G. Julihn
Attorney

Nov. 16, 1937.  A. G. F. KUROWSKI  2,099,565
TYPEWRITING AND CALCULATING MACHINE
Filed Aug. 31, 1933  21 Sheets-Sheet 8
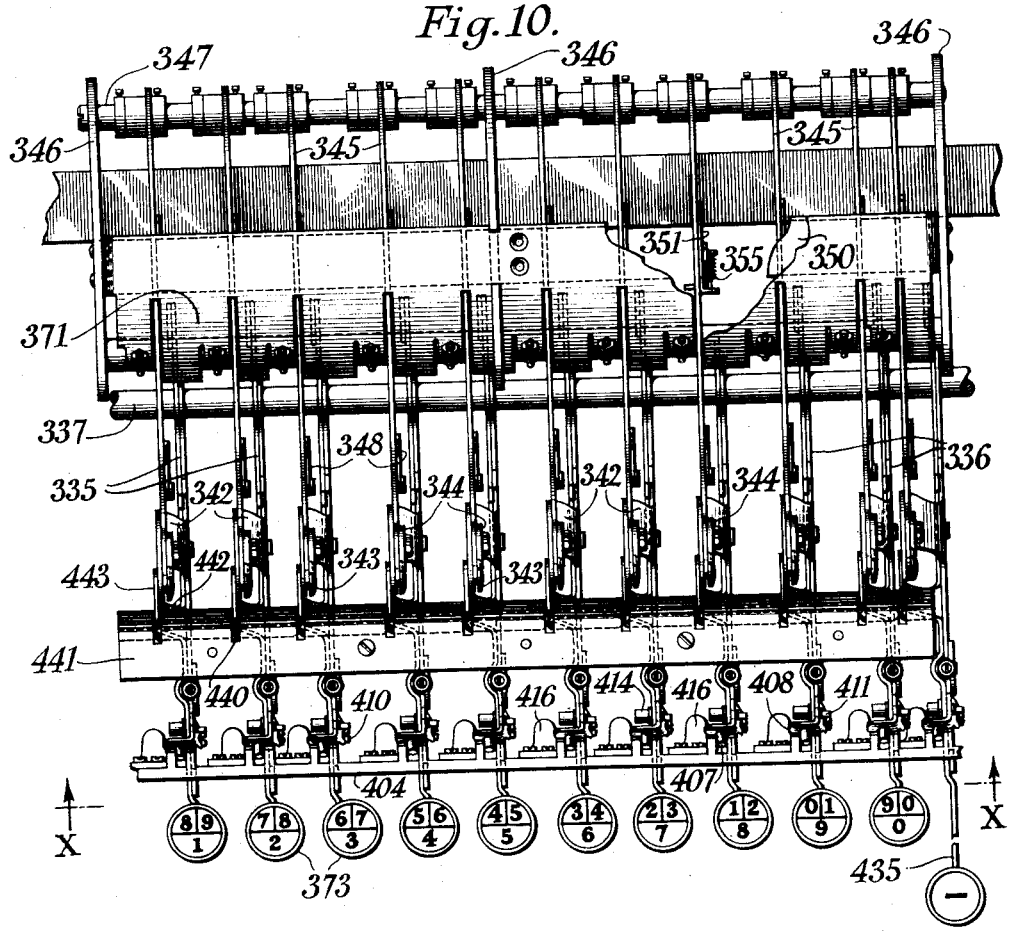
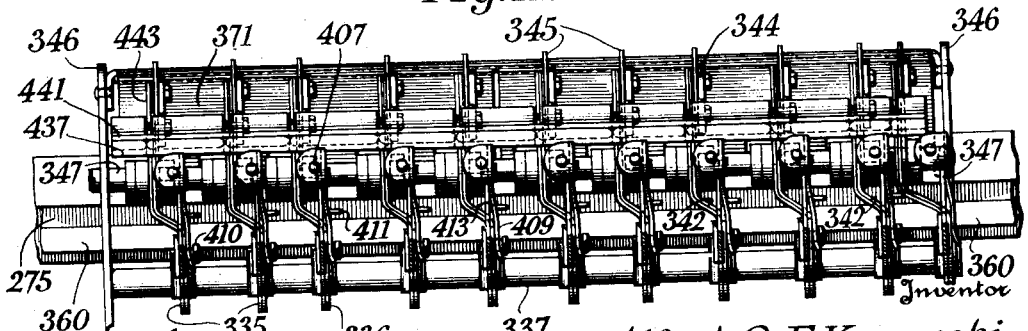
Inventor
Alfred G. F. Kurowski.
By L. G. Julihn
Attorney Inventor
Alfred G. F. Kurowski.
Attorney Nov. 16, 1937.  A. G. F. KUROWSKI  2,099,565
TYPEWRITING AND CALCULATING MACHINE
Filed Aug. 31, 1933   21 Sheets-Sheet 10
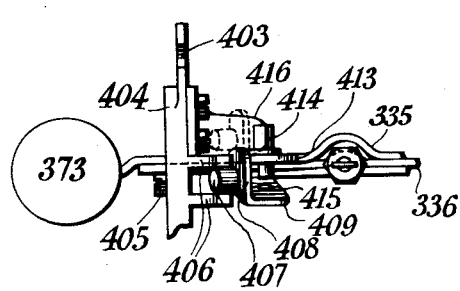
Fig. 14.
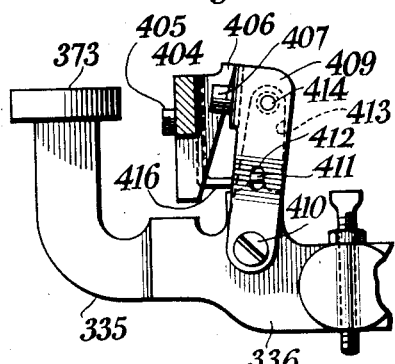
Fig. 15.
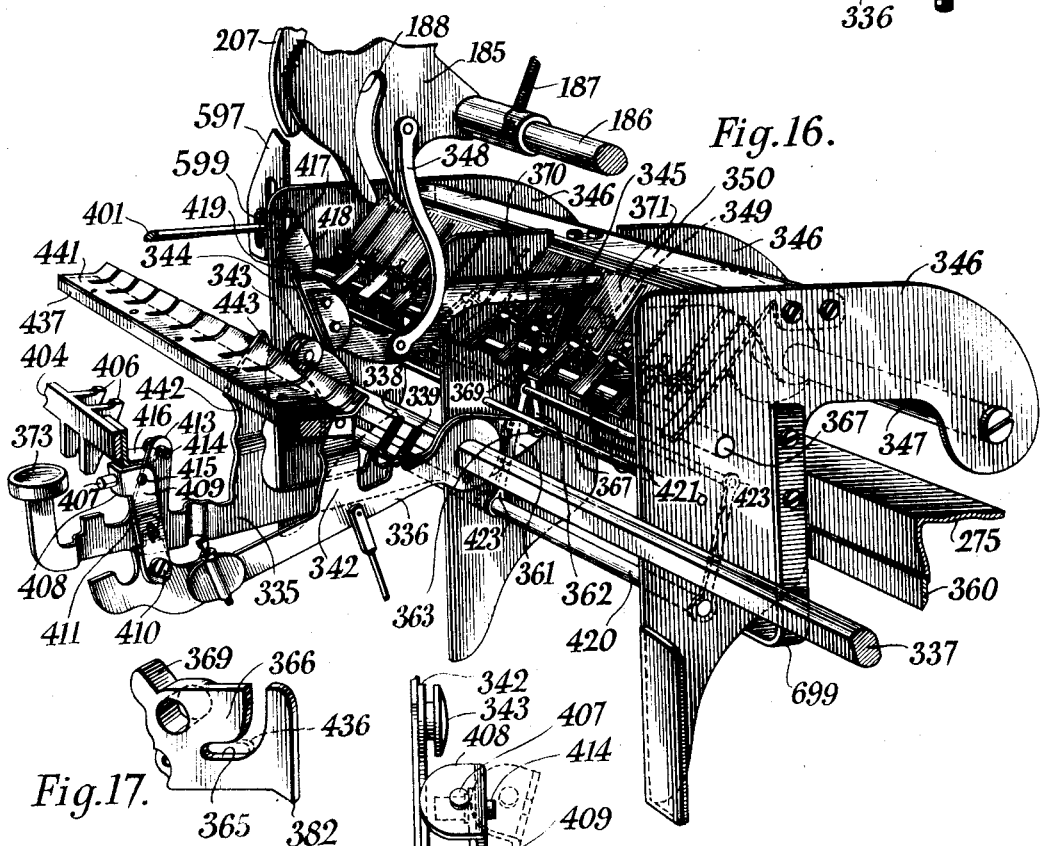
Fig. 16.
Fig. 17.
Fig. 18.
Inventor
Alfred G. F. Kurowski.
Attorney Nov. 16, 1937.  A. G. F. KUROWSKI  2,099,565
TYPEWRITING AND CALCULATING MACHINE
Filed Aug. 31, 1933  21 Sheets-Sheet 11
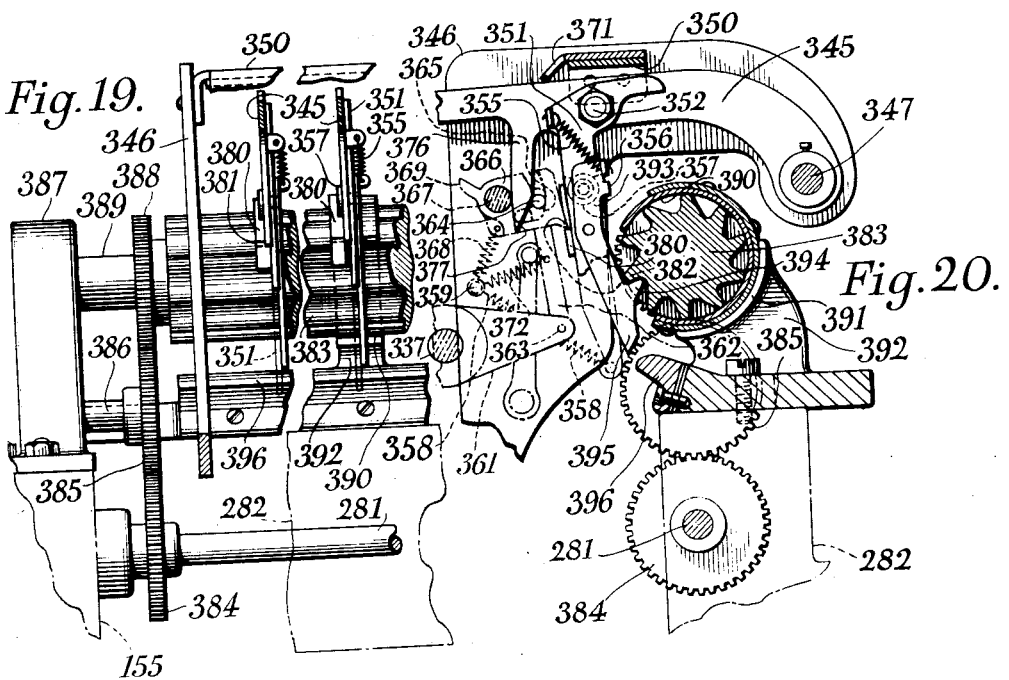
Fig. 19.
Fig. 20.
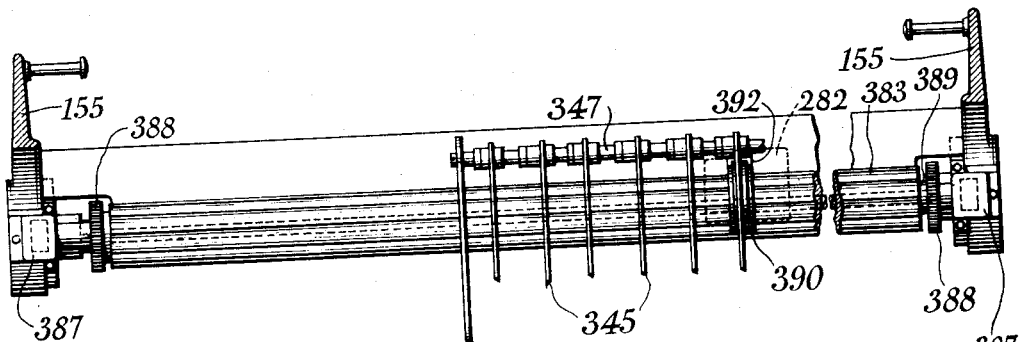
Fig. 21.
Inventor
Alfred G. F. Kurowski.
By L. G. Julihn
Attorney Nov. 16, 1937. A. G. F. KUROWSKI 2,099,565
TYPEWRITING AND CALCULATING MACHINE
Filed Aug. 31, 1933 21 Sheets-Sheet 12

Inventor
Alfred G. F. Kurowski.
By L. G. Julihn
Attorney

Nov. 16, 1937.   A. G. F. KUROWSKI   2,099,565
TYPEWRITING AND CALCULATING MACHINE
Filed Aug. 31, 1933   21 Sheets—Sheet 13

Inventor
Alfred G. F. Kurowski.
By L. G. Julihn
Attorney

Inventor
Alfred G. F. Kurowski.
By L. G. Julihn
Attorney

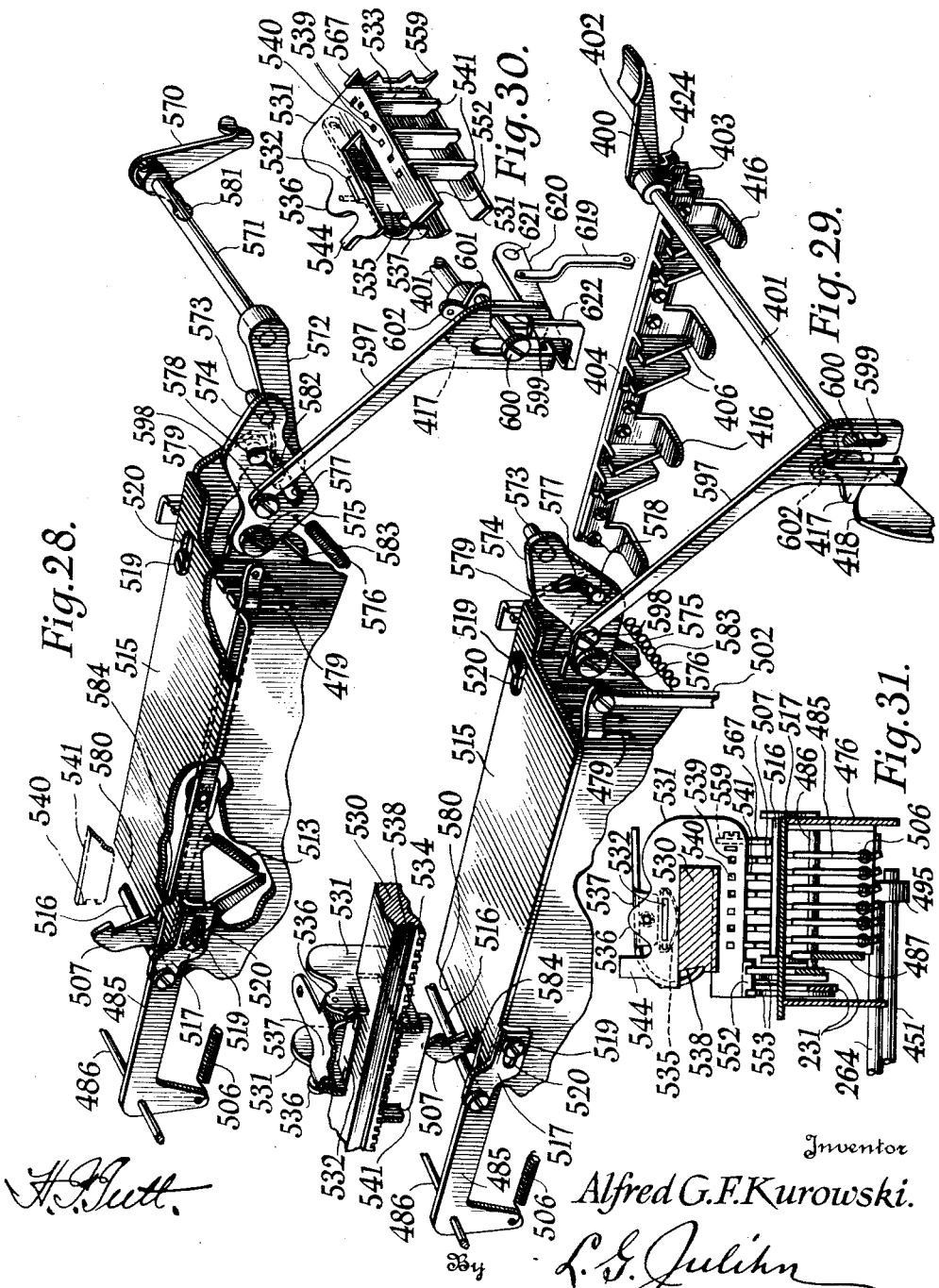

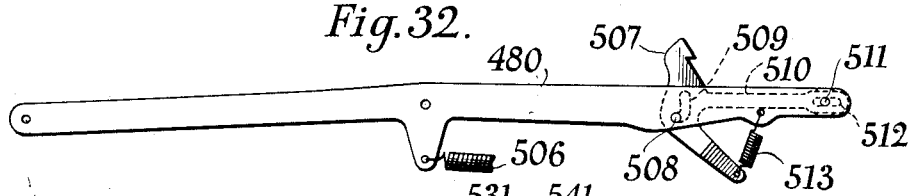
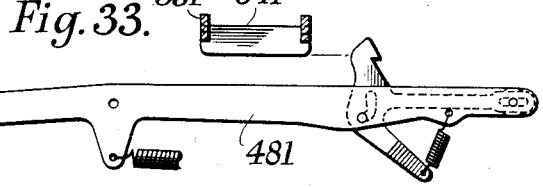
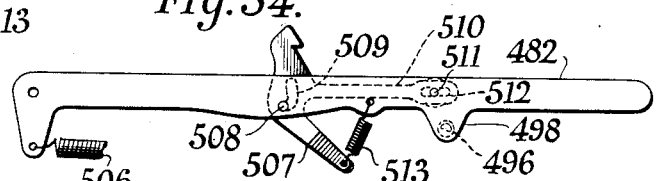
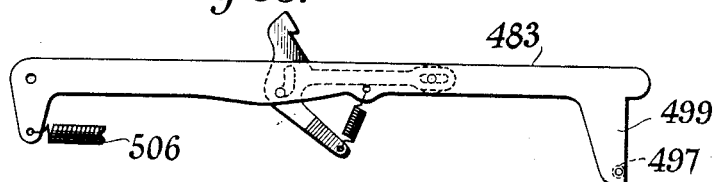
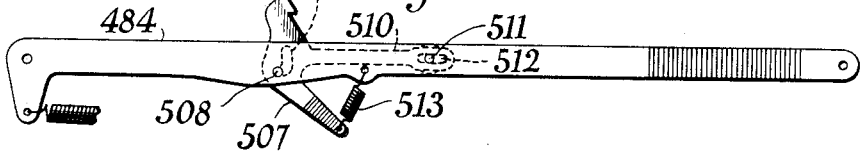
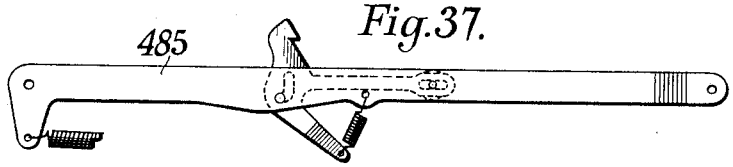

Nov. 16, 1937.  A. G. F. KUROWSKI  2,099,565
TYPEWRITING AND CALCULATING MACHINE
Filed Aug. 31, 1933   21 Sheets-Sheet 17
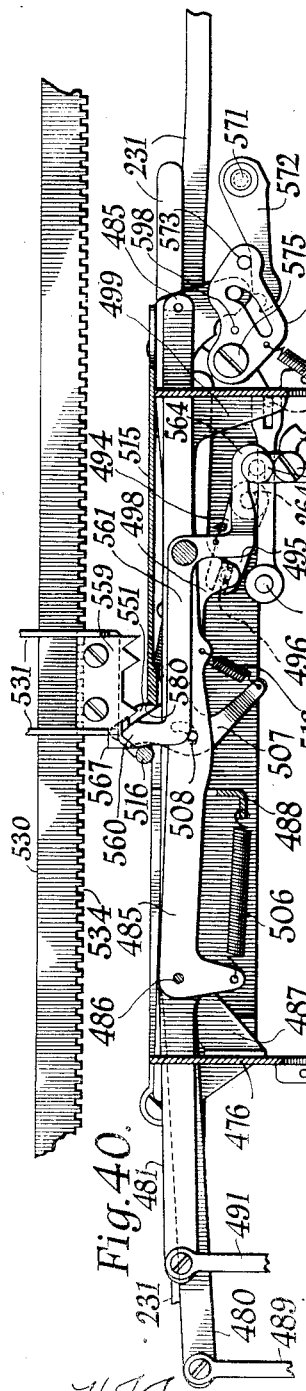
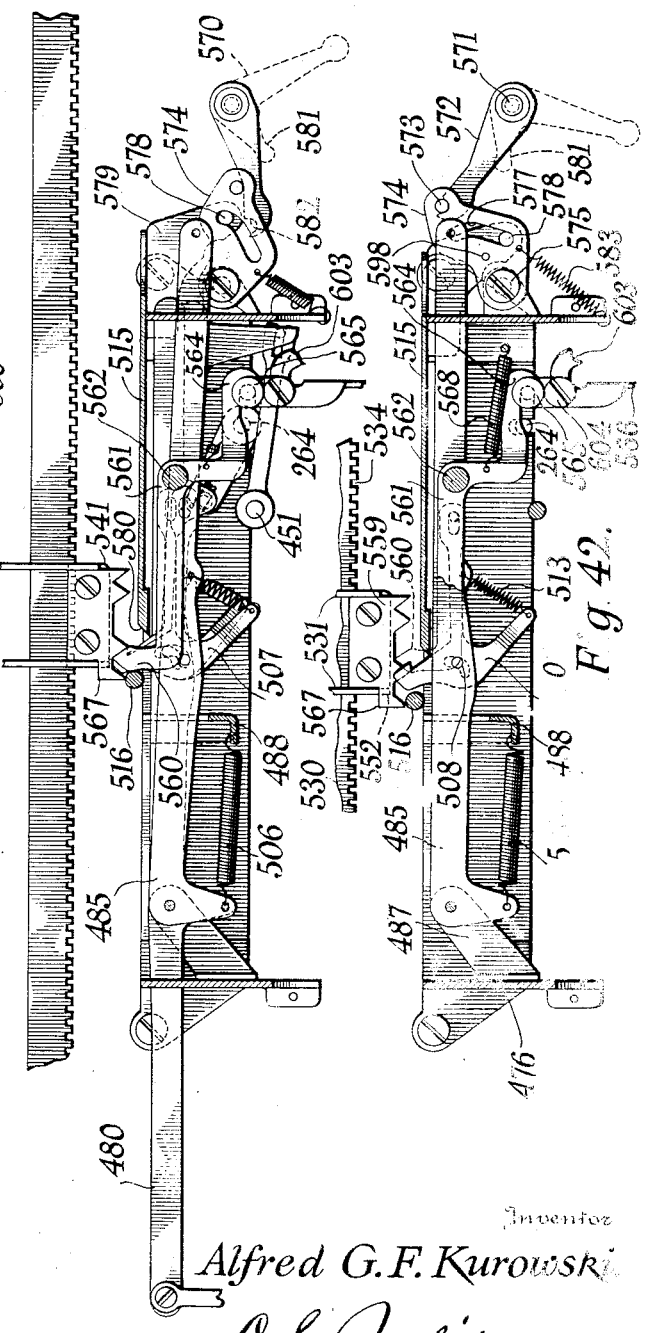
Inventor
Alfred G. F. Kurowski

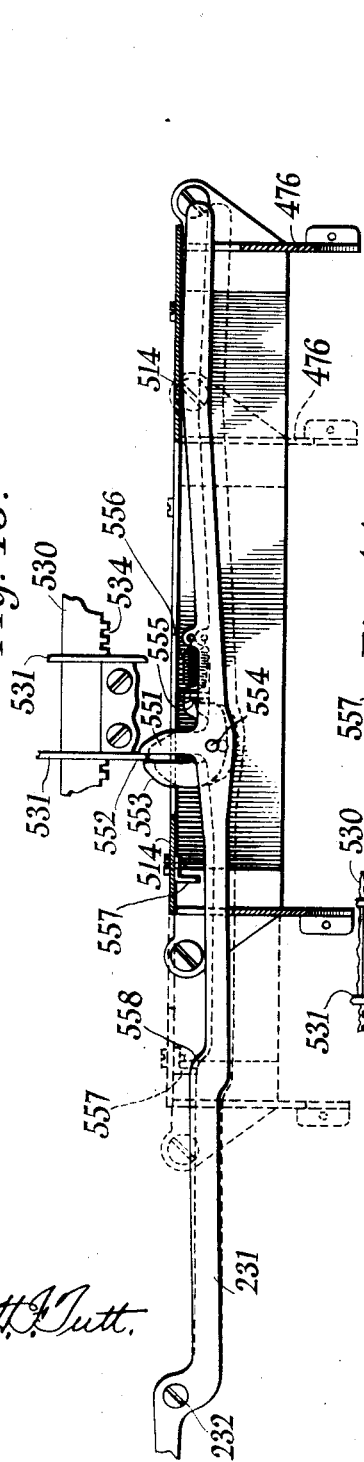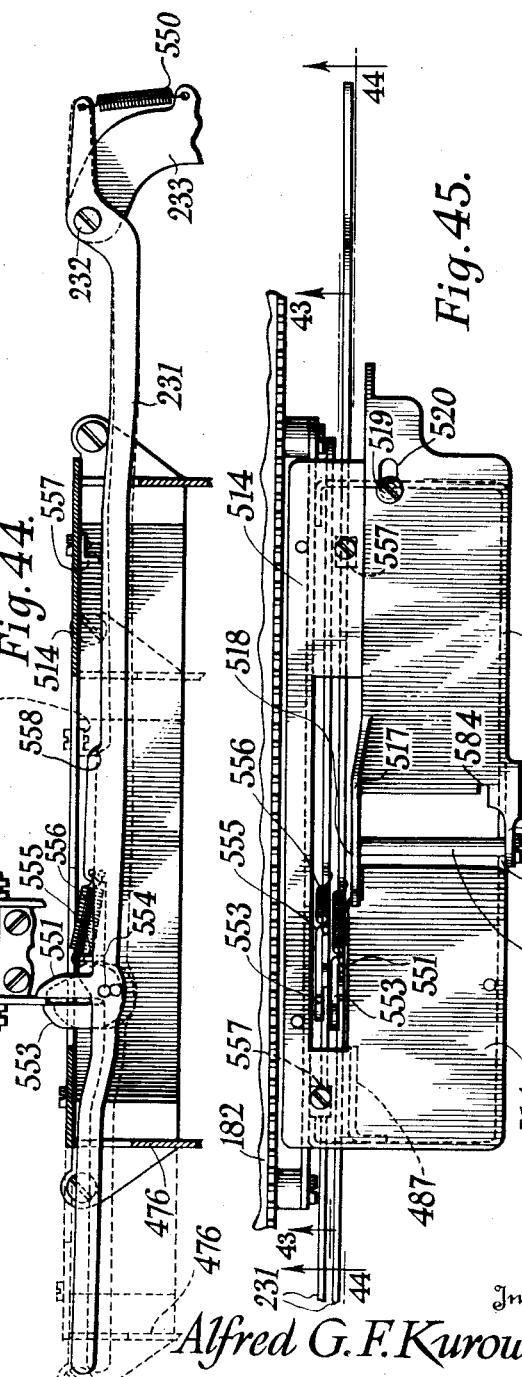

Nov. 16, 1937.　　A. G. F. KUROWSKI　　2,099,565
TYPEWRITING AND CALCULATING MACHINE
Filed Aug. 31, 1933　　21 Sheets—Sheet 19
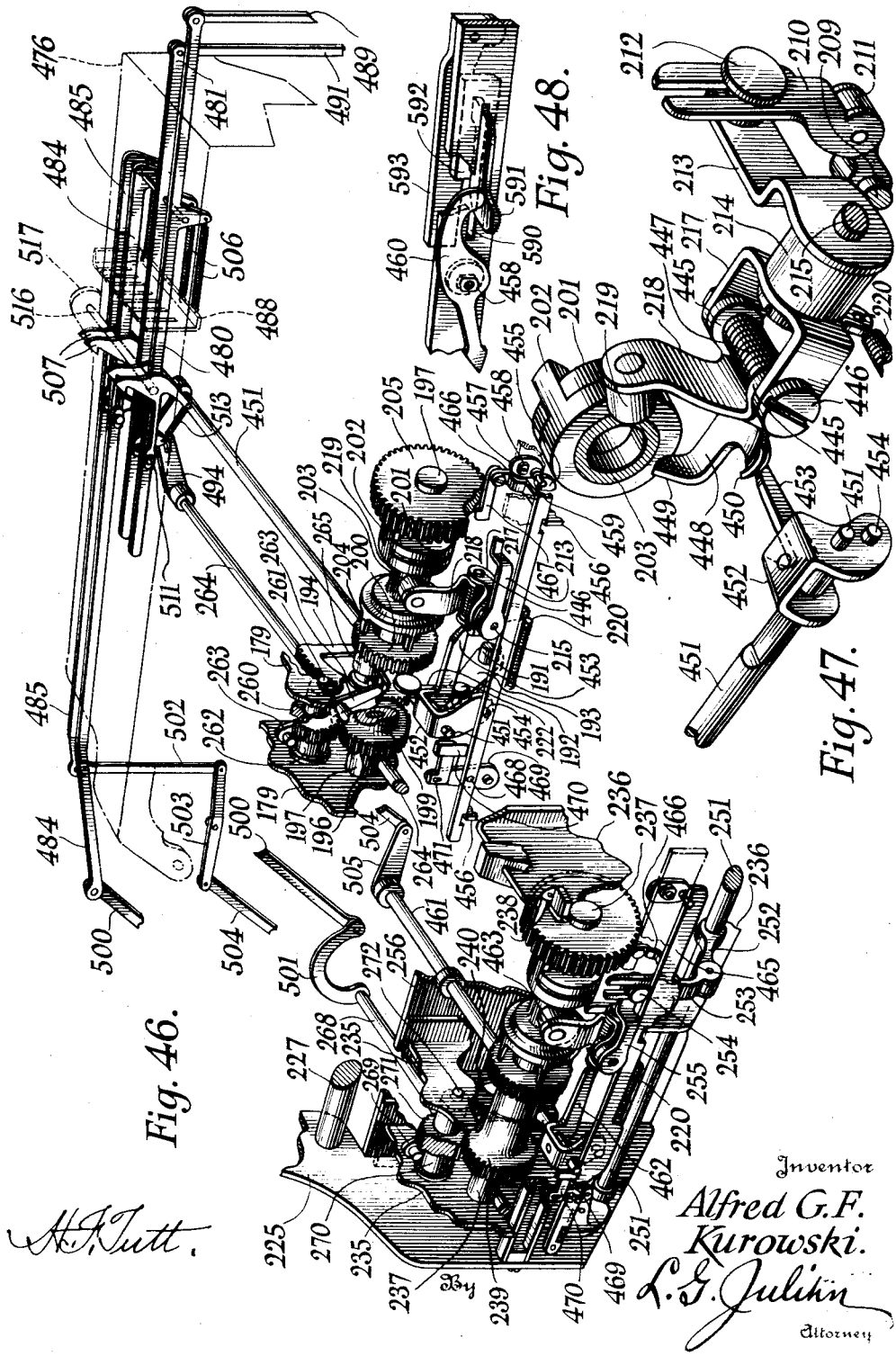

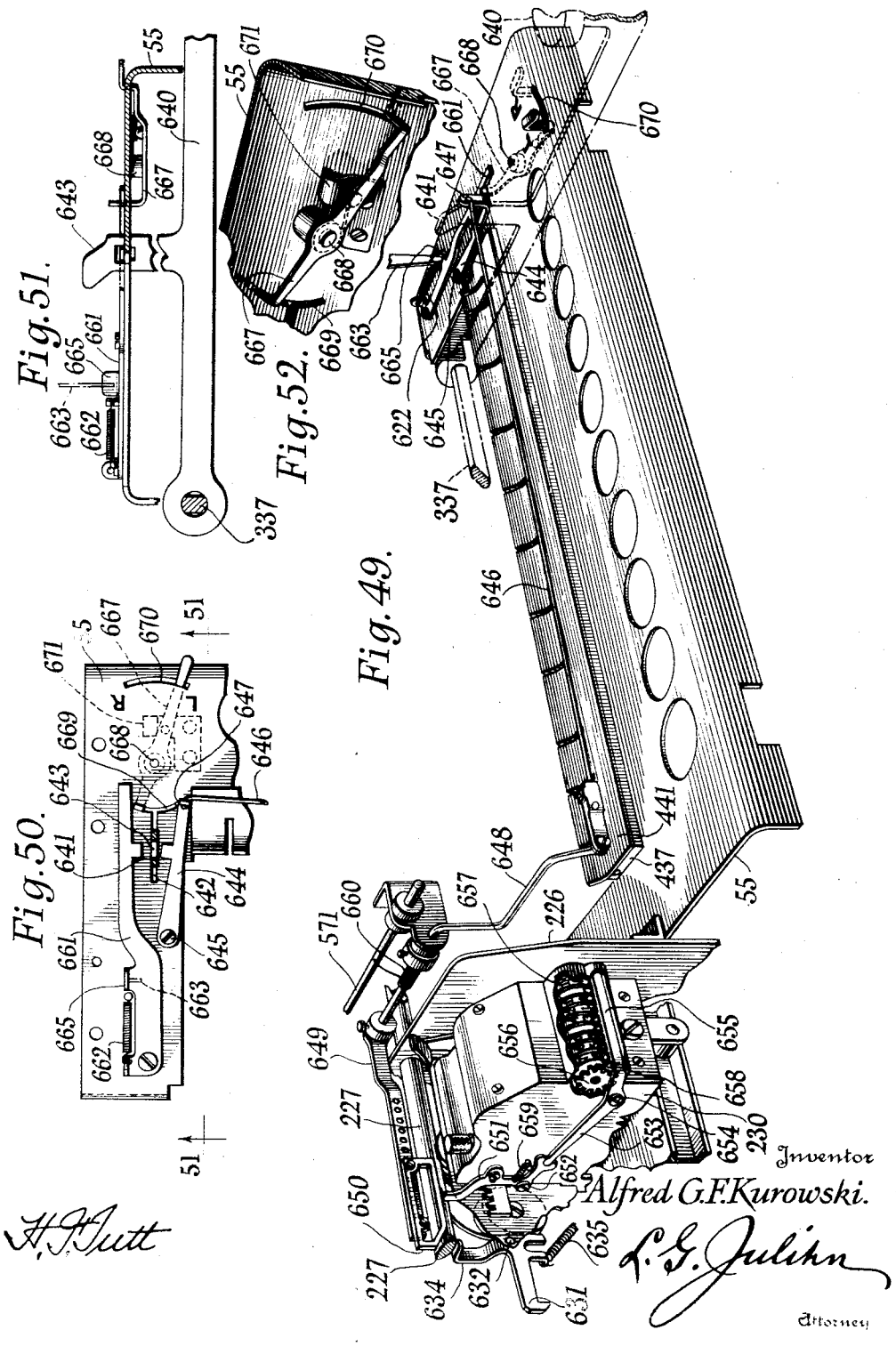

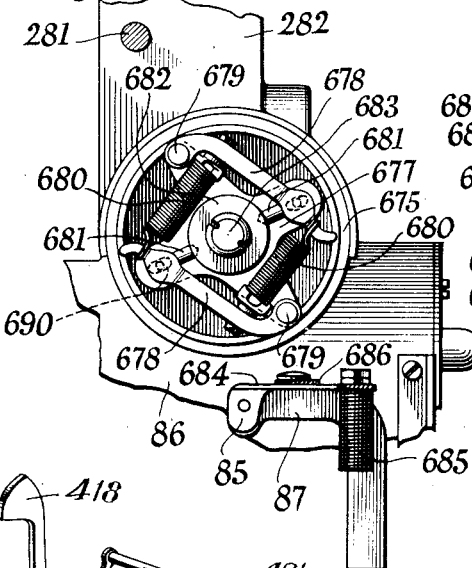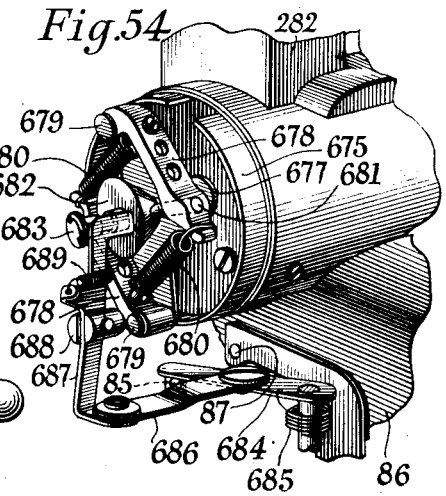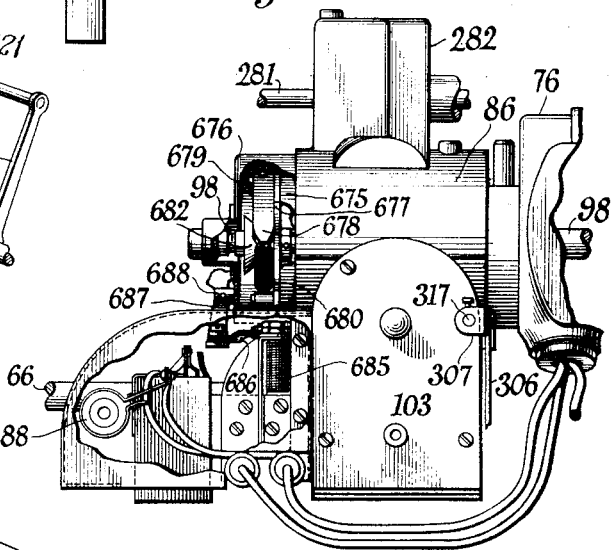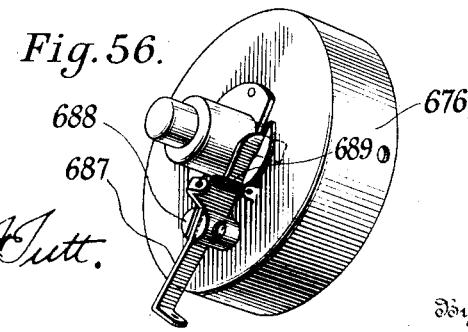

Patented Nov. 16, 1937

2,099,565

UNITED STATES PATENT OFFICE 2,099,565

TYPEWRITING AND CALCULATING MACHINE

Alfred G. F. Kurowski, Brooklyn, N. Y., assignor to Underwood Elliott Fisher Company, New York, N. Y., a corporation of Delaware Application August 31, 1933, Serial No. 687,547

23 Claims. (Cl. 235—59)

The invention relates to calculating machines, and more particularly to combined calculating and typewriting machines, wherein the keys of the typewriting machine control the amount entered in a totalizer, digit by digit, and also control the operation of type bars to print such amount digit by digit.

Heretofore, calculating mechanisms have been applied to typewriting machines of the front strike type, as the Underwood and the Remington machines.

Also, typewriting machines of the down-strike or book-typewriter style, as the well-known Elliott-Fisher, have been equipped with calculating mechanism differing somewhat in structure and operation from the calculating mechanisms applied to the front strike machines.

One object of the present invention is to render possible the application of a calculating mechanism heretofore individual to machines of the front-strike style, to machines of the down-strike type, or book typewriters, to the end that the same calculating mechanism can be indiscriminately applied to either a front-strike or a down-strike machine, thus enabling the manufacturer to reduce the different kinds of stock parts and assembled calculating mechanisms required to equip typewriting machines of both the styles mentioned.

In attaining this object, it has been necessary to provide certain novel controls for setting the mechanisms to work problems in addition and subtraction, or to render the calculating mechanism idle, as well as to disassociate the calculating mechanism and the keys to enable the machine to be used for typewriting purposes alone.

Furthermore, in the makes of front strike typewriting machines heretofore mentioned, the keyboard and frame parts remain stationary, and the paper carrying platen and its carriage travel step by step in letter spacing direction relatively to a single printing point to which the types are brought upon successive depressions of the keys. Also the platen and paper advance in line spacing direction relatively to the types. In down-strike machines of the Elliott-Fisher type, on the contrary, the key-board and its frame travel step by step both transversely and longitudinally relatively to a stationary flat platen, in letter spacing and in line spacing the work, respectively, so that the exercise of invention has been necessary to adapt the controls heretofore mounted on a stationary frame of a front-strike machine, to perform their functions properly when mounted on the traveling keyboard carriage of a down-strike machine of the Elliott-Fisher type.

And the problem is further complicated by the necessity for stationarily mounting the column totalizers of the calculating mechanism of a front strike machine, which column totalizers, in front strike machines, travel with the paper carriage on which they are supported. It is also desirable to arrange that the stationary cross-totalizers of the front strike calculating machine, shall travel with the traveling key carriage of an Elliott-Fisher type machine, all of which requires the exercise of considerable inventive ingenuity.

Another object of the invention is the provision of a novel key lever structure which will relieve the operator of a down stroke machine of the Elliott-Fisher type, when using the numeral keys for typewriting purposes only, from the necessity of idly operating parts which under a calculating adjustment, control the differential mechanism of the calculating machine.

By this arrangement, the "touch" of the numeral keys is rendered substantially like the "touch" of the letter keys, whereby necessity for striking the numeral keys harder than the letter keys, which would slow up the speed of operation, is avoided.

Still another and important object of this invention is the provision of a novel power drive for the operation of the numeral keys, when the machine is conditioned for calculating. By this provision the "touch" of the numeral keys, when the machine is conditioned for calculating, is materially lightened, as it is merely necessary to partially depress a numeral key to effect its connection with the power drive which thereupon completes the key movement.

A further object is to provide novel means to render impossible the actuation of the calculating mechanism in any other manner than through such power drive. This result is conveniently attained by providing that the numeral keys control the connections between the power drive and the calculating mechanism, settable means being also provided to disable the control by the numeral keys of the connections, thus preventing control of the calculating mechanism by the keys when the machine is conditioned to function only as a typewriting machine.

Depression of a numeral key while the power drive is inactive, and while the settable means is in position to maintain the control of the numeral keys upon the connections between the power drive and the calculating mechanism, will merely result in idly rocking such connections, no movement being transmitted to the calculator operating parts or to the printing mechanism.

In this connection, another object is to so arrange the power drive as to enable the repeated operation thereby of a predetermined type bar, as the "X" type bar or that bar carrying the underscoring type, for instance, accompanied, of course, by successive letter spacing of the carriage, upon holding the appropriate key depressed.

A still further object is to prevent a repeat operation of the calculating mechanism due to accidentally or intentionally maintaining a numeral key depressed, after its first operation by its power actuating means.

This object is readily accomplished by arranging for the automatic disabling of the control exercised by the key over the connection between the calculating mechanism and the power drive at the completion of a single down-stroke of the key when operated by the power means. In operating the numeral keys by power, the power drive takes the key out of the control of the operator and completes the key stroke immediately after the operator starts the key on its down stroke, the power drive releasing the key just prior to the end of the down stroke, which is completed under the impetus imparted thereto by the drive, and such release enables the return of the key to normal.

Another object is the provision of a self-contained unitary device adapted not only to control the states of the respective cross totalizers, that is to say, whether the respective cross totalizers shall add, subtract or remain neutral, but also to determine the state of the particular column totalizer at that time in effective position relatively to its actuating mechanism.

In carrying out this feature of the invention, there is provided a set of unitary selectors for association with the respective column totalizers, each selector being equipped with controls arranged according to a predetermined system, to variously influence the state determining mechanisms associated not only with the several cross totalizers, but also with the column totalizer with which at that time the differential mechanism traveling with the key carriage is in effective position.

These selectors are removable and interchangeable on their support relatively to the column totalizers to permit substitution of one for another whenever it is desired to vary the particular set-up to accord with the kind of bookkeeping calculations or entries to be effected on the machine.

Heretofore it has been customary to mount both state-determining cams and decimal spacing cams on the column totalizers, as in United States patents to Wahl, 1,270,471, issued June 25, 1918; Wahl 1,349,024, issued August 10, 1920; and Foothorap 1,512,282, October 21, 1924.

These totalizers, because of the precision workmanship required in their manufacture, are quite expensive. Therefore, should one wish to change the prearranged system of state-control, it is necessary to obtain additional totalizers equipped with properly positioned cams to affect the state controls according to the new arrangement.

Of course, it would be possible in Wahl, 1,349,024, above mentioned to re-adjust the cams to effect the desired change of controls, but such method would require the operator to again readjust the cams when the work in process necessitates the use of the original system of controls, for instance.

Provision of a set of self-contained selector units apart from, but operating in association with the column totalizers, which set of units will enable the operator to effect any desired state determination of which the machine is capable, is far less expensive, less complicated, and more easily and quickly handled than the devices of the prior art.

Furthermore, the self-contained unitary selectors control the states of all cross totalizers and the particular column totalizer with which the respective selectors are associated.

A further object is to contrive such a unitary selector means which of itself is removable from and adjustably attachable to the machine, independently of the column totalizers, and which, in addition to effecting the above-named controls, will also control decimal spacing, and the selection or elimination of either or both cross and column totalizers for operation.

And in this connection, another object is to enable the proper skipping of decimal spaces when employing a close arrangement of column registers as when calculating amounts printed in and occupying the entire spacing between the column rules.

Heretofore, the column totalizers of Elliott-Fisher machines, as disclosed in United States Patent to Bolton, 922,559, issued May 25, 1909, have been equipped with cams so located as to automatically trip the letter-spacing mechanism to form a letter space interval at the proper place in the printed amount for separation of dollars and cents, for instance.

But in close column work where the amounts may extend across the entire column there is a possibility that a digit may be printed on the dividing line or rule between the columns without being registered in its totalizer unless care is taken to avoid such mistake. Also the widths of the side walls of the column totalizers, and the necessary clearance between the wheels of highest and lowest value in a totalizer, and the adjacent side walls to avoid friction, require that the letter space escapement be caused to space twice successively or to jump two spaces, from the units wheel of the first column totalizer, so as to position the travelling master wheel of an Elliott-Fisher book typewriter, for example, to register with the wheel of highest value of the second column totalizer.

An object of the present invention is to so arrange the decimal spacing control cams on closely adjacent columnar selectors that the cams will cooperate to automatically effect a double letter spacing movement upon the occurrence of the foregoing conditions, the decimal spacing control cams being so formed as to enable the selectors to be placed in side by side relation with each other when necessary.

Still another object is the provision of novel means to readily enable a change to be made in the state of any of the totalizers, notwithstanding the automatic control of such states by the selectors.

In other words, there is provided simple and effective means to enable the operator to change the state of any totalizer, either column or cross totalizer, in case it becomes necessary to alter the predetermined control thereof imposed by the particular selector at that time in effective position, and without disturbing such predetermined control, thus to enable the reinstatement of such predetermined automatic state control upon the succeeding traverse of the carriage past the column totalizers, after the special operation or entry has been completed.

In obtaining this result, the entire predetermined automatic state control may be temporarily silenced, from a single operative element, after which a different set up of states may be separately and manually effected for each totalizer. At the conclusion of such special operation or operations, the manual state control members may be returned to "add" position, the manual neutralizing or non-add controls being likewise returned to ineffective position if they have been theretofore adjusted by hand to effective position, whereupon the effectiveness of the automatic state-control is reinstated, and the operator may then proceed with the entry of amounts according to the predetermined automatic system of state controls.

A further object is the provision of means to enable a typewritten entry, including numbers, to be made in a column appropriated for the reception of calculated amounts, by temporarily and simultaneously silencing the automatic state control mechanism, and the decimal spacing control.

As one means to effect this result, there is provided a special key forming part of the regular keyboard and hence, within easy range of the operator's fingers when in the usual positions to depress the keys.

Conveniently, this special key corresponds with the usual case-shift key of the Elliott-Fisher machine which also shifts the ribbon fields.

In the present invention, however, this case shift key performs the additional and novel function of silencing or interrupting the connections between the keys and the differential mechanism for the accumulators, to enable numbers to be printed in the calculating zones without accumulating such numbers.

A further object is to provide a single motor for driving the calculating mechanism and for shifting the key carriage and its supporting frame forwardly or rearwardly, and to enable the full power of the motor to be used in shifting the key carriage and its frame back and forth in line spacing direction relatively to the flat platen.

Heretofore, the Elliott-Fisher type of machine has been provided with controls conveniently operable by the knee of the operator, as shown in the U. S. patent to H. A. Foothorap, No. 1,904,127, issued April 18, 1933, to complete a circuit and connect a motor with the line spacing frame for shifting the latter back and forth.

The Foothorap machine, however, is not equipped with power-operated calculating mechanism, and in order to enable a motor of the same size and power used in Foothorap's invention to be employed in the present invention, for both shifting the line-spacing frame and driving the calculating mechanism, there is arranged an automatic means to silence the power drive for the calculating mechanism, when shifting the line-spacing frame under power, and to reinstate the power drive for the calculating mechanism upon the release of the control for the line spacing frame.

Thus, after the operation of the main switch in the usual manner common to Elliott-Fisher book-typewriters, and illustrated for example, in the United States patent to Harry A. Foothorap, No. 1,904,127, referred to, the manual operation of a separate control completes a circuit through the motor, and mechanically connects the motor drive with a power actuator for the keys.

To effect forward and rearward movement of the line space frame, a separate control, when operated, mechanically connects the motor drive with the line space frame shifting mechanism, and silences the mechanical connection between the motor drive and the power actuator, which connection was rendered effective by the first-named control.

Restoration of the line space frame shift control to its normal position, with the resultant disconnection of the motor and the line space frame drive, automatically restores the mechanical connection between the motor and the power actuator to effective position.

Heretofore, it has been common in the art to provide the cross totalizers with latching means by which the cross totalizers can be locked in their idle positions, out of operation, by simply imparting a quick advance movement to the cross totalizer by a "flick" of the hand, for instance.

As a result, cross totalizers were often accidentally latched out of operation, unnoticed by a busy operator, who might make several computing operations before the inoperative position of the cross totalizer came to his attention.

Another object, therefore, is to remedy this disadvantage by rendering it necessary for the operator to devote conscious effort to effecting the locking of the cross totalizers in their idle positions, and to the release thereof for return to operating position.

Another object is to enable a single clearance proof key to control the clear sign printing of a plurality of cross totalizers.

Heretofore, clearance proof keys controlling the printing of a clear sign in connection with a single cross totalizer have been provided, but the present invention enables a single clearance proof key to be controlled by two or more cross totalizers.

To these and other ends, the invention includes certain novel features and combinations, all of which will be more fully disclosed hereinafter and particularly pointed out in the claims.

Conveniently, the invention is illustrated as applied to a well-known book-typewriter machine, as the Elliott-Fisher machine, it being understood that certain features of the invention are not confined in their application to this type of machine, but may be used also on machines wherein the paper carriage and its platen travel. Claims to combinations and sub-combinations of my invention, particularly relating to the state control mechanism for the totalizers may be found in that division of this invention, filed November 21, 1935, Serial No. 50,821.

In the accompanying drawings;

Figure 10 is a fragmentary top plan view of the set of numeral keys and connected mechanism;

Figure 11 is a fragmentary sectional view in front elevation of the numeral key mechanism on line x—x of Figure 10;

Figure 14 is a fragmentary detail plan view of a composite numeral key and its coupling mechanism, showing the uncoupled position;

Figure 15 is a fragmentary view in side elevation of the same;

Figure 16 is a fragmentary detail perspective view of one of the numeral key mechanisms depressed by the power actuator, the view also showing the means for enabling and disabling the numeral key control of the connections between the keys and the power actuator;

Figure 17 is a detail perspective view of a numeral key-controlled coupler-adjusting member;

Figure 18 is a fragmentary front view of a composite numeral key, the connection between the companion key levers being shown in full lines in its effective position, its ineffective position being shown in dotted lines;

Figure 19 is a fragmentary detail view in front elevation of a modfied form of power actuator for the keys and calculating mechanism;

Figure 20 is a fragmentary sectional view through the rotary power actuator, showing the relation of the numeral key and coupler mechanisms thereto;

Figure 21 is a plan view of the rotary power actuator, partly broken away;

Figure 24 is a fragmentary top plan view of the grouped state controls forming part of the automatic conditioning means for the column and cross totalizers; also the decimal or skip letter space control;

Figure 25 is a fragmentary rear view, partly in section, of the same grouped mechanisms;

Figure 28 is a fragmentary perspective view of the control box in which the grouped automatic state control mechanisms are supported, and a single state control mechanism, together with the manually settable means for disabling the automatic state control of the totalizers, such last-named means being in idle position;

Figure 29 is a similar view, showing the automatic state-control disabling means adjusted to its effective position by the manually operable means for conditioning the machine for hand or power operations;

Figure 30 is a detail perspective view of one of the adjustable and removable selectors through which the automatic state control mechanisms are operated;

Figure 31 is a vertical sectional detail view, showing the relation of a selector to the automatic state control mechanisms, the pick up members connected with the respective cross totalizers, and the decimal or skip letter spacing mechanism;

Figure 1:
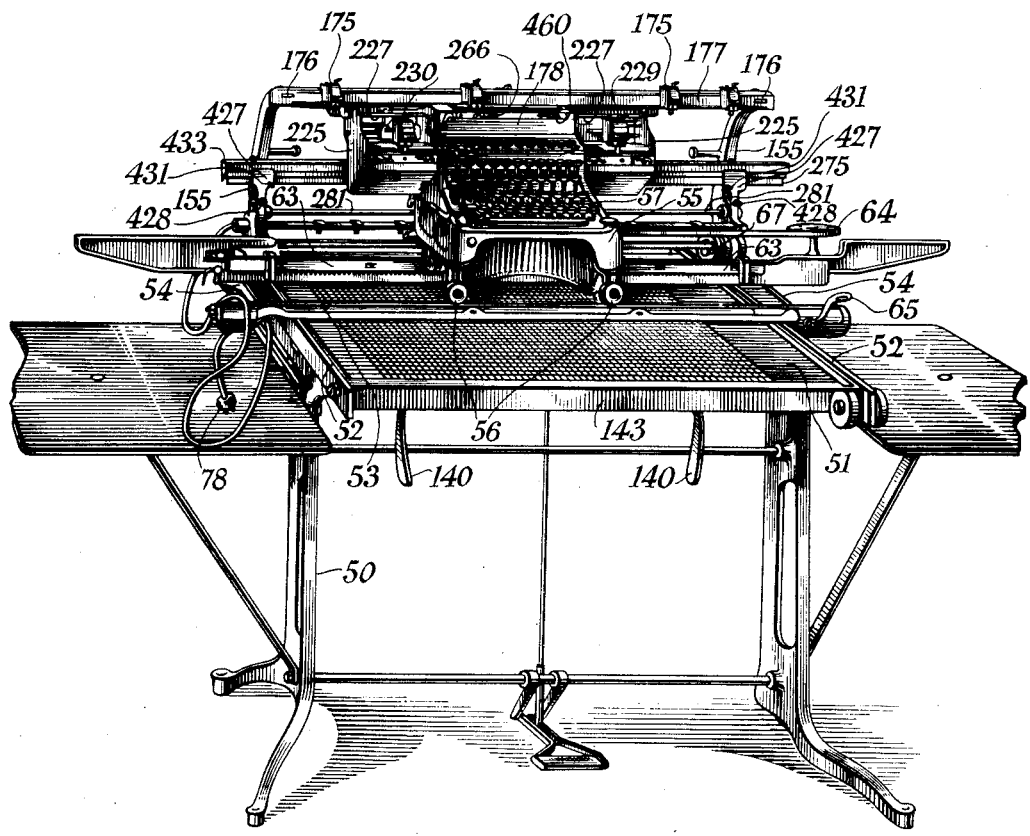
Figure 1 is a general perspective view of an Elliott-Fisher book-typewriter equipped with one embodiment of this invention, details being omitted.

Figures 32 to 37, both inclusive, are detail side views of the several automatic state control members associated with the column totalizers and the respective cross totalizers;

Figure 38 is a fragmentary side view, showing the position assumed by an automatic state control dog under the influence of a selector cam;

Figure 39 is a detail bottom plan view of a fragment of an automatic state-control member and its dog;

Figure 40 is a fragmentary rear view, partly in section, showing a cross totalizer pick-up member engaged with a selector unit, and certain of the state-control members and the decimal skip spacing member also under control of the selector unit;

Figure 41 is a similar view, with the cross totalizer pick-up mechanism omitted, the outermost state control member being shown in its operated position, and the manually operable state control silencing mechanism being in idle position;

Figure 42 is a similar view, showing the manually operable state-control silencing mechanism effective;

Figure 43 is a fragmentary rear view, partly in section, of the right-hand cross totalizer pick-up member engaged with a unit selector, dotted lines showing the disengaged position;

Figure 44 is a similar view of the left-hand cross totalizer pick-up, of different contour from the right-hand pick-up;

Figure 45 is a top plan view of both cross totalizer pick-ups and the control box;

Figure 46 is a fragmentary skeletonized perspective somewhat distorted, showing the relations of the automatic state control mechanisms and the column and cross totalizers, and the clutch and reversing mechanisms for the totalizers;

Figure 47 is a detail perspective of the neutralizing or non-add mechanism;

Figure 48 is a fragmentary detail perspective showing the means for shifting a manually operable state control member and maintaining it where adjusted;

Figure 49 is a fragmentary perspective, showing the single clear sign printing key and the cross-totalizer control thereof;

Figure 50 is an enlarged detail top plan view of the cross totalizer-controlled locking means for the clear sign printing key;

Figure 51 is a fragmentary side view thereof;

Figure 52 is a detail perspective of the means for selecting which of the cross-totalizers shall control the clear sign printing key, looking from beneath;

Figure 53 is a detail face view of the speed control and associated make and break switch for the motor;

Figure 54 is a perspective view thereof;

Figure 55 is a side view of the speed control and a part of the motor circuit broken away to show the resistance;

Figure 56 is a detail perspective view, showing the manner of mounting the speed-responsive switch control lever for automatically making and breaking the motor circuit;

Figure 57 is a detail perspective showing the connection of the cam arm 419 to the shaft 420.

Generally speaking, the present invention evolved from the idea of applying a column and cross totalizer assembly, such as is used in the "round platen" art, to a flat platen type of writing machine.

Such column and cross totalizer assemblies are shown, for example, in the United States patents to Kurowski, 1,835,165, issued December 8, 1931, and 1,876,696, issued September 13, 1932, and to Wahl, 893,717, 893,718 and 893,719, issued July 21, 1908; 1,148,732, issued August 3, 1915; 1,270,471, issued June 25, 1918; 1,349,024, issued August 10, 1920; 1,366,683, issued January 25, 1921; 1,397,188, issued November 15, 1921, and 1,648,667, issued November 8, 1927, applied to the round platen type of writing machine.

In the operation of round platen writing machines, the paper carriage with its rotary platen, travels from right to left relatively to the stationary supporting frame in which are mounted the keys and printing mechanism.

In the operation of flat platen writing machines, the keyboard and printing mechanism travel from left to right and also from rear to front relatively to a flat bed supporting the work sheet.

In the illustrated embodiment of this invention, the accumulating assembly of column and cross totalizers modified and controlled in novel manner, is applied to the well-known Elliott-Fisher typewriting machine disclosed generally, in United States patents to Parmly, 1,143,223, issued June 15, 1915; and to Foothorap, 1,203,519, issued October 31, 1916; 1,251,361, issued December 25, 1917; 1,275,413, issued August 13, 1918; 1,283,489, issued November 5, 1918; 1,459,200, issued June 19, 1923; 1,512,282, issued October 21, 1924, 1,538,392, issued May 19, 1925, and 1,904,127, issued April 18, 1933.

The standard 50 (Fig. 1) of an Elliott-Fisher machine, supports a flat platen or bed 51 on which the work sheets lie in horizontal position. Tracks 52, located alongside the opposite side edges of the flat platen and extending from rear to front thereof, support a traveling line spacing frame extending transversely of the platen, and including spaced front and rear rails 53, 53, (Fig. 2) connected near their opposite ends by spreader bars 54, 54, (Fig. 1).

A key carriage 55, the frame of which is equipped with pairs of front and rear wheels 56, is mounted on and travels along the front and rear rails 53, 53 of the line-spacing frame, in letter-spacing direction (left to right) and return.

The usual keys 57 (Fig. 2) representing the letters of the alphabet are suitably pivoted in the key carriage frame and connected by separate linkages with their respective down-strike type bars pivoted in hangers secured to a horizontally arranged type bar sector 58 suspended just above the platen 52 by posts 59, from the main frame of the key carriage.

Depression of the letter keys operates their respective linkages to swing downwardly the corresponding type bars with their types, whereby to effect the imprint of the desired characters upon the work sheet, through the usual ribbon, not shown.

Depression of the letter keys also trips the usual letter space escapement dogs (not shown) cooperating with a ratchet wheel 60 (Fig. 2) fast on a short escapement shaft 61, suitably journaled in the key carriage structure to travel therewith. A carriage feed pinion 62 turning with the escapement ratchet 60, meshes with the customary letter spacing feed rack 63 supported by the rear rail 53 of the line-spacing frame, to enable the feed motor 64 (Fig. 1) usually in the form of a spring drum supported on the line space frame, to advance the key carriage in letter spacing direction upon the release of the key, all as more fully shown and described in United States patent to Foothorap, 1,203,519, issued October 31, 1916, to which reference may be made for a more complete exposition of this mechanism.

Line spacing the key carriage 55 step by step towards the front of the machine may be manually effected by operation of the hand lever 65 (Fig. 1) which operates in a manner more clearly disclosed in United States patents to Foothorap, 1,275,413, issued August 13, 1918, and 1,283,489, issued November 5, 1918, to impart an increment of rotation to a line spacing shaft 66 (Figs. 2 and 3) extending transversely across the platen 51 and journaled near its ends in the pedestals of brackets 155 extending upwardly from the rear corners of the line spacing frame.

Wheels 67 (Fig. 3) fast on this line space shaft 66 near its opposite ends, rest upon and roll along the tracks 52 of the platen frame, to reduce the frictional contact between the line spacing frame and its stationary support, and gears 68 also fast on the shaft 66, mesh with racks 69 located conveniently alongside the tracks 52 to enable a line-spacing travel of definite extent to be imparted to the line-space frame and key carriage. Wheels 72 (Fig. 2) mounted in the front rail of the line space frame travel on the track 52.

The key carriage 55 is provided with the usual carriage return key 70, (Fig. 27) disclosed in Foothorap, 1,904,127 heretofore mentioned, and with a case shift key 71, shown in Foothorap United States Patent No. 1,459,200. Reference to these key mechanisms in greater detail will be made hereinafter.

As is in the Elliott-Fisher machine disclosed in Foothorap, 1,904,127, there is provided a motor 76 (Figs. 3, 5 and 55) mounted on a frame bracket 77 (Figs. 2-4) secured to and projecting rearwardly from the rear rail 53 of the line spacing carriage to travel therewith towards and from the operator.

Figure 5:
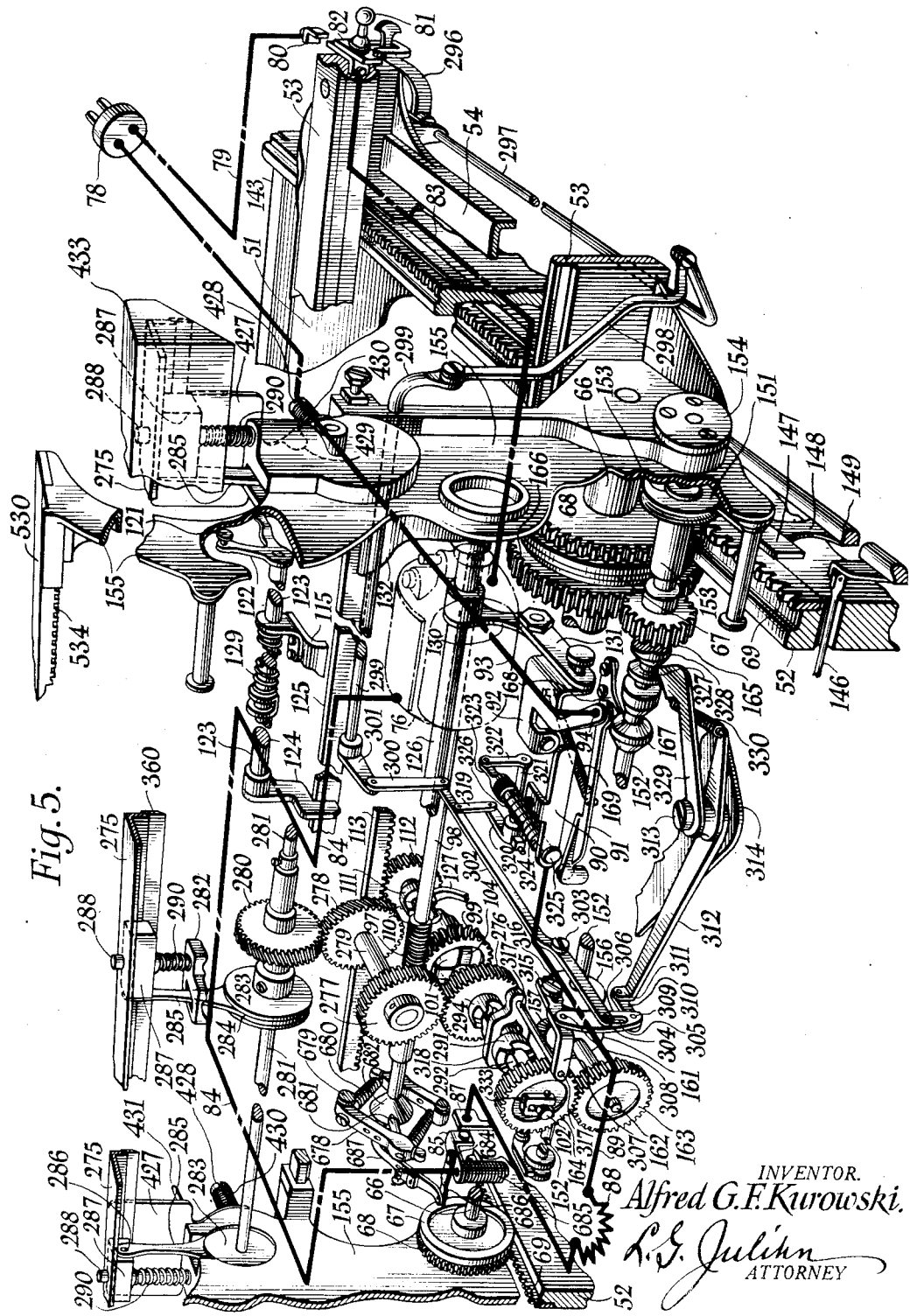
Figure 5 is a skeleton perspective view somewhat distorted and broken away, looking from the rear and showing the several trains of driving gears, the motor circuits being shown diagrammatically.

Current for the motor is supplied from any suitable source, as through the plug 78 (Figs. 1 and 5), the circuit, diagrammatically shown in Fig. 5, leading therefrom along a conductor 79 to one contact 80 of a main switch 81 manually closed by the operator when starting work on the machine, and opened when it is desired to cut off the current.

Closing the main switch 81 shifts a contact 82 into engagement with the terminal contact 80, the current then passing along a conductor 83 to the motor 76, through the motor and via a conductor 84 to one terminal 85 of a normally-closed speed responsive switch, mounted on and insulated from the gear housing 86, (Figs. 53-54), thence through the opposed terminal 87 to a suitable resistance 88 from whence it is led through conductor 89 to the stationary contact 90 of a multiple contact switch.

Separately controlled movable contacts 91 and 92 co-act with this stationary contact 90 and are connected with the return lead 93 of the plug circuit.

The foregoing general circuit is similar to that shown in Foothorap, 1,904,127.

Power from the motor is utilized to shift the key carriage and line spacing frame towards the operator in line spacing direction and from the operator to the head of the work sheet; and to return the key carriage to the beginning of a line.

Normally the motor is not energized, as will be seen from the circuit, which, to be completed, not only requires that the main switch 81 be closed, but further, that one of the movable contacts 91 or 92 be engaged with the stationary terminal 90.

The movable contacts are respectively controlled by separate manually operable devices by which the power of the motor is utilized for the various purposes mentioned.

A worm 97 (Figs. 4 and 5) driven by the motor shaft 98 engages and rotates a worm wheel 99 loosely mounted on the hub of one member 100 of a slip clutch 100, 101. The slip clutch member 100 is fast on a counter shaft 102 suitably journaled in bearings in the housing 86 and in a cover plate 103 closing the open rear end of the housing.

Figure 4:
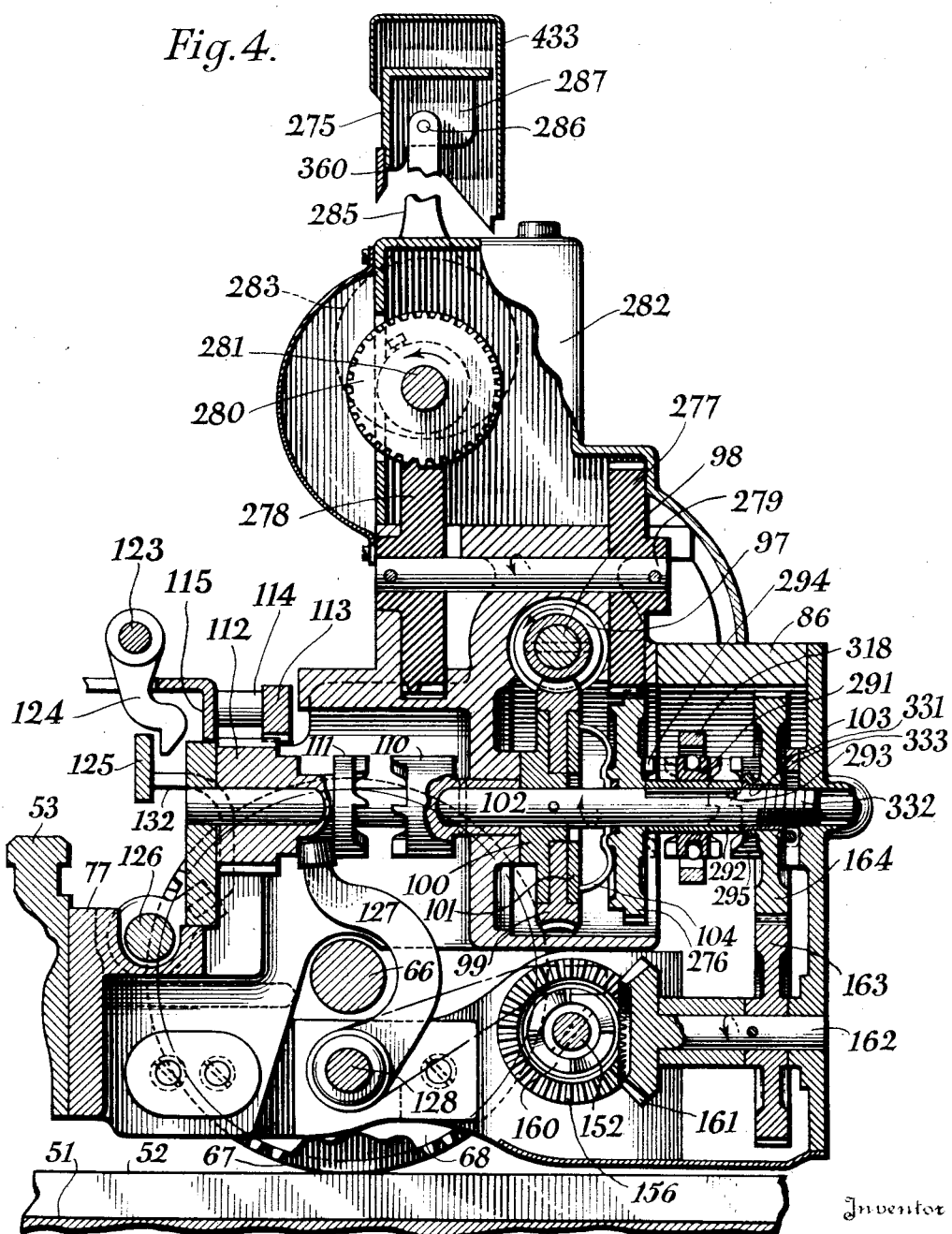
Figure 4 is an enlarged detail view in cross-section from front to rear, through the motor drive mechanism, looking towards the left side of the machine, the parts being in idle position.

The web of the worm wheel 99 is embraced on its opposite faces by the fast and loose members 100, 101 of the slip clutch, a friction spring 104 pressing against the outer face of the loose member 101 of the clutch to cause the clutch to grip the worm wheel snugly and enable the worm 97 to drive the counter shaft 102 in the direction of the arrow, Fig. 4.

To enable the return of the key carriage under power to the beginning of a line at the will of the operator, the counter-shaft 102 (Fig. 4) carries a clutch member 110 fast thereon and opposed by a driven clutch member 111 journaled and adapted to slide back and forth on the counter-shaft 102 into and out of engagement with its co-acting clutch member 110.

A wide pinion 112 fast with the driven clutch member 111 and itself journaled on the counter shaft, is in constant mesh with a carriage return rack 113 (Figs. 2 and 4), secured rigidly by studs 114 to a rear flange 115 projecting from and fast with the usual lower deck 116 of the traveling key carriage. Normally, the clutch members 110, 111 are disengaged as illustrated.

The carriage return key lever 70 (Fig. 27) pivoted at 117 to the frame of the traveling key carriage, carries a connecting stud 118 projecting into a slot 119 in a depending adjusting link 120 also pivoted at its upper end at 117. The forked lower end of the link 120 embraces a stud 121 mounted on an arm 122 fast on a trip shaft 123. The tip of a finger 124 depending from the shaft 123 (Figs. 4, 5 and 27) lies behind a bail 125 extending across the platen and rigidly supported by arms 132 connected to the carriage return clutch control shaft 126 likewise extending across the platen and journaled in the brackets 155.

Connections, not herein shown or described, between the clutch control shaft 126, and a clutch shifting dog 127 fast on a stub shaft 128 journaled in the frame bracket 77, are fully set forth in the U. S. Patent to Foothorap No. 1,904,127, heretofore referred to.

The carriage-return key 70, when depressed, rocks adjusting link 120 clockwise (Fig. 27) to turn the arm 122, together with the trip shaft 123 and its depending finger 124, counter-clockwise.

The finger rocks the clutch-tripping bail 125 and its clutch control shaft 126, and through the train of connections, not herein shown, causes the clutch shifting dog 127 to engage the driven member 111 of the carriage return clutch with the drive member 110 thereof and hold the members engaged, all as explained in said Foothorap patent.

The carriage-return pinion 112 (Fig. 5), accompanies the driven member 111 and fully meshes with the carriage return rack 113, whereby to enable the motor to return the traveling key carriage to the beginning of a line.

The carriage return key 70, when depressed to rock the universal bail 125 and its shaft 126, also operates through the shaft 126 to complete a circuit through the motor whereupon the latter is energized to drive the carriage restoring mechanism.

Referring to Figure 5, the shaft 126 carries a depending arm 130 connected by a link 131 with the movable contact 92, whereby, upon depression of the carriage return key 70, the movable contact is rocked into and held in engagement with the stationary terminal 90, thus completing a circuit through the motor, which is again interrupted at this point upon restoration of the carriage to the beginning of a line, by suitable mechanism, not shown.

A spring 129 (Fig. 5) encircling the shaft 123, restores the carriage return key 70 and connected parts upon the release of pressure thereon, the uncoupling of the carriage return clutch members 110 and 111 and the restoration of the clutch control shaft 126 with its bail in substantial contact with the tip of the depending finger being effected through the carriage upon its return to the beginning of a line, as explained in Foothorap Patent 1,904,127.

The line spacing frame is advanced or returned by the motor along the platen 51 by means very similar to that disclosed in the aforesaid Foothorap Patent No. 1,904,127.

For this purpose, the Elliott-Fisher machine is usually equipped with a pair of knee-levers 140 (Figs. 1 and 3) pendant beneath the platen and fast on parallel shafts 141 extending from front to back and journaled in brackets 142 depending from the usual front and rear cross braces 143 forming part of the platen supporting frame 50. A link 144 (Fig. 3) connects the free ends of arms 145 fast on the rear ends of the shafts 141, and a second link 146 extends from one of the arms 145 to a universal bail 147 arranged along the outer face of and parallel with the adjacent rail 52 along which the line spacing frame and key carriage travel in advancing and returning.

The bail 147 is supported at the upper ends of arms 148 projecting upwardly from a pivot rod 149 located some distance below the point of attachment of the link 146 and bail, and journaled at its ends in brackets 150 (Fig. 3) projecting from the adjacent rail 52.

The upper edge of the bail 147 (Figs. 3 and 5) lies in substantially the same horizontal plane with, but apart from the tread of the adjacent rail 52, such upper edge being embraced by a grooved connecting disk 151 journaled on an axially shiftable reversing shaft 152, the disk being held against axial movement relatively to the shaft by collars 153 fast on the shaft.

The axially shiftable reversing shaft is journaled at one end in a suitable bearing 154 (Fig. 5) formed in one of the upwardly extending brackets 155 at the rear of the traveling line space frame, the opposite end of the shiftable reversing shaft being journaled within the gear housing 86, as shown in the Foothorap Patent 1,904,127.

Within the gear housing, the reversing shaft 152 passes axially through a pair of opposed bevel gears 156 and 157 (Figs. 4 and 5) journaled in the housing, the bevel gears each being provided with a clutch member (not shown), engageable by one or the other face of a double-faced clutch member 160 (Fig. 4) fast on that portion of the reversing shaft 152 which lies between the opposed bevel gears 156 and 157. The double-faced clutch member 160 is normally out of engagement with the co-acting clutch members carried by the respective bevel gears 156 and 157.

A miter gear 161 (Figs. 4 and 5) fast on a stub shaft 162 journaled in the gear housing 86, is in constant mesh with both bevel gears 156 and 157. A transmission gear 163 also fast on the stub shaft 162 meshes at all times with a similar gear 164 journaled on the counter shaft 102 which is driven by the motor 76, as heretofore explained.

Motion is communicated from the counter shaft 102 to the transmission gear 164 through a clutch mechanism forming part of the present invention, which will be hereinafter set forth in detail in connection with the power actuator for the numeral keys.

For present purposes only, the transmission gear 164 may be considered as fast on the counter-shaft 102, as in Foothorap Patent 1,904,127.

By outward pressure of a knee against one or the other of the knee levers 140, the operator selects the direction in which the line space frame shall shift, such pressure operating through the selected shaft 141 to rock the appropriate arm 145 clockwise or counter-clockwise and swing the universal bail 147 to the right or left (Fig. 3) from its normal median position.

The bail 147 operates through the grooved disk 151 to shift the reversing shaft 152 axially in a corresponding direction, whereby to engage one face or the other of the double-faced clutch member 160 (Fig. 4) with its appropriate co-acting clutch member fast with the bevel gear 156 or 157 to enable the motor 76, through the train of gearing connecting the motor with the miter gear 161 to turn the latter and the bevel gears 156, 157, and rotate the reversing shaft 152 in one direction or the other depending upon which of the bevel gears is clutched to the shaft.

A drive pinion 165 (Figs. 3 and 5) fast on the reversing shaft 152 near one end thereof, is of sufficient width to maintain engagement with a gear 166 fast on the line spacing shaft 66 irrespective of the shifting of the reversing shaft 152. Consequently, when the motor is energized, it will operate through pinion 165 and gear 166 to turn the line space shaft 66 in one direction or the other, and with it the traction gear wheels 68 fast on its opposite ends. The traction gear wheels 68, as before stated, mesh with racks 69 fast on the tracks 52 so as to shift the line space frame and the key carriage bodily in the desired direction.

The motor circuit is controlled by a cam member 167 (Figs. 3 and 5) fast on the axially shiftable reversing shaft 152 and normally engaged by a beak 168 on the tail of the movable contact lever 91 suitably pivoted at 94. The cam normally maintains the movable contact 91 apart from the stationary contact 90 against the tension of a spring 169 to interrupt the motor circuit at this point.

As the reversing shaft 152 is shifted endwise in either direction, the cam 167 escapes the beak 168 and allows the spring 169 to rock the movable contact 91 against the stationary contact 90 and close the motor circuit, whereupon the motor 76 becomes energized to drive the line space frame through the foregoing mechanism.

Release of pressure on the operated knee lever 140 enables a spring 170 (Fig. 2) on the shaft 141 of such lever, to restore the parts to normal, and disengage the double-faced clutch member 160 (Fig. 4) from the particular bevel gear 156 or 157 with which it was engaged.

Return of the shaft 152 to normal, again positions the cam 167 opposite the beak 168, thereby rocking the movable contact lever 91 away from the stationary contact 90 and breaking the circuit to the motor.

It should be understood that the movable and stationary contacts 90, 91 and 92 are thoroughly insulated from the machine, and that although the spring 169 extending between the movable contacts 91 and 92 tends to draw the latter into engagement with the stationary contact 90, such action is normally prevented by the restraint imposed upon the movable contact 92 through its link 131, arm 130, shaft 126 and connected parts, and as to movable contact 91, by the cam 167 on the axially shiftable shaft 152, against the high point of which cam the insulated beak 168 on the tail of the movable contact rests.

Interlocking means is also provided, as set forth in patent to Foothorap, 1,904,127, to prevent the release for operation of either movable contact 91 or 92, when the other is engaged with the stationary contact 90.

Column totalizer mechanism

Figure 2:
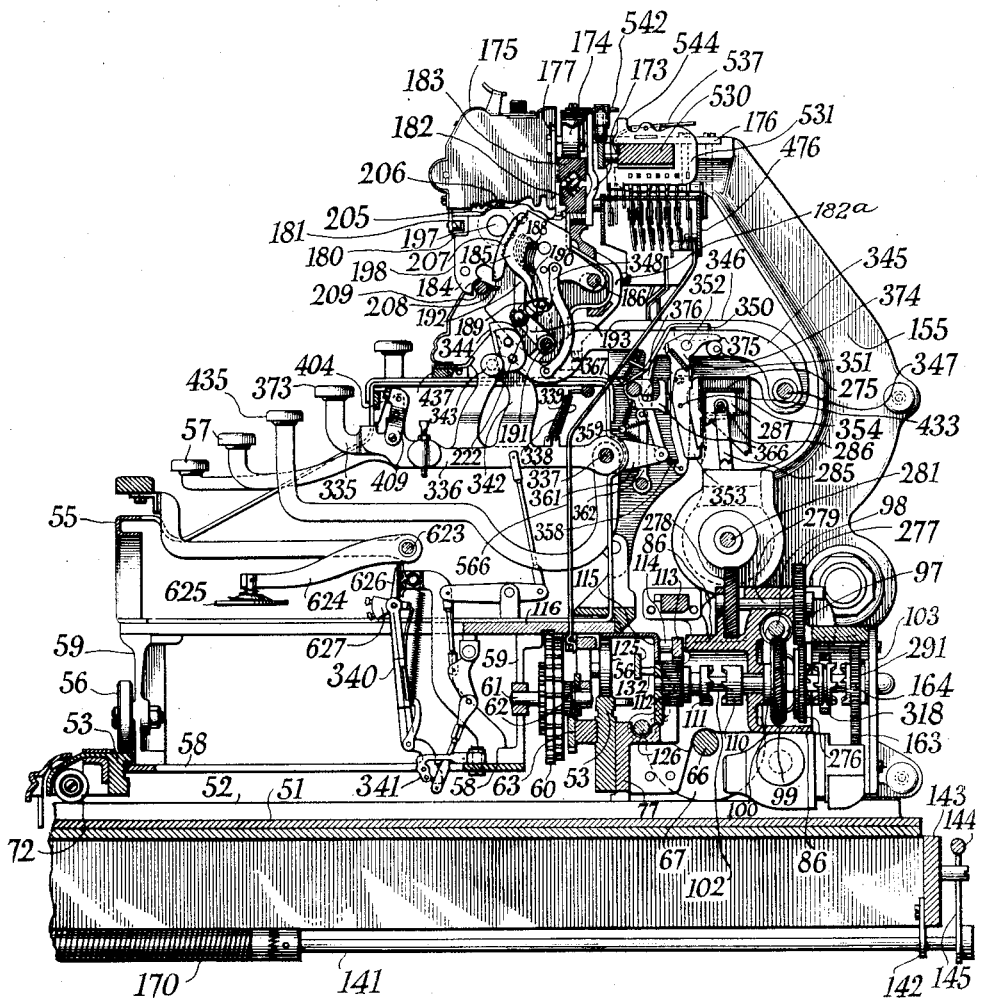
Figure 2 is a vertical sectional view from front to rear looking towards the left, and showing the power drive mechanism for operating the actuator common to the numeral keys; the key mechanism with its type bars; one of the column totalizers, with its differential mechanism mounted in the travelling key carriage; and a part of the automatic state-control mechanism.
Figure 3:
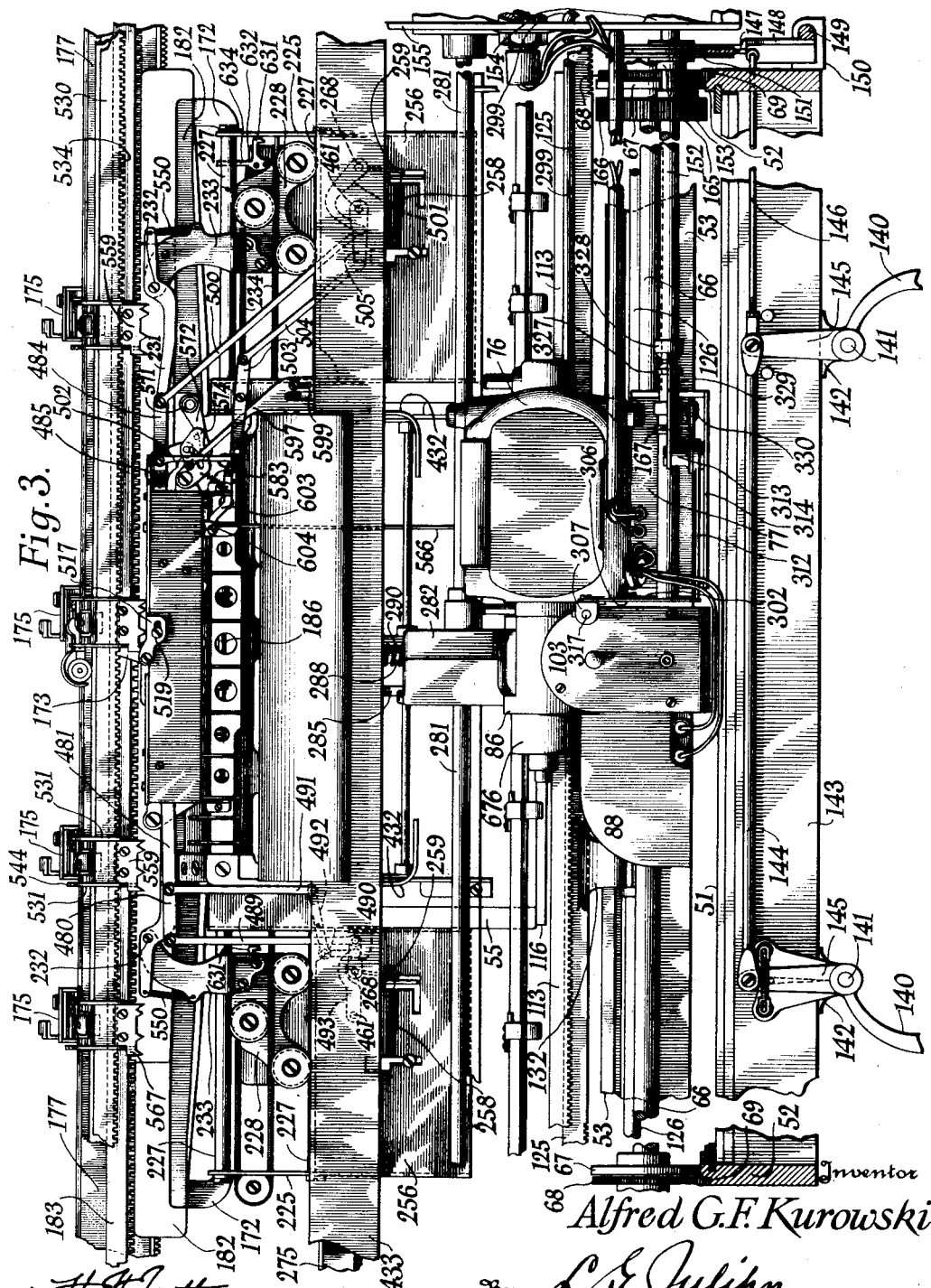
Figure 3 is a view in rear elevation, partly broken away, of an Elliott-Fisher machine equipped with this invention.

In the machine embodying the present invention, the side frames of the traveling key carriage 55 at their upper rear ends, support a transversely extending webbed rail 182, (Fig. 6) the central depending portion of which web fits between the side frames of the key carriage, as shown in Figs. 3 and 25 and is formed with a longitudinally extending rearwardly bulging channel 182a (see Fig. 2).

A race extending along the upper edge of the traveling rail 182 accommodates anti-friction rolls (Figs. 2 and 27) which support a stationary rail 183 loosely and adjustably connected to the forwardly projecting ends of hangers 176, the rear ends of which hangers are fastened to the upper forwardly extended ends of the upright brackets 155 (Figs. 1, 2 and 5) of the line spacing frame.

A column totalizer supporting bar 177 (see also Fig. 6) is fastened to the front face of the stationary rail 183 and extends transversely of the machine above the hood 178 (Figs. 1, 23 and 27) of the traveling key carriage.

Column totalizers 175 of any suitable type, as that shown in United States patents to Wahl, 1,148,733, issued August 3, 1915, and to Kurowski, 1,835,165, issued December 8, 1931, and 1,876,696, issued September 13, 1932, are releasably and adjustably secured to the bar 177, in any desired letter space relation.

The column totalizers project over the hood 178 (Figs. 1, 23 and 27) of the traveling key carriage, a channel bar 180 (Figs. 2 and 23) being fastened across the face of the hood to accommodate guide rollers 181 suitably supported by and depending from the forward lower ends of the respective column totalizers.

A strap 173 (Fig. 2) fastened at its lower end to the rear face of the lower traveling rail 182, extends upwardly to a point above the upper stationary rail 183 where it carries a roll 174 traveling along the upper edge of the rail 183 to afford a traveling tie between the rails.

Side frame plates 184 (Fig. 6) are arranged in vertical planes within the hood 178 forming the upper part of the traveling key carriage, and are secured by flanges at their rear edges to the forward face of the traveling rail 182. These side frame plates support the differential mechanism for the main actuator or master wheel coacting with the column totalizers, which means closely approximates that shown in United States patent to Kurowski, 1,835,165.

Such differential mechanism is operated by a notational series of cam-slotted sectors 185 from "1" to "9" (Figs. 2, 6, 16 and 22) journaled for independent rocking movement on a supporting rod 186 mounted at its opposite ends in the side frames 55 of the traveling key carriage, the longitudinal bulge 182a in the web of the traveling rail 182 being formed to clear the fulcrum rod 186, and slitted to afford guides for the sectors.

Springs 187 (Figs. 6 and 16) yieldingly retain the sectors in their normal raised positions against the front face of the rail 182 as a back stop.

The notational sectors 185 each rock through arcs of like extents, but are severally provided with the differential cam slots 188 adapted to embrace studs 189 projecting laterally from upright arms 190 fast on a differential shaft 191 journaled at its ends in the side frames 184 through which the ends of the shaft project.

The sector 185 corresponding to the digit "9", when rocked downwardly through its arc of travel, fits its cam slot 188 over the corresponding stud 189 to rock its corresponding arm 190 and the differential shaft 191 nine steps or increments, due to the angle of its cam slot, whereas the sector corresponding to the digit "1" will rock the differential shaft 191 through a single step only.

A link 192 (Fig. 2), the lower end of which is loosely pivoted by a long stud 222 (Figs. 46) to an arm 193 on the differential shaft 191, connects with a toothed segment 194 (Figs. 6 and 22) pivoted on and slidable axially of a short rod 195 (Fig. 22) mounted at its ends in sub-frames 179, embraced between the end plates 184 of the hood frame.

The segment 194 is adapted to mesh with an intermediate gear 196 (Figs. 22 and 46) rotatably mounted near one end of a shaft 197 journaled in and extending between one of the sub-frames 179 and the sub-frame 198, located parallel with and between the hood side frames 184, to transmit the differential rotation of the shaft 191 to the intermediate gear 196.

A sleeve 199 (Fig. 22) journaled on the shaft 197 connects the intermediate gear 196 with a clutch member 200 (Figs. 22 and 46) in the form of a toothed wheel, opposed to which is a clutch disk 201 which may be fast on the shaft 197 and is slotted to slidingly accommodate a finger 202 projecting from a grooved collar 203 slidable on the shaft 197 between the clutch member 200 and the clutch disk 201. Fingers 204 projecting from the collar oppositely to the finger 202, are adapted to enter between adjacent teeth of the toothed clutch member 200, to communicate the differential rotation of the intermediate gear 196 to the clutch disk 201 and to a master gear wheel 205 which may also be fast on the shaft 197.

Thus, as the key carriage travels in letter spacing direction from left to right across the platen, the master gear wheel 205 meshes successively with the denominational gear wheels 206 (Fig. 27) of the particular column totalizer at that time in position to be operated, to register amounts thereon.

Normally, the sliding collar 203 remains at its right hand limit of travel, with its fingers 204 withdrawn from engagement with the toothed clutch member 200. To automatically complete the clutch connection between the intermediate gear 196 and the master gear wheel 205, each notational slotted sector 185 carries a cam shoe 207 (Figs. 2, 6 and 16) adapted to contact with its corresponding pin 208 (Figs. 6 and 22), of a series of such pins projecting from a clutch control shaft 209 extending parallel with the differential shaft 191 and journaled in the hood side frames 184 through which the ends of the clutch control shaft project.

A forked link 210 (best shown in Fig. 47) pivoted to the outer end of an arm 211 fast on the clutch control shaft 209, embraces a headed stud 212 projecting from one arm of a lever 213, connected to one end of a sleeve 214 journaled on a stud 215 projecting rearwardly from the front plate 216 (Fig. 22) of the hood.

A yoke 217 (Fig. 47) fast on the inner end of the sleeve 214, supports a clutch-shifting arm 218 carrying a roller 219 entered in the groove of the clutch collar 203 (Fig. 46) and a spring 220 connected to an eye on the yoke, tends to yieldingly retain the clutch shifting arm 218 at the clockwise end of its throw and the clutch collar 203 disengaged from the clutch member 200.

The shoes 207 project in advance of their cam-slotted notation sectors 185 so as to operate the clutch control shaft 209 to establish the clutch connection prior to the actuation of the differential shaft 191 by the walls of the cam slots 188, the shoes being of such length as to escape their pins 208 as the cam-slotted sectors 185 complete their down strokes, whereupon a spring 221 (Fig. 6) connected to the clutch-control shaft 209, rocks the clutch control shaft back to normal, and enables the spring 220 to restore the clutch collar 203 and lever 218 with its thereto connected arm 213 to their normal positions to disengage the clutch connection prior to the return of the depressed cam-slotted sector 185.

Therefore, although the depressed sectors 185, on their return to normal under the influence of their springs 187, rock the differential shaft 191 reversely, this reverse rotation is not transmitted to the master wheel 205. A spring 223 (Fig. 6) connected to an arm 224 projecting from the differential shaft 191, insures the return of the latter with its arms 190, to normal.

As shown, for instance, in United States patent to Wahl, 1,270,471, issued June 25, 1918, the cross totalizers which, in the Elliott-Fisher machine, are mounted on the opposite ends of the traveling key carriage, are controlled as to the amounts registered therein, by the main differential mechanism.

In the present instance, supplemental frames project from the opposite sides of the traveling key carriage 55.

These auxiliary frames each include spaced inner and outer side walls 225, 226 (Fig. 6), the inner walls being secured to the sides of the hood 178 of the traveling key carriage 55. Pairs of horizontal, parallel guide rods 227 arranged in vertical relation connect the outer walls 225 to the inner walls 226, and hangers 172 depending from opposite ends of the overhead traveling rail 182 connect with the outer walls 225 to afford additional support and rigidity.

The guide rods 227 form ways for the wheeled cross-totalizer trucks 228 (Figs. 3 and 23) adapted for limited travel thereon.

Right and left cross totalizers 229 and 230, respectively, are detachably and adjustably secured to the wheeled trucks 228 to travel therewith, and are so arranged that normally, entry of an amount digit by digit into the column totalizers will be accompanied by entry of the same amount simultaneously in both cross totalizers.

In attaining this result, the respective cross totalizer trucks 228 are each equipped with a pick-up link 231 (Fig. 3) pivoted at 232 to a bracket 233 fast on its respective truck 228 and adapted to coact with means hereinafter explained to arrest the travel of the trucks and cross totalizers while the key carriage is travelling through a computing zone. Springs 234 restore the cross totalizers to their right hand limits of travel upon the release of the pick-up links as the key carriage passes out of each computing zone.

A master wheel shaft 237 is journaled in a sub-frame 235, 236 (Figs. 6, 22, 27 and 46), fastened within each cross totalizer supporting frame to a back plate 256 extending between and connecting the lower ends of the side walls 225 and 226. The shafts 237 are each equipped with a master wheel 238, a clutch mechanism, and an intermediate transmission gear 239, which are like the similar mechanisms heretofore described in connection with the column totalizers, and need not be again explained.

Differential segments 240, like the differential segment 195 of the differential mechanism for the column totalizers, are pivoted on short rods 241 in the sub-frame 235, 236 for engagement with the cross totalizer intermediate gears 239, and are adapted to slide laterally along their pivotal supports.

For the purpose of transmitting the differential movement of the differential shaft 191 of the column totalizers to the differential segments 240 of the cross totalizers, the main differential shaft 191, at its opposite ends which protrude beyond the side walls of the key carriage, carries arms 242 (Figs. 6 and 22) connected by links 243 with similar arms 244 fast on auxiliary differential shafts 245 journaled in the respective cross totalizer main frames 225, 226.

Shorter links 246 (see also Fig. 27) connect cranks 247 on the cross totalizer differential shafts 245 with their respective differential segments 240.

The lower ends of these links 246 are slidable along studs 257 projecting from the cranks 247, to accompany the differential segments 240 when the latter are slid axially.

Similarly, to control the transmission clutch mechanisms for the cross totalizer master wheels 238 simultaneously with the coupling and uncoupling of the transmission clutch 200, 203 for the column totalizer master wheel, the protruding ends of the main clutch control shaft 209 (Fig. 6) carry arms 248 connected by links 249 with corresponding arms 250 fast on auxiliary clutch control shafts 251 journaled in the respective cross totalizer main frames.

Arms 252 (Fig. 46) secured to the respective auxiliary clutch control shafts 251 pivotally support slotted links 253, adapted to embrace the headed studs 254 of the auxiliary clutch control arms 255 identical with the clutch control arm 213 (Fig. 47), the several clutch mechanisms for the transmission of differential movement to the respective master wheels of the column and cross totalizers being constructed alike and normally synchronously operable.

As shown in United States patent to Kurowski, 1,835,165 heretofore referred to, subtraction is effected on the column totalizers by providing the differential transmission mechanism with a wide reversing pinion 260 (Figs. 6, 22 and 46) slidably mounted on a supporting stud 261 extending between and fastened in the sub-frames 179, adjacent the intermediate transmission gear 196 and the differential segment 194.

A grooved hub 262 fast with the wide reversing pinion 260, accommodates a pin on the upper arm of a lever 263 secured to an add-subtract shaft 264, the lower arm of which lever likewise carries a pin entered in a groove formed in the hub 265 of the differential segment 194, which segment and hub may be slid laterally on its rod 195, the link 192 likewise sliding with the segment, on its long pivot pin 222.

The add-subtract shaft 264 passes from front to rear through the hood in which it is suitably journaled, the forward end of the shaft carrying an index finger 266, (Figs. 22 and 23), adapted to rock with the shaft.

A spring 267 (Fig. 22) normally aids in restoring the add-subtract shaft to, and yieldingly retaining it at its counter-clockwise limit of rotation, wherein the upper arm of the lever 263 holds the broad reversing pinion 260 out of mesh with the intermediate transmission gear 196, the lower arm of the lever maintaining the differential segment 194 in mesh with such intermediate pinion.

Rocking the add-subtract shaft 264 clockwise causes the lever 263 to shift the reversing pinion to the right along its pivot 261 into mesh with the intermediate gear 196 and simultaneously shifts the differential segment 194 to the left along its rod 195 to disengage it from the intermediate gear and mesh it with the wide reversing pinion, whereupon amounts set up in the machine are subtracted digit by digit from the amount registered on the column totalizer.

Similar state controlling shafts 268 (Figs. 6, 22, 23, 27 and 46) journaled in the respective right and left cross totalizer frames and extending from front to rear thereof, carry shift levers 269, the upper ends of which engage the grooved collars 270 of reversing gears 271 slidably journaled on sub shafts 272 supported in the sub-frames 235 of the main cross totalizer frames.

The lower ends of the shift levers 269 engage the grooved hubs 273 (Fig. 27) of the cross totalizer differential segments 240 fulcrumed on the rods 241.

Clockwise oscillation of the state-control shafts 268 rocks their respective levers 269 to shift the broad reversing gears 271 from their normally idle positions at the left of the cross totalizer transmission pinions 239, into mesh with such pinions and simultaneously disengages the cross totalizer differential segments 240 from the transmission pinions 239 and shifts them into mesh with the wide reversing gears 271, to condition the differential mechanism for direct subtraction.

Pointers 274 on the forward ends of the state control shafts 268 indicate the condition, as "Add" or "Subtract".

The foregoing features are broadly old, as shown in the prior art referred to in connection with the description, and constitute a part of the present invention only insofar as they combine with the novel features hereinafter disclosed, to attain the desired results.

*Power-actuation*

One of the objects of this invention is to provide novel and improved power-actuating means for the calculating mechanism.

In attaining this end, a train of mechanism connects the motor 76 (Fig. 5) with a power actuator 275, best shown in Figs. 4 and 5.

It will be remembered that the counter-shaft 102 (Figs. 4 and 5) is driven by the motor through worm 97, worm wheel 99 and friction clutch 100, 101, the latter being held normally effective by the friction plate spring 104.

A normally idle gear wheel 276 journaled on the counter-shaft 102 adjacent the plate spring 104, meshes with a wide spur wheel 277 of a pair of wheels 277, 278 fast on a stub shaft 279 journaled in bearings in the gear housing 86. The wheel 278 is a spiral gear in mesh with a similar gear 280 fast on a shaft 281 journaled at its ends in the upwardly projecting arms of the brackets 155 (Figs. 1 and 3) at the rear corners of the line space frame, and at a central point in a casing 282 (Fig. 4) mounted on the gear housing 86.

The shaft 281 lies at right angles to the stub shaft 279.

Eccentric disks 283 (Fig. 5), one of which is fast on the shaft 281 intermediate its ends, and the remaining eccentric disks being housed in chambers formed in the inner faces of the line space frame extensions 155, turn in straps 284, the upwardly extending rods 285 of which are pivotally connected at 286 to the horizontally extending vibrator bar or power actuator 275 arranged transversely of the machine at the rear of the traveling key carriage.

Conveniently, the vibrator bar or power actuator 275 carries blocks 287 to which the upper ends of the eccentric rods 285 are pivoted, and pilots 288 extending upwardly from the stationary shoulders of the extensions 155, and from the gear casing 282, pass through apertures in the vibrator bar 275 to guide the latter in its vertical reciprocation.

Springs 290 surrounding the pilots, and resting on the shoulders of the extensions 155 and on the gear casing 282, serve to cushion the vibrator bar at the lower end of its reciprocatory travel.

A double-faced clutch member 291 (Figs. 4 and 5) having a non-round bore fits upon and slides along an axially adjustable sleeve 292 of similar shape in cross-section, such sleeve being splined on the counter shaft 102 by a feather 293.

The forward clutch face (left in Fig. 4) of the double-faced clutch member 291 is adapted to co-act with a clutch face 294 on the rear end of the hub of the loose gear wheel 276.

The rearward clutch face of the double-faced clutch member 291 opposes a co-acting clutch member 295 on the inner end of the hub of the intermediate gear wheel 164 hereinbefore referred to as constituting a part of the transmission gear train by which the line space frame and key carriage are motor-driven in line spacing direction and return.

Normally, the double-faced clutch member 291 lies intermediate and out of engagement with both of its cooperating clutch members 294 and 295, so that no power may be transmitted to either the power actuator 275 or to the gear train for driving the line space frame.

*Manual control of power actuator*

The clutch 291 may be controlled to mechanically connect the motor and the power actuator, by the following means.

Located adjacent the main switch 81 (Fig. 5), and within easy reach of the hand of the operator, is a power actuator switch lever 296 fast on a shaft 297 journaled in the line space frame, alongside the left hand stretch bar 54 thereof. The rear end of the shaft 297 is bent laterally and connected by a link 298 with a second shaft 299 suitably journaled at its outer end in the left-hand bracket 155 and at its inner end (not shown) in the gear housing 86.

A link 300 connects an arm 301 on the inner end of shaft 299 with the forward end of a clutch control lever 302 pivoted at 303 to the gear housing. A stud 304 on the rear end of the clutch control lever enters and is adapted to traverse a vertical slot 305 formed in a vertically-arranged floating lever 306 pivoted at 308 to and depending from an angular slide 307. The lower end of the floating lever is pivotally supported at 309 by one end of a short link 310, the opposite end of which is connected at 311 to one end of a normally idle shift lever 312 fulcrumed at 313 to a bracket 314 mounted on the rear rail 53 of the line space frame.

One leg of the angular slide is slotted as at 315 to embrace a headed stud 316 for guidance and support.

The remaining leg of the slide 307 is fastened to a clutch shifting rod 317 extending parallel with the counter-shaft 102 and slidable in and out relatively to the gear housing 86. The rear or outer end of the clutch shifting rod 317 projects through and is guided by the back plate 103.

The inner end of the rod 317 carries a clutch shifting fork 318, the arms of which embrace the grooved collar of the double-faced clutch member 291.

Rocking the switch lever 296 upwardly (Fig. 5) operates the foregoing linkage to rock the rear end of the clutch control lever 302 downwardly, to cause its stud 304 moving about the pivot 303 in the arc of a circle, to rock forwardly the upper end of the floating lever 306 on its supporting pivot 309 as a center, whereby the angular slide 307 is advanced with the clutch shifting rod 317 and fork 318 to shift the double-faced clutch 291 forwardly along the square sleeve 292 into engagement with the clutch face 294 of the loose gear wheel 276 and thus complete the mechanical drive connection between the motor 76 and the vibratory bar or power actuator 275.

Simultaneously with the completion of this mechanical drive connection, a motor circuit is completed, as follows:

Referring to Fig. 5, a short link 319 connects the clutch control lever 302 with an arm 320 fast on a stub shaft 321 suitably journaled in the frame 77 supporting the motor. A second arm 322 fast on the stub shaft 321 carries a thrust finger 323 insulated at its free end, as indicated, and resting against the forward end of a spring-retracted stud contact 324. The rear end of the stud contact passes loosely through a hole formed in the stationary contact 90 in line with the movable contact 91, and terminates in a head 325, the spring 326 tending at all times to advance the stud contact towards the thrust-finger 323 to hold the head 325 against the stationary contact 90 and out of engagement with the movable contact 91.

When the operator rocks the power actuator control lever 296 upwardly to turn the clutch control lever 302 and complete the mechanical drive connections above explained, the lever 302, through the link 319, arm 320 and shaft 321, rocks the arm 322 and forces the thrust finger 323 rearwardly (from the front of the machine) against the spring-pressed stud contact 324 to slide the latter rearwardly against the tension of its spring 326, through the hole in the stationary contact, until the head 325 impinges the opposed movable contact 91, thus closing a circuit through the movable and fixed contacts 91 and 90 and the shiftable contact stud 324 to energize the motor for operation.

The power actuator control lever 296 and connected parts remain in either of their set positions, until shifted to the other.

Therefore, assuming the main switch 81 to have been previously closed, the operator, by rocking the power-actuator switch 296 to its "on" position, completes both the mechanical drive connection between the motor and the power actuator, and the electric circuit through the motor, whereupon the motor, through the mechanical train of connections leading to the eccentric shaft 281 and the eccentrics 283 thereon, imparts a continuous up and down reciprocation to the vibratory bar 275.

By manually rocking the power actuator control lever 296 downwardly to its "off" position, the thereto-connected linkage above described, swings the forward end of the clutch control lever 302 downwardly and its rear end upwardly, whereby the stud 304 in its traverse of the slot 305, rocks the upper end of the floating lever 306 rearwardly to disengage the double-faced clutch 291 from its co-acting clutch face 294 fast with the loose gear wheel 276 and thus interrupt the mechanical train of connections between the motor and the vibratory bar 275.

At the same time, the link 319 connected to the clutch control lever 302, rocks the shaft 321 to withdraw the arm 322 and thrust finger 323, thereby freeing the sliding contact stud 324 to the action of its spring 326 which snaps the contact stud forwardly until the head 325 collides with the rear face of the stationary contact 90 and arrests the stud contact, thus interrupting the circuit through the motor.

It will be seen that the contact stud 324 completes the same electrical circuit through the motor, that is closed when the line spacing frame is to be power driven in either direction over the platen.

One of the objects of this invention is to silence the power actuator when it is desired to shift the line space frame and traveling key carriage towards and from the operator, and in the present instance, this object is effected as an incident to conditioning the machine for such movement of the line space frame.

At this point, it may be pointed out that in this invention, the main circuit control 81 and the power actuator control 296 are separate and independent to enable the operator to utilize the power of the motor for returning the traveling key carriage to the beginning of a line, and to shift the line space frame and key carriage to and fro over the platen, while the power actuator remains idle.

This separation of the controls enables the accomplishment of any of the motor-driven functions of the machine to the exclusion of the others.

*Establishing line spacing frame drive disables power actuator drive*

Setting the motor driven mechanism for causing the line spacing frame 53, 54, to traverse the platen 51, operates to silence the power actuator drive, which latter is automatically re-established upon the discontinuance of the line spacing frame drive.

This feature enables the entire power of the motor 76 to be employed either to shift the line spacing frame, or to operate the power actuator, the mechanism being so arranged as to interrupt the transmission of power to the power actuator, if previously established, when it is desired to traverse the line spacing frame, as well as to prevent operation of the power actuator, in case it is desired to traverse the line spacing frame prior to operation of the power actuator, and during the travel of the line spacing frame.

These results are conveniently attained in a very simple, and efficient manner.

Assume that it is desired to effect motor-driven movement of the line spacing frame either forwardly or rearwardly, the power actuator drive being effective.

Either knee lever 140 (Fig. 3), when rocked, operates link 146 in one direction or the other to swing the universal bail 147 in or out, which, because of its engagement with the grooved disk 151, shifts the reversing shaft 152 to the right or left to engage one or the other face of the intermediate clutch member 160 (Fig. 4) with its co-related clutch face on bevel gear 156, or 157 (Fig. 5) and determine the direction of travel of the line spacing frame.

Also the reversing shaft 152, in its movement in either direction, shifts the high point of the cam 167 (Fig. 5) from the path of the finger 168 on the movable contact arm 91, to enable the spring 169 to swing the contact arm 91 into engagement with the head 325 of the contact carried by the stationary contact plate 90, thus completing the motor circuit.

If the contact pin 324 has already been projected into engagement with the movable contact arm 91 to complete a circuit through the motor by the operation of the power actuator control arm 296, displacement of the cam 167 relatively to the finger 168 of the contact arm 91 has no different effect, under the particular adjustment noted, the circuit being already completed. When the power actuator train is ineffective, however, the spring 326 has withdrawn its contact pin 324 from the movable contact arm 91, in view of which condition, the displacement of the cam 167 relatively to the finger 168 enables spring 169 to rock the contact arm 91 to effect the engagement thereof with the retraced contact pin 324 to complete a circuit through the motor.

The axially shiftable reversing shaft 152 for the line spacing frame also carries a pair of opposed cams 327, 328 having a reduced intervening area normally occupied by one end of a disabling arm 329, pivoted at 313 to the bracket 314 and fast with the shift lever 312, one arm of which latter, it will be recalled, is connected to one end of the short link 310 to whose other end the lower end of the floating lever 306 is pivoted.

A spring 330 presses the free end of the disabling arm 329 against the low point between the cams, thereby normally retaining the shift lever 312 and the link 310 stationary.

However, the reversing shaft 152, when axially shifted in either direction, forces one or the other of the cams 327, 328 beneath the free end of the disabling arm 329 to rock the latter and its shift lever 312 clockwise, whereby to draw the link 310 in the same direction and with it the lower end of the floating lever 306.

In the assumed position of the parts, the clutch control lever 302 has been rocked counter-clockwise with its stud 304 located at or near the lower end of the slot 305 in the floating lever, such stud 304 constituting the fulcrum about which the floating lever rocks under the pull of the shift lever 312, and since the lower end of the slot lies near the lower end of the floating lever, the throw of the upper end of the floating lever in counter-clockwise direction is increased beyond that imparted to the lever by the clutch control lever 302, so much so as to not only cause the floating lever 306 to disengage the double-faced clutch member 291 from its co-acting face 294, thus to interrupt the transmission of power from the motor to the power-actuator, but also to engage the opposite face of the double-faced clutch member with its co-acting clutch face 295 on the loose intermediate gear wheel 164 of the train of mechanism leading from the driving countershaft 102 to the line spacing frame clutch reversing shaft 152, whereby to establish the mechanical drive from the motor to the line spacing frame.

Immediately upon release of the operated knee lever 140, its spring 170 (Fig. 2) assisted, it may be, by the centering mechanism shown on the left hand shaft 141 in Fig. 3 but not described, restores the bail 147, grooved disk 151 and clutch reversing shaft 152 to their normal positions, the shaft on such return, reinserting the high point of its cam 167 beneath the beak 168. Under the assumed conditions, no disengagement of the contact arm 91 from the contact plate 90, 324 occurs at this time. Also the shaft 152 shifts the low point between cams 327, 328 to register with the free end of the disabling arm 329, whereupon the spring 330 restores the shift lever 312, link 310 and floating lever 306 counter-clockwise to the positions from which they were moved, the return movement imparted to the floating lever being sufficient to disengage the clutch 291 from the clutch face 295 and re-engage clutch 291 with its clutch face 294, thus disestablishing the mechanical drive from the motor to the line spacing frame, and automatically re-establishing the transmission of power from the motor to the power actuator 275.

The power actuator switch control 296, when depressed to its "off" position, rocks the clutch control lever 302 to raise the stud 304 in its slot 305, thereby imparting a throw to the floating lever 306 sufficient only to return the clutch 291 to its neutral point, to cut off the transmission of power to the power actuator.

Also the clutch control lever 302 operates through link 319 to rock the stub shaft 321 with its arms 320, 322 in clockwise direction, withdrawing the insulated finger 323 from the contact pin 324, whereupon the spring 326 retracts the pin from engagement with the contact 91, thus breaking the motor circuit.

If, with the parts in their idle positions, it is desired to traverse the line spacing carriage along the platen, the reversing shaft 152, when shifted by either knee-operated lever 140, will operate, as above explained, to cause its cam 167, to move away from the beak 168 to enable the spring 169 to rock the contact arm 91 into engagement with the contact stud 324, and also to shift cam 327 or 328 underneath the free end of the disabling arm 329 to rock the shift lever 312 and draw its link 319 forwardly, swinging the floating lever 306 counter-clockwise from its normal median position, to engage clutch member 291 with the clutch face 295 on the gear 164 of the line space frame drive mechanism.

It will be observed that the clutch control lever stud 304 being at the upper end of the slot 305, the throw imparted to the floating lever is but about half that imparted when the stud is at the lower end of the slot.

The return of the parts to normal upon release of the actuated knee lever 140 is as heretofore described.

*Tension adjusting means for friction spring*

The novel arrangement of the gearing in the casing 86 (Fig. 4) differing from that shown in Foothorap, 1,904,127, enables the adjustment of tension of the friction clutch spring 104 with greater facility.

The friction clutch mechanism 99—101 is essential to the operation of the various power-driven functions of the machine, and must be effective to pick up the various loads required, and yet, in the presence of an unusual strain or resistance, must slip to avoid injury and breakage of the gear elements and their driven connections.

The tension of the spring 104 should be adjusted to maintain the clutch effective under ordinary loads, and permit slippage under extraordinary loads.

Also, in the course of time and after long usage, the spring may require further tensioning to perform its purposes.

To these ends, the several elements mounted seriatim on the counter-shaft 102, behind the friction spring 104 are so arranged as to form, in combination, a means to control the tension of the friction spring.

Thus, the intermediate driven gear 276 which abuts the friction spring 104, is loosely mounted on the countershaft 102 and is of less width than the power actuator driving gear 277 with which it meshes, to enable a lateral adjustment of the intermediate gear while still remaining in mesh with the gear 277.

The non-circular sleeve 292 interposed between the rear face of the intermediate gear 276 and the drive gear 164 for the line spacing frame is slidable axially of the shaft 102 and splined thereto to turn therewith, and the drive gear 164 is journaled on a flanged collar 331 abutting the outer end of the sleeve 292 and loose on the countershaft 102 near its outer end. The shaft is threaded, as at 332, to accommodate a split lock nut 333 of suitable form (see also Fig. 5). An antifriction washer may be interposed between the rear face of the drive gear 164 and the lock nut, the function of the lock nut being to retain the foregoing train of elements in place on the shaft, and to enable adjustment of the tension of the friction spring 104.

Adjustment of the tension of the plate spring 104 is easily effected by removing the rear cover plate 103 (Figs. 3 and 4) of the gear casing, thus exposing the lock nut 333, the clamping action of which may be relieved and the nut then rotated in one direction or the other to increase or reduce the tension of the spring.

Pressure obtained by turning the lock nut farther on the threaded portion of shaft 102, for instance, is transmitted through the collar 331 and the gear 164 to the rear end of the sleeve 292, which is thus pushed forward slightly on the shaft, the forward end of the sleeve in turn operating to crowd the gear 276 against the hub portion of the friction spring 104 to increase its tension.

Reverse rotation of the lock nut enables the tensioned spring 104 to slide the train of mechanisms rearwardly, and thus reduce the tension of the spring.

This arrangement provides a simple, and readily affected spring tension control without necessitating dismantling the train of drive gearing, as was necessary heretofore.

Speed governor

A novel form of speed responsive means is provided to control the speed of rotation of the drive shaft 98 and maintain it constant, such novel means being of simple design, inexpensive to manufacture, and comprising but few parts, thereby reducing the liability of getting out of order.

To these ends, the cylindrical portion of the housing 86 (Figs. 3, and 53-56) is extended towards the right of the machine (left in the figures) and terminates in a flange 675 to accommodate a hollow circular cap 676 fitting thereover to enclose the projecting end of the drive shaft 98. A multiple-armed spider 677, the hub of which is pinned to the shaft 98, as indicated in Figure 55, turns with the shaft within the compartment formed by the extended flange and cap. A weighted arm 678 is pivoted at 679 to the outer end of each of a pair of diametrically opposed arms of the spider, the weighted arms arranged in parallelism on opposite sides of the shaft. Adjustable spring 680 connect the free end of each weighted arm 678 to the opposed weighted arm at points near the pivotal supports of such arms, to draw the arms towards each other evenly, and to restrain the arms against centrifugal action, until the shaft attains a predetermined speed of rotation.

Each weighted arm carries near its free end a control pin 681, projecting inwardly from the inner face of the arm and arranged at such an angle to its supporting arm as to extend radially relatively to the shaft 98, the control pins preferably being diametrically opposed with their inner beveled ends normally in contact with the conical periphery of a control member 682 which may be journaled on and slidable axially along the projecting end of the drive shaft. This control member embraced by the centrifugally operable arms 678, automatically governs the make and break switch 85, 87 to regulate the motor circuit, whereby to maintain the speed of rotation of the motor shaft as nearly constant as possible.

A stop 683 fast on the extreme end of the drive shaft, prevents accidental disconnection of the control member 682 and the shaft, the conical control member having a long bearing on the shaft to reduce wear and prevent cocking of the control member thereon.

The stationary contact 87 of the make and break switch is insulated from the gear casing 86, the movable contact 85 of the switch being mounted on a swinging arm 684 urged by a spring 685 towards its stationary contact. An insulated link 686 connects the swinging arm with one end of a transmitting lever 687 pivoted intermediate its ends at 688 to the cap 676, the opposite end of the lever being bent inwardly to pass through a slot in the cap and contact the annular base of the conical control member 682. A spring 689 connected to one arm of the transmitting lever 686 and superior to spring 685 maintains such contact.

As the machine comes to rest upon the interruption of the motor circuit, the pressure exerted by the springs 680 drawing the centrifugal arms 678 towards each other, is sufficient to cause the control pins 681 to cam the shiftable control member outwardly, (to the left in Figs. 5, 54 and 55). The conical control member, in turn, rocks the transmitting lever 687 counter-clockwise against the tension of the spring 689 and through the link 686, swings the contact arm 684 to engage contact 85 with contact 87 to close the circuit at this point.

Consequently, when the motor circuit is completed by operation of the main switch 81 (Fig. 5) and either the power actuator switch control 296, or the knee-operated, line space frame shifting switch 91, 90, for instance, to energize the motor 76 to rotate the drive shaft 98, and actuate the desired parts, the spider 677 with the centrifugal arms 678 pivotally attached thereto, rotates with the shaft.

As the speed of rotation of the shaft 98 and the spider increases, the centrifugal action of the weighted arms 678, overcoming the tensions of the springs 680, causes the arms to rock outwardly withdrawing the control pins 681 from contact with the reduced end of the conical control member 682, and thus freeing the latter to the pressure exerted against its base by the spring-pressed bent end of the transmitting lever 687, which forces the conical control member inwardly along the shaft 98 and between the opposed ends of the control pins. The clockwise rocking of the lever 687 operates through the link 686, to swing the movable contact arm 684 outwardly and separate the contact 85 from the stationary contact 87. The motor circuit is thus interrupted and as the speed of rotation of motor shaft 98 slackens, the centrifugal action becomes weaker and the springs 680 re-assert their control of the centrifugal arms 678 to draw them towards each other and cause their pins 681 to cam the conical control member 682 outwardly to again engage the contact points 85, 87.

This successive making and breaking of the circuit at this point continues in extremely rapid alternation and results in the provision of a fluttering contact during the operation of the machine.

Interruption of the motor circuit by throwing off the main switch 81, power actuator control switch 296, or the knee controls, results in closing the automatic switch 85, 87 in the manner previously set forth.

Studs on the pivoted centrifugal arms 678 enter slots 690 formed in the intermediate arms of the spider 677 to limit the rocking movement of the centrifugal arms in opposite directions.

Numeral key bank

One of the functions of the power actuator is to relieve the operator of the labor of actuating the calculating mechanism by manual depression of the numeral keys.

Commonly, the Elliott-Fisher key carriage is equipped with a standard keyboard of four banks or rows (Fig. 2), the rearmost bank comprising the numeral keys from "1" to "9" and "0" across the key carriage.

In the present invention, the individual key mechanisms forming the numeral key bank differ materially from the usual key structure of the Elliott-Fisher machines, to afford complete selectivity, speed of operation, ready connection with and disconnection from the power actuator, with a minimum of labor, and at the same time, so contrived that the calculating mechanism can only be operated through the power actuator.

Furthermore, the invention is so designed as to prevent or render harmless any accidental or intentional mismanipulation of the numeral keys, as by retaining them in depressed position, either while the power actuator is in operation, or in a deliberate attempt to effect an erroneous operation by depressing a key prior to starting the power actuator in operation, and retaining such key depressed while shifting the power actuator control lever 296 to "on" position.

To these and other ends, therefore, the respective numeral keys are of sectional or complementary lever construction, each comprising a setting lever 335 (Figs. 2, 6–11, and 13–16) and a printing lever 336 concentrically pivoted at their rear ends on the usual Elliott-Fisher fulcrum rod 337 ("25" in Foothorap, 1,251,361), suitably supported in the sides of and extending transversely across the back of the traveling key carriage.

The composite numeral keys will first be described when the machine is adjusted for calculating operations, wherein the companion setting and printer levers 335 and 336 operate separately and independently of each other.

Later the description of the connecting means for the companion levers will be set forth, the adjustment of such means also involving the silencing and release of the automatic state-controls hereinafter to be set forth.

Individual springs 338 and 339 connected to the respective complementary or companion levers 335 and 336 of each key structure, restore the keys to, and yieldingly maintain them in their normal raised positions.

A train of linkage, such as that shown in United States patent to Foothorap, 1,251,361, connects the printing lever 336 with a down-strike type bar 340 (Figs. 2 and 6) pivotally mounted in a type bar hanger 341 secured to the type bar segment 58.

A laterally offset horn 342 projecting upwardly from each printer lever 336 carries an impact stud 343 extending from the side thereof and lying in the plane of movement of a cam face 344 mounted on the appropriate lever of a series of actuator levers 345.

The digital actuator levers extend rearwardly into a housing secured to and projecting backwardly from the rear wall of the traveling key carriage over the power actuator 275, such housing including the side plates 346 supporting a horizontal rod 347 extending transversely of the key carriage, and on which the rear ends of the actuator levers 345 are individually pivoted.

Links 348 connect the respective actuator levers with their corresponding digital cam-slotted sectors 185 of the differential mechanism, thus bringing the actuator levers under control of the return springs 187 of the sectors, which springs normally hold the actuator levers 345 in their elevated positions, shown in Figs. 6–8 and 16, against a transversely extending stop bar 350 mounted in the side plates 346.

The actuator levers 345 lie above and bridge over the power actuator 275, and each is equipped with a truncated leg 349 (dotted lines Fig. 16) depending therefrom and rigid therewith, to afford a lateral brace and guide for a vertical pendant 351 pivotally connected at 352 to its respective actuator lever alongside the leg 349.

Figure 7:
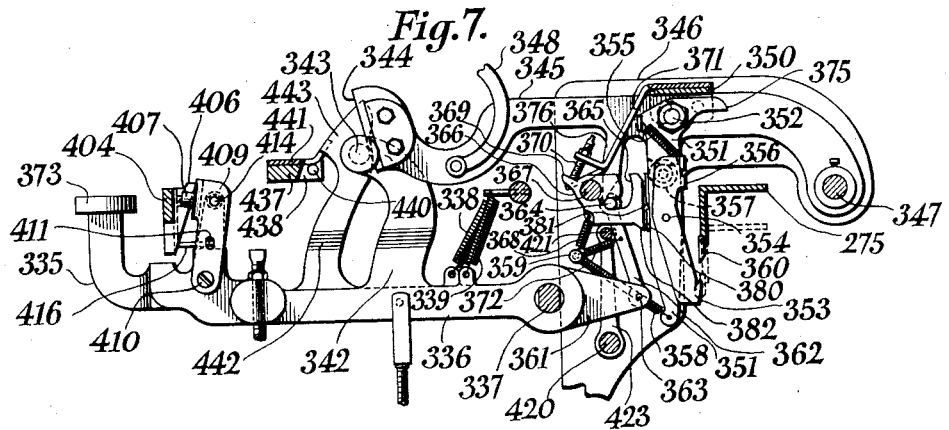
Figure 7 is a detail view in side elevation, partly in section, of a composite numeral key, the power actuator therefor, and the key-controlled connections to couple the power actuator and key mechanism, the parts being in normal position, with the machine conditioned for power actuation.
Figure 8:
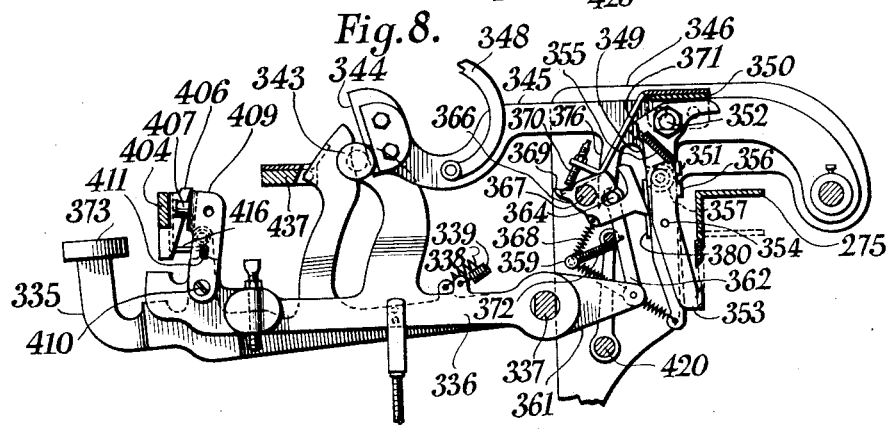
Figure 8 is a similar view, showing the positions of the parts at the moment that the manually operable setting key lever has reached the limit of its depressive movement when the machine is conditioned for power actuation of the keys.
Figure 9:
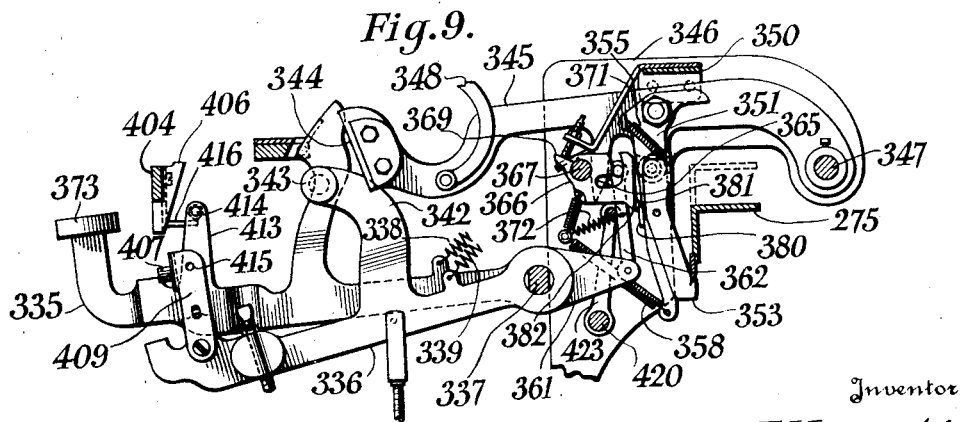
Figure 9 is a similar view, showing the positions occupied by the parts at the end of the power-actuated down stroke of the key.

The enlarged head of a rivet 357 mounted in each pendant (as indicated in Figs. 7, 8 and 9) extends over the lower end of the adjacent truncated leg 349 for guidance and to impart a measure of rigidity to the pendant.

The pendants 351, in turn, constitute supports for the individual couplers 353 pivoted intermediate their ends at 354 to their respective pendants, springs 355 connecting ears on the respective pendants and their corresponding couplers to normally rock the couplers rearwardly beyond the lower ends of the pendants, to facilitate the engagement of the vibratory bar or power actuator 275 with the lower hooked ends of the couplers.

Lugs 356 on the couplers 353 above their pivotal supports 354 extend over the rear edges of their respective pendants 351 to limit the spring-urged movement of the couplers relatively to their pendants.

Springs 358 connected to the lower ends of the pendants and to an anchor rod 359, mounted in the side walls 346, normally retain the pendants in their forward positions with the hooked ends of the couplers out of the path of the power actuator 275, which latter may be provided with a wear-resisting blade 360 to engage the wear-resisting hooked ends of the couplers.

It will be remembered that in operation, the vibratory bar 275 is reciprocating through a comparatively short excursion at great speed, the couplers 353 lying just outside of the path traversed by the power actuator.

The companion members 335 of the composite numeral key levers are utilized to position the couplers for engagement by the power actuator, and to prevent the depression of another key prior to the return of the key first depressed.

To enable the setting levers 335 to position the couplers 353 for engagement by the power actuator 275, each setting lever is provided with a tail 361 extending rearwardly from the fulcrum bar 337. A link 362 pivotally supported by its lower end at 363 to the tail 361, extends upwardly and carries a stud 364 entered in and adapted to traverse an angular slot 365, formed in a coupler-adjusting member 366.

In the form of invention herein shown, these coupler-adjusting members are substantially rectangular in outline, and each is individually pivoted near its upper left hand corner (Figs. 7-9) on a cross-rod 367 supported at its opposite ends in the side plates 346.

Figure 13:
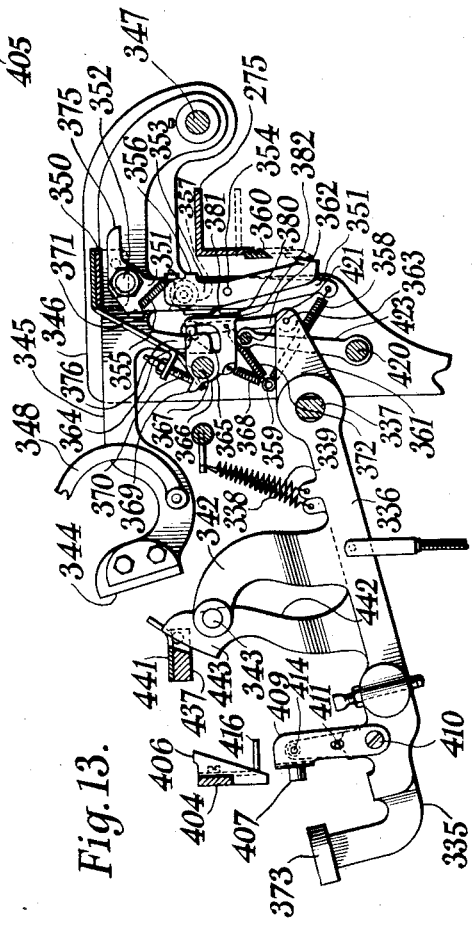
Figure 13 is a sectional detail view in side elevation of the numeral key mechanism conditioned for manual operation, the parts being shown at the end of the down stroke of the key.
Figure 22:
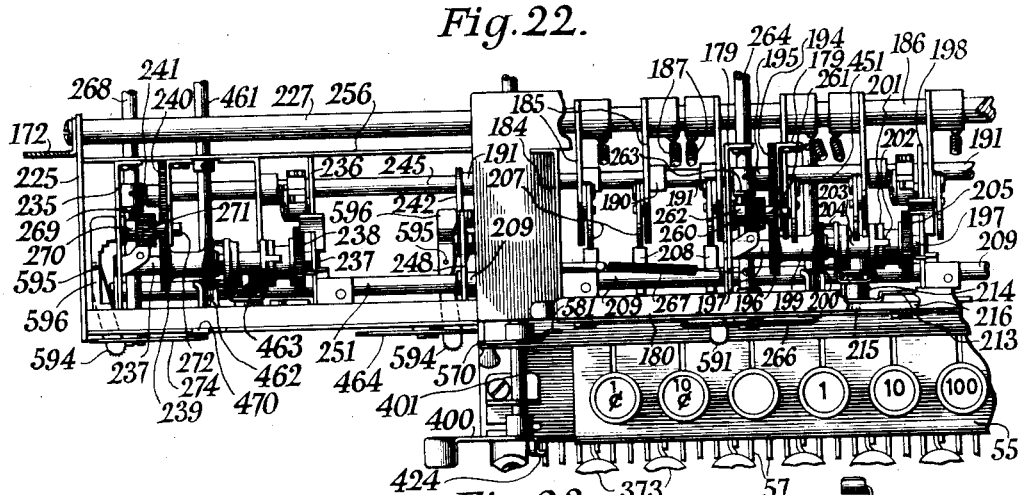
Figure 22 is a fragmentary top plan view of the differential mechanisms for the column totalizers and for the left hand cross totalizer, respectively, and the manually operable state controls therefor.

Springs 368 normally hold the respective coupler-adjusting members in their retracted positions, Figs. 7, 9 and 13, wherein a fin 369 on each adjusting member contacts its appropriate adjustable stop 370 mounted in a flanged and slotted guide plate 371 (Fig. 16), through the slots in which the actuator levers 345 project for guidance, such guide plate being conveniently supported along its rear edge by the transverse stop bar 350.

With the coupler-adjusting members 366 in their normal positions and the machine conditioned for the power-actuation of the printing and calculating mechanisms, springs 372 connected to the respective thrust links 362 normally draw the latter forwardly to seat the studs 364 thereof at the inner closed ends of the angular slots 365 of the coupler adjusting members and beneath the overhanging shoulders formed by such angular or L-shaped slots, as shown in Fig. 7, for instance. The coupler adjusting members 366 extend rearwardly from their pivoted support 367 and in the planes of their pendants 351, the members terminating preferably, in squared faces against which the corresponding pendants may abut under the influence of the springs 358, and serving to limit the clockwise rotation of the pendants.

With the parts in the positions set forth, slight pressure on a key cap 373 of the setting lever 335, sufficient only to overcome the tension of the return spring 338 of the lever and the insignificant tension of the return springs 368 and 358 for the coupler-adjusting member 366 and pendant 351, will rock the setting lever 335. This raises the tail 361 of the setting lever and thrusts link 362 upwardly so that the stud 364 lying under the shoulder of the angular slot 365 in the coupler-adjusting member 366, will rock such member counter-clockwise from the position shown in Fig. 7 to that shown in Fig. 8. The rear edge of the coupler-adjusting member, in turn, forces the corresponding pendant 351 with its coupler 353 to position the hooked end of the latter in the path of the vibratory bar or power actuator 275, which thereupon engages the coupler and imparts a staccato movement downwardly thereto, simulating closely the action of an operator's finger in typewriting.

Figure 6:
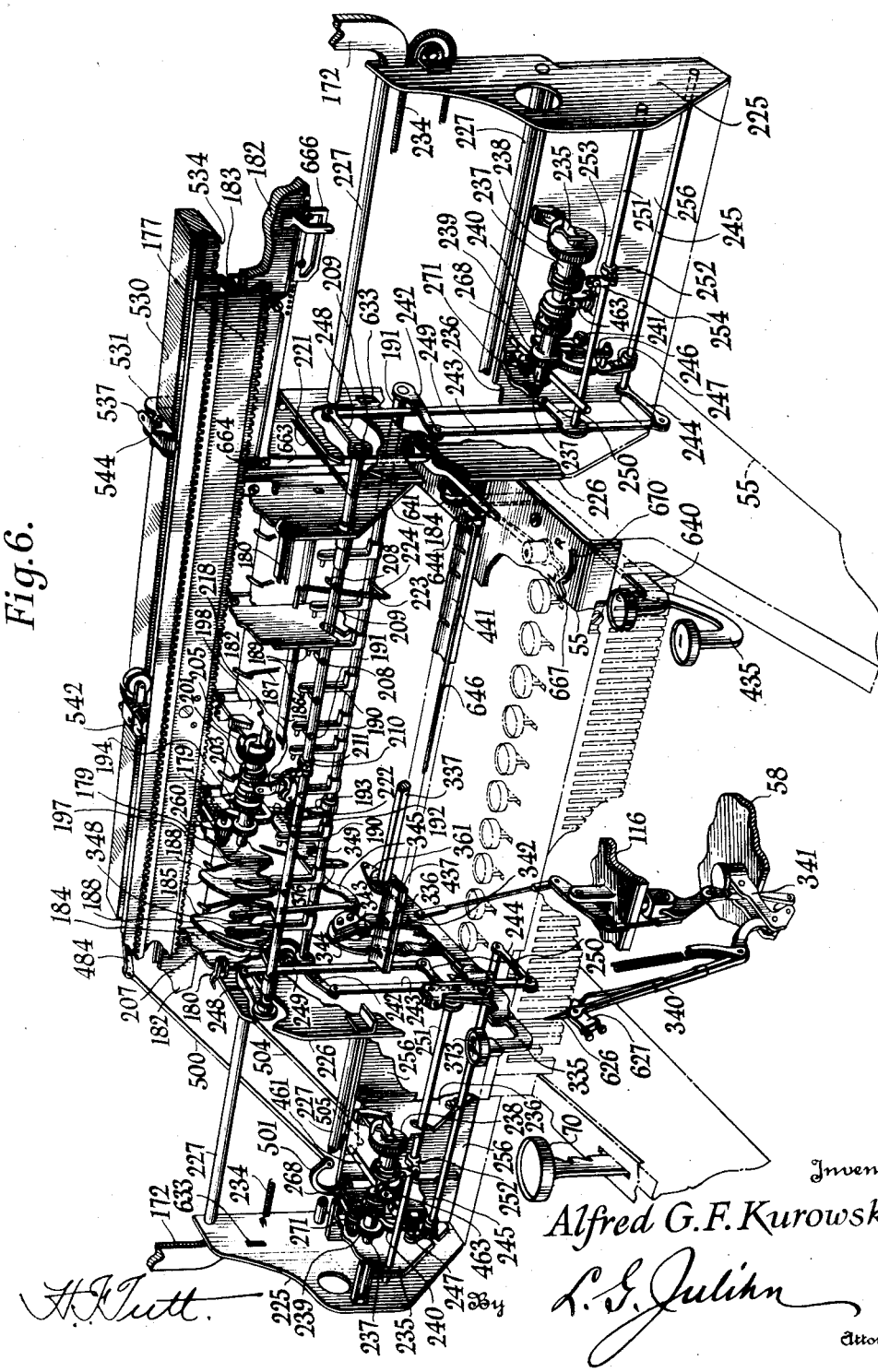
Figure 6 is a fragmentary skeleton perspective, showing principally a type action, and the key control therefor and for the differential mechanisms for the column and cross totalizers which are also indicated.

The coupler 353 draws with it the pendant 351 and the connected actuator lever 345, which, through the link, 348, (Fig. 16) rocks downwardly the corresponding digital cam-slotted sector 185 against the tension of its spring 187, causing the differential cam slot 188 to fit over the pin 189 (Fig. 6) of its corresponding differential arm 190, to rock the arm and the differential shaft 191 through a predetermined arc of travel, against the tension of its return spring 223 (Fig. 6).

As heretofore explained, shoes 207 on the differentially cam-slotted sectors 185 operate to complete a normally interrupted drive train between the main differential shaft 191 and the master wheel 205 for the column totalizers, after which the differential rotation of the shaft 191 is imparted through the segment 194, intermediate wheel 196 and clutch member 200 to the master wheel and thereby transmitted to the totalizers.

Simultaneously, the master wheel clutch control shaft 209 (Fig. 6) rocked by the shoes 207 upon depression of the setting keys 373, acts through arms 248, links 249 and arms 250, to rock the clutch control shafts 251 of the respective right and left cross totalizers to engage the master wheel clutch members of the cross totalizers, and hold them engaged while the differential rotation of the main differential shaft 191 is transmitted through the arms 242, links 243 and arms 244 to the respective differential shafts 245 of the cross totalizers, and thence through the cross totalizer differential segments 240, and intermediate gears 239 to the cross totalizer master wheels 238.

The engagement of the rapidly reciprocating power actuator 275 with the hooked coupler 353 of the particular key selected, is but momentary, the power actuator retreating from the coupler almost immediately after striking the latter, but sufficient impetus is thereby imparted to the actuator and its connections to cause it to complete its full down stroke.

The extent of travel or "throw" of the coupler-adjusting member 366, and hence, of the coupler 353 relatively to the path of travel of the power actuator may be minutely regulated by adjusting the stop screw 370.

To prevent inaccurate registration of amounts on the totalizers by the intentional or accidental failure of the operator to relieve the pressure on the key cap 373 promptly, which otherwise might result in the repeated registration of a single digit in several successive denominational wheels, or in locking up the machine, each of the actuator levers 345 carries a depending spur 376 having an inclined face 377 (best shown in Fig. 20) adapted, upon the downward stroke of the actuator lever, to wipe along the stud 364 of the thrust link 362 which has been elevated by depression of a key. The inclined face of the spur crowds the stud along the horizontal branch of the angular slot 365 in the coupler adjusting member 366 until the stud escapes from beneath the shoulder of the angular slot and into the upwardly extending branch of the slot, which is concentric with the pivot 367 about which turn the coupler-adjusting members 366, thus releasing the coupler-adjusting member from the control of the key, even if the latter remains depressed.

Thereupon the spring 368 (Figs. 8 and 9) acts to restore the coupler-adjusting member 366 to its normal position, the arcuate branch permitting such return relatively to the elevated stud 364.

Withdrawal of the coupler-adjusting member to idle position frees the pendant 351 to the action of its spring 358, which spring snaps the pendant forwardly, together with the coupler 353, to remove the latter from the path of the power actuator 275, which at this time, having started on its up-stroke, has disengaged itself from the coupler. Such disengagement may be facilitated by providing that the actuator lever 345, with its pendant 351 and coupler 353, shall have a down-stroke somewhat in excess of the down-stroke of the power actuator, which excess travel is given the actuator lever and its connected parts by the force of the blow imparted thereto by the power actuator.

The coupler-adjusting member 366, having returned to its normal idle position on the down-stroke of the actuator 345, the spring 358 snaps the pendant 351 and coupler 353 back to their normal positions on the release of the coupler by the power actuator. If desired, an adjustable eccentric abutment 374 (Fig. 2) may be located in the path of the rearwardly extending tail 375 of each of the pendants 351 to limit return movement of the latter under the influence of its spring 358.

Spring 187 (Fig. 16) acting through its cam-slotted sector 185 and link 348, returns the depressed actuator lever 345, with its pendant and coupler to their normal positions, the stop bar 350 serving to arrest the actuator lever in its home position.

As soon as the type on the type bar 340 has struck and been arrested by the platen and the work sheet thereon, the return spring 339 (Fig. 9) restores the printing lever 336 and connected parts to the positions shown in Fig. 7, preparatory to another operation.

Release of pressure on the key 373 enables the spring 338 to restore the setting lever 335 and its connected parts to their normal positions, the tail 361 of the setting lever operating to draw the thrust link 362 downwardly until the stud 364 enters the horizontal leg of the cam slot 365 in the coupler-adjusting member 366, whereupon the spring 372 rocks the thrust link forwardly to reseat the stud at the forward closed end of the horizontal leg, beneath the cam shoulder formed by the slot.

Obviously, a key 373 may be depressed at a time when the vibratory power actuator 275, instead of being in its normal elevated position above the coupler 353, is opposite the coupler upon either its down or up stroke, and while its location in such position is but momentary, there might be a failure of the coupler to connect with the power-actuator before the depressed setting lever 335 is released to the action of its restoring spring 338, and in any event, the action of the setting lever would be arrested prior to the completion of its depression movement, limited though it may be, with a consequent irregularity in the "key touch", which tends to impair the efficiency and speed of the operator.

To obviate these disadvantages, the coupler 353 is shiftably mounted on the pendant 351, as by pivoting the coupler at 354, and providing the spring 355 for yieldingly holding the hooked lower end of the coupler rearwardly, all as heretofore stated.

Therefore, if, following the depression of a key, and the consequent rocking of the coupler-adjusting member 366 to swing the pendant rearwardly, the coupler 353 carried by the pendant, collides with the face of the power actuator 275, the blade 360 being below the hooked lower end of the coupler, the mechanism enables the operator to complete the depression of the key 373 because of the relative movement provided between the pendant and its coupler, and the spring 355 tensioned by such relative movement, will snap the coupler into the path of the power actuator as soon as the latter clears the hooked end of the coupler.

Means is also provided to insure that the coupler 353 shall be engaged by the power actuator, first, in those instances wherein the coupler is prevented, as by collision with the power actuator, from immediate engagement therewith; and secondly, in those instances wherein a very fast operator, although depressing the key 373 sufficiently to shift the coupler into the path of the power actuator, releases the key prior to the actual engagement of the coupler by the power actuator.

To these ends, I contrive to automatically lock the coupler-adjusting member 366 in its effective position wherein it holds its pendant and coupler rearwardly, until the power actuator engages the set coupler, whereupon, incident to the operation of the coupler by the power actuator, the coupler-adjusting member is automatically released and returns to its normal position.

Thus, each pendant 351 carries a laterally extending flange 380 (Figs. 7-9, 13, 19 and 20) notched intermediate its ends, as at 381, to accommodate a tooth 382 formed on the rear edge of its corresponding coupler-adjusting member 366, preferably at the lower right hand corner thereof, as viewed in the figures indicated.

The setting lever 335, upon depression, operates its thrust link 362 to rock the corresponding coupler-adjusting member 366 counter-clockwise, the tooth 382 of such member contacting the flange 380 of the opposed pendant 351 and rocking the pendant and its coupler 353 rearwardly to interpose the coupler into the path of the power actuator 275. The tooth 382 wipes upwardly along the flange 380 until it reaches the notch 381, whereupon the spring 358 returns the pendant forwardly slightly to fit the notch over the tooth and maintain the coupler-adjusting member 366 in its effective position holding the coupler 353 in the path of the power actuator.

Collision of the coupler, as it swings rearwardly, with the front face of the power actuator 275 will not prematurely arrest depression of the setting lever 335, because the coupler will yield on its pivot 354, tensioning the spring 355, which latter snaps the coupler to effective position as soon as the power actuator, on its up-stroke, escapes the coupler.

Printing lever operation

In the normal rest position of the parts, (Fig. 7), the impact studs 343 of the printer levers 336 lie in substantial contact with the cam faces 344 of the actuators 345, which latter are in their elevated positions.

Upon depression of a selected key 373 to connect its actuator 345 and the power-actuator 275 the actuator is driven downwardly in clockwise direction to impart a sharp glancing blow to the associated printer lever 336, thereby driving the printer lever downwardly, and causing it to operate its type bar linkage and type bar 340 (Fig. 2) to effect the imprint of the type corresponding to the key depressed, on the record material.

The actuator accompanies its associated printer lever 336 through the first part of its stroke, but due to the force of impact of the cam face 344 against the stud 343, and the fact that the printer lever 336 has a more extended travel than the actuator 345, the printer lever is given a lead over the actuator, so that when the power-actuator reaches the lower limit of its travel, the printer lever, under the impetus imparted thereto, continues on its down-stroke, as indicated in Fig. 9, against the tension of its return spring 339 to effect the imprint of the type.

Thereafter, the spring 339 restores the printer lever 336, the type bar, and its linkage to their normal elevated positions.

The actuator 345 carried its pendant 351 downwardly, on its counter-clockwise stroke, thereby releasing the tooth 382 of the coupler-adjusting member 366 from the notch 381 in the flange 380 of the pendant 351, and the actuator spur 376 disengaged the setting lever 335 from direct control of the coupler-adjusting member 366, whereupon the spring 368 restores the coupler-adjusting member in clockwise direction, to normal irrespective of the position of the setting lever 335.

Meanwhile, the actuator lever 345 has returned to its normal elevated position, so that the printer lever 336 with its impact stud 343 meets no obstruction during its return to normal.

Guards for vibrating actuator

To enable the power actuator 275 to operate the printing and calculating mechanisms in any position which the key carriage may assume, the power actuator extends across the full width of the machine clearing the shoulders of the brackets 155. To prevent the possibility of injury to the fingers of an operator, should they be inserted between the shoulders on the brackets, and the power actuator, safety devices in the form of guard plates 427 (Figs. 1 and 5) are pivoted at 428 to the brackets 155 and extend upwardly to close the danger zones or spaces between the shoulders on the respective brackets and the power actuator, each guard plate being formed with a stop lip 429 (Fig. 5) adapted to arrest its guard plate in effective position. Springs 430 operate to hold the guard plates in and return them to effective positions.

The guard plates are adapted for displacement to enable the couplers 353 (Fig. 2) to engage the power actuator as the key carriage travels past the brackets 155, to effect which displacement, the guard plates carry tappets 431 projecting into the path of the carriage to be struck thereby or by displacing fingers 432 (Fig. 3) mounted at the rear corners of the carriage, such contact rocking the guard plates 427 out of the way and maintaining them idle until the carriage, in its letter spacing or return travel, releases the guard plates to the action of their restoring springs.

Conveniently an elongated hood 433 supported by the brackets 155 and extending throughout the length and past the ends of the power actuator, encloses the top and sides of the power actuator to guard against injury therefrom.

Modified power actuator

Reference may be had to Figs. 19-21, illustrating a rotary power actuator 383 which may be substituted in place of the vibratory power actuator 275 heretofore explained, such rotary actuator capable of being driven at greater speeds than is the vibratory actuator and being equipped, in effect, with multiple coupler-engaging blades, thereby enabling increased rapidity of operation and resulting in reducing vibration of the machine.

This modified form of power actuator necessitates a slight change only in the driving mechanism therefor, and the couplers heretofore explained.

Thus, it will be recalled that the motor 76 drives the shaft 281 to which are secured the eccentrics 283 for vibrating the vertically reciprocating bar 275.

In applying the rotary power actuator 383 (Figs. 19-21), gears 384 are substituted for the eccentrics 283 and straps 284, such gears meshing with idler gears 385 suitably supported on pintles 386 projecting from standards 387 mounted on the shoulders of the bracket members 155. The idler gears, in turn, mesh with toothed wheels 388 fast with the rotary power actuator 383 mounted on a shaft 389 journaled in the standards 387, the rotary power actuator being fluted longitudinally, as shown, to form a plurality of blades effective in any position of the key carriage relatively thereto, to engage couplers projected into their path of rotation.

Intermediate its ends, the rotary power actuator may be conveniently braced to prevent vibration, and to maintain it true, by the provision of an annular bearing 390 embracing the power actuator and in which the actuator turns, the bearing 390 being cut away, as shown, opposite the couplers to enable access of the latter to the actuator. A semi-circular seat 391 mounted on a pedestal 392 rising from the stationary gear housing 282 supports the bearing 390.

Practically the only change required in the key-controlled coupling mechanism, is the substitution of a coupler 393 of somewhat different contour from the couplers 353, such difference residing in the provision of a co-acting tooth 394 shaped to substantially conform to the flutes of the rotary actuator for engagement thereby, the lower free end of the coupler being extended to form a spur 395 adapted, as the rotary actuator draws the coupler 393 and actuator 345 downwardly, to impinge against a stationary, universal deflecting bar 396 extending between and supported by the brackets 155 and the gear housing 282. The deflecting bar is so located relatively to the actuator 383, that, as the coupler, after contacting the deflecting bar, continues its descent, the deflecting bar will crowd the coupler forwardly to disengage it from the particular blade of the rotary actuator, and thus enable the return of the actuator and its connected parts to their normal positions. Adjustment of the deflecting bar 396 relatively to the spurs 395 of the couplers, may be effected by the insertion or removal of shims, as indicated in Fig. 20, or in any other well-known manner.

Although this modification is disclosed in connection with a notched flange 380 on the pendant and a tooth 382 on the coupler-adjusting member, these features may be omitted, as the action of the rotary fluted actuator is so rapid as to render them practically valueless.

Connecting and disconnecting complementary key levers

Each of the numeral key levers is formed of a pair of companion or complementary levers 335 and 336 which are capable of connection for simultaneous operation manually, as when it is desired to use the machine for writing only, and for disconnection, to enable the manual operation of one of the levers to set mechanism through which the remaining or printing lever and the calculating mechanism are power driven.

The foregoing explanation of the invention has been predicated on the latter condition, i. e., the disconnection of the complementary levers.

Manually controlled means in addition to the main switch 81 and the power actuator control lever 296, is provided to enable the operator to convert the machine from a simple non-calculating writing machine to a combined writing-calculating machine, and vice versa.

Figure 12:
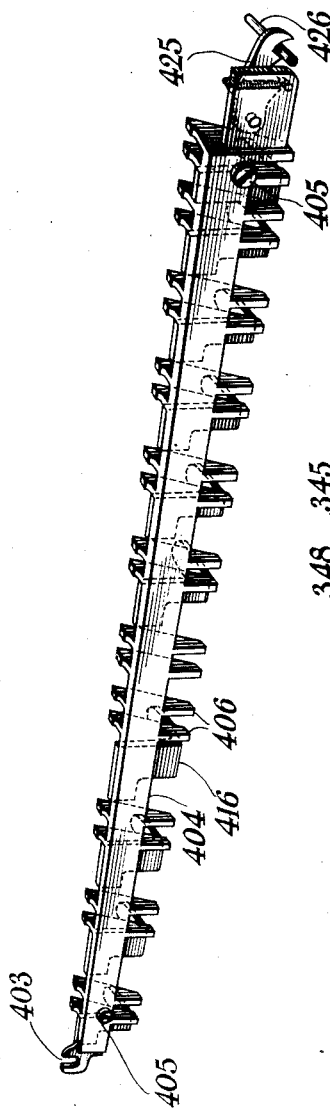
Figure 12 is a perspective detail of the control bar through which the numeral key sections are coupled and uncoupled for hand and power actuation, respectively.

Referring more particularly to Figs. 22, 23, 27 and 29, a manually operable handle 400 is fast on the front end of a rearwardly extending shaft 401 suitably journaled in the front and rear walls of the hood 178 of the key carriage, such shaft having also fast thereon near its forward end, a crank 402 in the nature of a ball-crank, the free end of which crank seats in a recess 403 formed at one end of a control slide or member 404 (Fig. 12) extending across the machine just above the forward ends of the pairs of complementary levers 335, 336, constituting the bank of numeral keys. The slide lies just behind the set back front wall of the upper part of the key carriage 55 (Fig. 2), headed studs 405 (Figs. 12 and 23) projecting forwardly from the slide and traversing slots 406a in the front wall of the frame of the key carriage to support and guide the slide in its operation.

Pairs of wings 406 (Figs. 7–16, 18 and 29) project rearwardly in spaced relation from the rear face of the slide 404 to embrace bosses 407 extending forwardly from laterally turned lips 408 formed on the upper free ends of latches 409 loosely secured by fastenings 410 (see Fig. 18) at their lower ends to their respective printing levers 336, for lateral movement. Lugs 411 projecting laterally from the respective printing levers at points above the fastenings 410 enter holes 412 formed in the appurtenant latches 409 to hold the latter upright against edgewise rocking movement, the lugs being of such length as to retain their control of the latches when the latter are shifted laterally.

Rigid standards 413 project upwardly from the setting levers 335 complementary to their printing levers 336, the standards being located a short distance behind the key caps 373 and alongside the latches 409.

One end of a stud 414 mounted in and projecting from the opposite faces of the upper end of each standard, constitutes a keeper for its associated latch, the latter having an aperture 415 (Figs. 8, 9 and 16) to fit over the keeper and connect the respective complementary setting and printing levers to form composite key levers.

Figure 23:
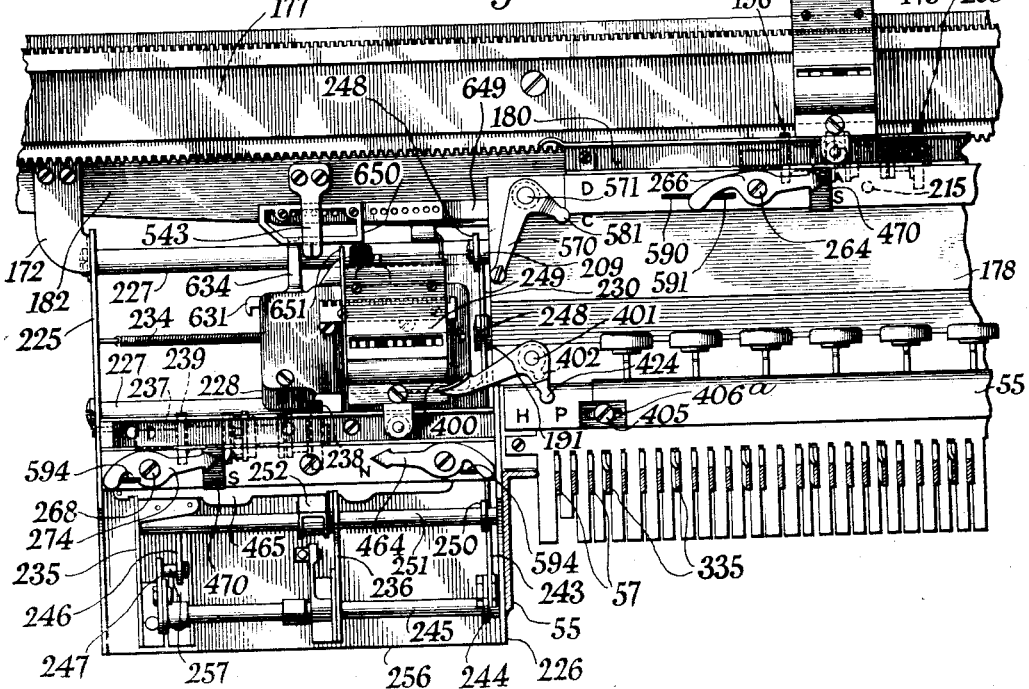
Figure 23 is a fragmentary view in front elevation, partly in section, showing a column totalizer and the left hand cross totalizer, together with the manual state controls for the respective totalizers, and the manually settable handles for conditioning the numeral keys for manual or power operation; and for disabling and enabling the automatic state controls, respectively.

Assuming the keyboard to be conditioned for hand operation only, in which the pairs of complementary levers 335, 336 forming the several numeral keys, are connected by their individual latch mechanisms, it is obvious that the handle 400 and crank 402, when rocked counter-clockwise, to the position shown in Fig. 23, to condition the calculating mechanism for power operation, will shift the slide 404 to the right, the wings 406 of the slide swaying the latches 409 in like direction to disengage them from their respective keepers 414, thereby enabling independent operation of the complementary setting and printing levers when the machine is to be used for both writing and calculating.

In this connection, it will be recalled that the stroke of the setting levers 335 is quite limited when the machine is conditioned for writing and calculating, which is arranged by providing a series of steps 416 on the slide or key-control member 404 which steps, when the slide is shifted to the right, are positioned beneath and in line with the left-hand extensions of the studs 414, such extensions operating, by contact with their respective steps, to arrest the setting levers 335 as soon as the latter, in their down strokes, have rocked the coupler-adjusting members 366 sufficiently to locate selected couplers 353, (393) in the path of the power actuator 275 (383).

Shifting the handle 400 with its shaft 401 and cam 418, clockwise from the position shown in Fig. 23 shifts the key-control slide 404 to the left, the wings 406 restoring the latches to fit their apertures over the keepers 414 to connect the respective complementary levers for use in the ordinary manner when writing numerals without calculating, the slide also shifting the key-arresting stops 416 out of the paths of the left-hand extensions of the studs 414 to enable the operator to impart a down stroke of the usual extent to the key levers 335 which, through their latch connections with the complementary printing levers 336, rock the latter downwardly to print the selected numerals.

In addition to controlling the connection and disconnection of the respective companion levers 335, 336 forming each key lever, the shaft 401 also controls the operativeness of the differential mechanism for the totalizers.

As one such means, there is shown (Figs. 16, 26, 28 and 29) a cam 417 fast on the key control shaft 401, which cam lies in contact with the arcuate head 418 of an arm 419 (Fig. 16) secured at its lower end to a shaft 420 extending across the machine and journaled in the actuator side plates 346, near the lower ends thereof. Bails 421, the side members 423 of which are fast on the shaft 420, extend across the machine in front of each group of spring-urged thrust links 362 between the frame plates 346.

When the handle 400 and its shaft 401 rock clockwise from the position shown in Fig. 23, to condition the machine for writing only, the cam 417 wipes along the arcuate edge of the head 418 and rocks the arm 419 rearwardly, together with the bail shaft 420 and the bails 421. Each bail, in consequence, swings from the idle position shown in Fig. 7 to the effective position shown in Fig. 13, rocking the thrust links 362 rearwardly on their pivots 363 against the tensions of their springs 372 to displace the studs 364 from beneath the shoulders formed by the cam slots 365, and locate them in the open-ended branches of the slots in the coupler-adjusting members 366.

Hence, in manually depressing the numeral keys 373 when writing without calculating, the studs 364 of the thrust links merely travel idly up and down in the open-ended arms of the slots, and the key touch is relieved of the load otherwise imposed by the differential mechanism.

A pointer 424 (Fig. 23) on the control shaft 400 co-acts with suitable indicia, as "H" (hand) and "P" (power) on the frame of the machine to indicate the adjusted condition of the machine.

The shaft 401, when rocked counter-clockwise to the position shown in Fig. 23, withdraws the cam 417 from the high point of the arcuate edge of the head 418 on the bail-controlling arm 419, which enables the tensioned springs 372 to draw the thrust links 362 forwardly to seat their studs 364 at the closed ends of the cam slots 365 in the coupler adjusting members 366 and beneath the shoulders, thereby connecting the calculating mechanism and the keys. As the thrust links 362 advance, they rock the bails 421 and bail shaft 420 forwardly to the positions shown in Fig. 7.

A spring-pressed dog 425 (Fig. 12) pivoted to the slide 404 frictionally engages a pin 426 suitably mounted in the carriage frame and assists the cam 417 in retaining the key-control slide where adjusted.

Repeat operations

Occasion may very well arise wherein the repeated and successive operation of a type bar is desired, such as when forming a horizontal line at the bottom of a column of figures to separate the latter from the total to be printed therebeneath, and to automatically effect the repeated operation of such type bar by the power actuator 275 (383), during the time the corresponding key, after being once depressed, is maintained in such position, resort may be made to the following mechanism.

The selected key, as the underscore key 435 (Figs. 6 and 10) is constructed exactly like the numeral key mechanisms shown in Figs. 7–9 and 13, for example, but for four exceptions, firstly, there being no corresponding calculating mechanism for the underscore key, no link 348 is provided on the actuator lever 345.

Secondly, the spur 376 of the actuator lever 345 is omitted as it is not desired to silence the underscore key control of its corresponding coupler-adjusting member at each down-stroke of the actuator.

Thirdly, the coupler-adjusting member 366 for the underscore key differs from the other members of the series in that the slot 365 therein has no upward concentric branch, but is merely a longitudinal slot, as indicated by dotted lines 436 in Fig. 17.

And lastly, the flange 380 on the pendant 351 associated with the underscore key is not provided with a notch 381, but instead, has a plain face wiped by the tooth 382 of the coupler adjusting member.

Conversely, the tooth 382 of the coupler could be omitted and the corner rounded so as to eliminate possibility of interlocking with the flange 380 of the pendant.

Either construction would prevent such interlocking.

Forming the underscore key or any of the letter keys, as above explained, enables such to be power-actuated.

Therefore, depressing the setting lever 335 of such key and maintaining it depressed, will rock its coupler-adjusting member 366 counter-clockwise to swing the corresponding pendant 351 and coupler 353 rearwardly, thereby positioning the coupler in the path of the power actuator 275 and maintaining it in such position until the key is released to allow the coupler-adjusting member to return to idle position and free the pendant and coupler for return by the restoring spring 358.

The printing lever spring 339 returns the printing lever 336 and connected parts towards normal position intermediate the down strokes of the power actuator.

Key lock

One of the usual or customary forms of crowding key locking mechanism may be provided to prevent depression of more than one numeral key at a time and to prevent depression of a second numeral key before the previously depressed numeral key has substantially completed its return to normal position.

One such means, disclosed in Figs. 2, 6–11, 13 and 16, includes a bar 437 extending transversely across the frame of the key carriage by which it is supported at its ends above the composite key levers 335, 336. The rear edge of the key locking bar is provided with a series of slits 438, (Fig. 7), intersecting a longitudinal groove containing a series of locking members 440 placed end to end in the usual manner, and leaving sufficient space when the series is spread apart opposite any slit to accommodate a single spreading member only. A cover plate 441 slitted in registry with the bar 437, retains the locking members in place, the rear edge of the plate being upwardly inclined, as shown.

The setting lever 335 of each composite key supports intermediate its ends a post 442, terminating at its upper end in a spreading head 443 embraced between the slits of the upturned rear edge of the cover plate 441 for guidance.

The spreading head, upon depression of its key, is guided by the slit in the cover plate into the registering slit in the key locking bar 437, and enters between the convex abutting edges of two adjacent locking members 440, spreading or crowding the locking members apart to cause them to block the entry of a spreading head associated with any other key until the operated spreading head has shifted rearwardly from between the locking members 440 upon the return of its key to normal position.

Neutralizing state control of the column and cross totalizers

The amounts set up by depression of the numeral keys are entered digit by digit, either additively or subtractively, and in any desired combination, on the column and cross totalizers.

Heretofore, reference has been made to the respective column totalizers 175 mounted in alinement on their transversely extending supporting bar 177, suspended from the upper ends of the brackets 155 and relatively to which the key carriage, with its cross totalizers, travels, the key carriage containing the main and auxiliary differential mechanisms including master wheels, for actuating the totalizer wheels of the successive column totalizers, and the cross totalizers, respectively.

Comparison with the former Elliott-Fisher type of machines shows that in such machines, the cross totalizers are fixedly mounted with respect to the key carriage with which they travel, traveling master wheels being provided for each cross totalizer.

Normally, these cross totalizer master wheels travel synchronously and are stationary relatively to their respective cross totalizers, but as the traveling key carriage enters the computing zones of the successive fixed column totalizers, pick-up mechanism connected with the respective cross totalizer master wheels interrupts the synchronous travel of the latter with the key carriage, and causes such master wheels to advance from the totalizer wheels of highest to lowest order of their respective cross totalizers simultaneously with the step by step advance of the key carriage in its passage from highest to lowest order through the successive computing zones of the series of column totalizers.

In the present invention, the cross totalizers travel with the key carriage, but instead of being fixed relatively thereto, they are adapted for movement relatively to the key carriage and their respective master wheels, during the passage of the key carriage through the computing zones of their related column totalizers.

The direction of rotation of all the master wheels to effect addition or subtraction on the respective column and cross totalizers may be manually determined by manipulation of the reversing gear control shafts 264 for the column totalizer master wheel, and 268 for the respective cross totalizer master wheels.

Novel means is also provided to silence or "neutralize" the master wheels when desired, to non-add, that is, to render the calculating mechanism unresponsive to the action of the differential mechanism, such means also constituting a state control.

Referring particularly to the "neutralizing" feature of the present invention, it will be recalled that a clutch mechanism 200, 201, 202, 203, 204 (Fig. 46) is interposed between the intermediate differential gear 196 and the master wheel 205 for the column totalizers, and that this clutch mechanism is rendered active and idle by shifting the grooved clutch collar 203 through a shifter 218 carried by a rotatable yoke 217 (see also Fig. 47) rocked in one direction by a train of spring-restored mechanism actuated by the shoes 207 (Fig. 6) of the key-controlled differential sectors 185.

To prevent entry of amounts into any of the column totalizers either additively or subtractively, and hence "neutralize" such totalizers, the master wheel clutch shifter 218 is made disengageable relatively to the clutch collar 203, by pivotally mounting it on the rotatable yoke 217. To this end, the clutch shifting arm 218, is formed with ears 445 (Fig. 47) journaled on a stud 446 mounted in and extending between the arms of the yoke 217, a spring 447 on the stud tending to rock the clutch shifting arm 218 into the groove in the clutch collar.

At a point just below the ears 445, the clutch shifter 218 carries a rearwardly extending trip projection 448 terminating at its free end in an upturned stop lug 449, the projection also having a lateral toe 450.

A neutralizer shaft 451 suitably journaled in the front and rear walls of the hood 178 of the key carriage, carries near its forward end a clip 452 fast thereon, one end of which is laterally extended to form a trip finger 453, the free end of which lies beneath the trip toe 450.

The remaining arm of the clip is extended downwardly for pivotal attachment at 454 intermediate the ends of a horizontal link 455 supported for endwise movement on shoulders 456 (Fig. 46) formed on the sub-frame plates 179, 198 (Fig. 6).

A crank 457, the hub 458 of which is journaled in the front wall of the hood 178, carries a crank pin 459 seated in a recess formed in the right hand end of the the link 455. The outer end of the hub 458 is slabbed and protrudes through the front wall of the hood, to support a combined finger piece and indicator 460 (Figs. 1 and 48) fixed thereto.

The operator, by manually rotating the finger piece counter-clockwise (Fig. 48), rocks the crank 457 and shifts the link 455 to the right to rock the clip 452 and neutralizer shaft 451 in like direction.

The trip finger 453 of the clip will thereupon impinge the trip toe 450, rocking the projection 448 upwardly and the clutch shifter arm 218 forwardly against the tension of the spring 447, to disengage the clutch shifter arm from its clutch collar 203.

The upturned stop lug 449 works up and down in the groove of the clutch collar 203, upon relative movement of the clutch shifter arm 218 and its clutch collar, and under compulsion of the spring 220, is held in contact with the right hand wall of the groove, to prevent lateral movement of the clutch shifter arm out of line with the groove in its clutch collar under influence of the same spring 220, when the clutch shifter arm is disengaged from its collar.

Obviously, this interruption in the train of mechanism from the differential intermediate gear 196 to the master wheel 205 prevents transmission of movement to the master wheel and hence the column totalizers are not actuated.

Reversely rotating the finger piece 460 thrusts link 455 leftward and rocks the clip 452 and the neutralizer shaft 451 to swing the trip finger 453 clockwise (Figs. 46, 47) releasing the clutch shifter arm 218 to the action of its spring 447 which snaps the shifter arm backwardly into its groove in the clutch collar 203, and causes the ear 449 of the rearward projection 448 to follow the trip finger 453 downwardly.

Similar neutralizing mechanism, as shown in Fig. 46, is provided for the respective cross totalizers to interrupt the transmission of differential rotation to their respective master wheels 238, the neutralizing shafts 461 of the respective clutch mechanisms for the cross totalizers being journaled in the front and rear walls of the cross totalizer housings, and are equipped near their forward ends with trip fingers 462 to control the respective clutch shifter arms 463.

Also combined finger pieces and indicators 464 (Fig. 23) are similarly linked, as at 465, to their respective cross totalizer neutralizing shafts 461, to afford manual control of the clutch mechanisms.

Brackets 466 (Fig. 46) fast with each link 455, 465 project rearwardly to a point adjacent the respective master wheels 205, 238 for the column and cross totalizers, respectively, the free ends of such brackets carrying detents 467, which lie apart from the master wheels when the totalizers are conditioned for either addition or subtraction, but upon a neutralizing operation, the links 455, 465, when shifted to the right, draw with them the brackets 466 and engage the detents 467 with their master wheels to lock the latter against accidental movement so long as the totalizers remain neutralized.

The act of re-establishing the connections between the clutch shifting arms 218, 463 and their clutch collars coincidently disengages the detents from their master wheels.

It will be understod that the separate neutralizing mechanisms for the column totalizers and for the respective cross totalizers are independently operable to effect any of a variety of combinations.

Also that the add-subtract controls are likewise separately settable to effect a like variety of combinations, the two classes of controls together affording a wide choice of systems.

*State indication*

Each of the combined finger pieces and indicators 266 and 274, provided for the manual control of the add-subtract state of the column and cross totalizers, respectively, as heretofore explained, co-act with suitable indicia as "A" (add)

and "S" (subtract) borne by the front walls of the hood 178 and of the cross totalizer housings to indicate the condition of the adjustment.

Likewise the neutralizer finger pieces and indicators 460, 464 for the column and cross totalizers, respectively, co-act with a single index character, as "N" (neutral) one the front walls of the hood and of the cross totalizer housings, respectively, to indicate the operativeness of the respective master wheels 205, 238 and hence, of the totalizers.

Obviously, the indications associated with the "add-subtract" pointers 266 and 274 which designate the state of the totalizers should be concealed when the neutralizing pointer 460 or 464 co-related with the corresponding totalizer is in its neutralizing position, to prevent a false or misleading indication, the indications being exposed when the neutralizing mechanism is in its idle position.

Referring to the state control mechanism for the column totalizers, this result is conveniently effected by pivotally attaching the shiftable link 455 (Fig. 46), as at 468, to a suitably supported swinging arm 469.

A suitable blind 470 has a pin and slot connection 471 with the upper end of the supporting arm 469, the opposite end of the blind being extended at right angles forwardly through a slot in the front wall on which it rides, and then downwardly to form a concealing shutter, which normally is positioned by the neutralizing link 455 at one side of the indicia "A" and "S", associated with the add-subtract pointer 266.

In the operation of the neutralizing shaft 451 to displace the clutch shifting arm 218, the link 455 shifts to the right (Fig. 46) drawing with it the blind 470 to cover the indicia "A" and "S", the neutralizer pointer 460 at the same time, moving from its blank indicating position to the "N" position.

The parts resume their normal positions upon the return of the neutralizing mechanism to idle position.

Identical mechanisms are employed in connection with the right and left cross totalizer state indicators, as indicated in Fig. 46, for the left cross totalizer by the use of the reference characters 469 and 470, it being readily apparent that the foregoing explanation applies as well to the cross totalizer state indications.

*Automatic state controls*

Automatic determination of the states of the respective cross totalizers according to a predetermined plan, broadly speaking, is shown in United States patents to Foothorap, 1,538,392, and to Wahl, 1,270,471; 1,349,024 and 1,648,667, all of which have been heretofore referred to.

The instant invention, however, proceeds further and provides for the automatic change of state of not only the cross totalizers, but the column totalizers as well, by a combined and compact grouping of controls not heretofore known, so far as I am aware, and one wherein the prior devices of the patents mentioned have been improved and simplified to permit of greater flexibility and combination.

In carrying out this feature of the invention, there is provided a unitary selector member equipped to control the states of the respective cross totalizers and the particular column totalizer, with which latter it is adapted to be removably associated and relatively to which it may be separately supported.

To enable such unitary selector members to function so as to automatically and variously determine the sort of operation to be effected on the totalizers within their scope, it is desirable that the several state controls be suitably grouped to enable the selector members to more readily set such controls according to any prearranged system.

For the purpose of concentrating or centralizing the respective state controls, for ready operation by a compact unitary selector, there is provided a guide housing or control box 476 (Figs. 24-29, and 40-45), secured to a stringer 477 (Fig. 24) supported on posts 478 projecting rearwardly from the rear face of the track bar 182, and to a rearwardly protruding bulge formed on the track bar casting (Fig. 2).

The opposite end walls of the housing are suitably slotted, as at 479 (Figs. 28 and 29), to accommodate and guide a series of transversely arranged automatic state control levers 480-485, respectively, (Fig. 24) appropriate to the individual state control shafts 264, 451, 268 and 461 associated with the several column and cross totalizer mechanisms. In other words, each separate state determining means which, in the present instance, includes an add-substract control, and a neutralizer control for the right hand cross totalizer; an add-subtract control and a neutralizer control for the left hand cross totalizer, and an add-subtract control and a neutralizer control common to the several column totalizers, is connected to a separate control lever of the series 480-485 shown in detail in Figs. 32-37, the control levers differing somewhat from one another in detail, but all operating similarly.

These control levers are all confined in closely adjacent parallelism lengthwise of the control box and may be all conveniently mounted on a fulcrum rod 486 (Figs. 24 and 25) suitably supported at its ends in the outer rear wall of the housing 476 and in a bracket 487 projecting from the left-hand end wall (in said figures). A transverse brace bar 488 secured to the inner rear wall of the housing, is slotted to accommodate the control levers 480-485 and serve as a guide and support therefor intermediate their ends.

The control levers shown in Figs. 32 and 33 are appropriate to the right-hand cross totalizer, the lever 480 controlling the add-subtract condition thereof, and lever 481 controlling the neutralizing of the cross totalizer. From the fulcrum rod 486, each of the levers 480, 481 has a leftward (looking from the rear) extension passing out of the control box through its individual guide slot 479, a link 489 (Fig. 3) pivotally connecting the extension of lever 480 with an arm 490 on the add-subtract shaft 268, the extension of the control lever 481 being connected by a link 491 and lever 492 with a short link connected to an arm 493 on the neutralizer shaft 461.

Control levers 482 and 483 (Figs. 24, 34, 35, 40 and 41) are associated with the add-subtract shaft 264, and the neutralizer shaft 451, relating to the main or column totalizer mechanism; the shafts 264 and 451 being rearwardly extended into the area enclosed by the control box 476, and having forked arms 494 and 495, respectively (Fig. 25) adapted to embrace studs 496 and 497 projecting from depending lugs 498 and 499 individual to the respective control levers 482 and 483. The right-hand ends, viewed from the rear as in Fig. 24, of the control levers 482 and 483 project through guide slots 479 in the right-hand wall of the control box 476.

The control levers 484 and 485 operate the add-subtract shaft 268 and the neutralizer shaft 461 appropriate to the left-hand cross totalizer, the free ends of such control levers being extended to project through individual guide slots 479 in the left-hand wall (viewed from the front) of the control box. A link 500 (Figs. 3 and 46) pivotally connects the extended end of the control lever 484 with an arm 501 on the add-subtract shaft 268. A link 502 pivotally connects the extended end of the control lever 485 with one end of an intermediate lever 503, a second link 504 pivotally connecting the opposite end of the intermediate lever with an arm 505 fast on the neutralizer shaft 461.

Springs 506 connected to individual tails depending from the respective control levers below their fulcrum 486, tend to hold the free ends of the levers 480-483, and the link-connected ends of control levers 484 and 485 at their upper limits of travel.

Individual tappets 507 are mounted on each of the control levers 480-485, at like distances from the common fulcrum 486 of the control levers, so as to lie in alignment from front to rear.

Headed studs 508 pass through hooked slots 509 formed in the respective tappets, and arms 510 project laterally from the tappets and lie alongside their individual control levers to which they are connected for independent movement by headed pins 511 passing through slots 512 arranged longitudinally of the arms. Springs 513 extending from the lower ends of the tappets to their individual control levers serve to maintain the tappets in their upper positions with the laterally extending ends of the hooked slots 509 fitted about the studs 508, as shown in Figs. 32-37, the tappets having, in effect, a floating connection with their respective control levers.

The closure for the top of the control box 476 is formed of a stationary plate 514, and a sliding cover 515 (best shown in Fig. 45). The plate and cover are cut away to form a T-slot. The upper ends of the tappets 507 project upwardly through the stem of the T-slot, which separates the adjacent ends of the plate 514 and cover 515, the left hand edges of the heads of each tappet being formed in a compound or S-shaped curve, the concave portions of which rest against a restraining rod 516 supported in advance of the inner end of the sliding cover by eyes 517 projecting from the cover. The heads of the tappets are thus confined for operation in the space between the restraining rod 516 and the inner end of the slidable cover 515 in the stem of the T-shaped slot, the rod serving as a back-stop and guide for the tappets as they are depressed, as hereinafter explained. One of the eyes is prolonged and longitudinally slotted, as at 518, (Figs. 25 and 45), to embrace the opposed edge of the stationary plate 514 and serve as a guide or pilot for the sliding cover 515, which latter is shiftable endwise longitudinally of the control box, and transversely in relation to the machine, to silence the automatic state control, as hereinafter explained. Pins 519 (Figs. 28 and 29) mounted in the control box pass through slots 520 formed in the slidable cover 515 and in a flange adjacent the outer eye 517 to guide and limit the movement of such cover as well as secure it on the control box.

*Unitary selector*

One or more unitary selector devices (Fig. 30) cooperate with the nest of state controls within the control box 476 and its control levers traveling with the key carriage, such unitary selector devices (Fig. 30) being conveniently mounted for detachment and adjustment on a supporting bar 530 (Figs. 2, 3, 6, 30, 31, and 40-43) lying parallel with and directly behind the carrier 177 for the column totalizers. The supporting bar is secured at its opposite ends in seats formed in the forwardly projecting upper ends of the bracket extensions 155 (see Fig. 5).

Each of these unitary selector devices may conveniently include a pair of complementary, forked side frames 531 (Figs. 30 and 31) spaced apart substantially the width of a column totalizer and arranged in parallelism to form a double jaw, the upper jaw sections of which are connected by a flat bridge plate 532 located above the throat opening. A brace 533 connects the lower jaw sections at points behind the closed end of the throat, the throat being of sufficient width to accommodate the supporting bar 530, the under face of which is provided with a series of transverse grooves as at 534, to correspond with the width of the letter spacing, generally one-tenth of an inch. To place the unitary selector on the supporting bar, the open mouth of the throat is positioned opposite the rear edge of the bar at the particular location desired, the open ends of the jaw sections being slightly rounded or beveled to facilitate entry of the lower jaws into the grooves 534, after which the selector is slid forwardly, forcing it over the bar until the closed inner end of the throat abuts the rear edge of the bar. A flat bow spring 535 conveniently secured to the under face of the bridge 532 of the selector, frictionally engages the upper face of the supporting bar 530 to take up play and prevent vibration and chattering of the selector on the bar, as well as to hold the selector in place.

Opposed ears 536 rising from the upper edges of the respective upper jaws of the forked side frames 531 support a pivoted, manually releasable, spring-pressed latch 537, the forward wide-toothed end of which is adapted to project over the front edge of the supporting bar 530 when the selector is in place, the tooth being reentrant to engage a groove 538 extending longitudinally of the forward or inner edge of the supporting bar, to secure the selector unit where adjusted against accidental disconnection.

The rear end of the latch 537 terminates in a finger piece, depression of which releases the toothed end from the bar, whereupon a rearward pull on the selector unit results in the removal of the latter for readjustment if necessary, or the substitution of another unit.

A row of apertures 539 spaced according to the lateral spacing between the dogs 507 of the successive automatic state control levers 480-485, are formed in each of the lower jaws of the respective selector units, the corresponding apertures of each row being in registry to accommodate the tenons 540 of a series of cam blades 541. The cam blades lie in the direction of travel of the key carriage and its control levers, the lower edges of the cam blades depending below the lower edges of the forked frames 531 to enable the beveled heads of the tappets 507 to contact with the lower edges of the cam blades.

There are as many pairs of apertures 539 as there are state control levers, but obviously no selectivity would be afforded by providing each selector unit with a full set of cam blades. Instead, cam blades 541 are mortised into the apertures 539 according to the particular state of the respective column and cross totalizers which it is desired shall obtain in a particular calculating zone.

Owing to the centralization of the control levers 480-485, a single unit selector simultaneously determines the states of the respective cross totalizers and of the particular column totalizer with which such unitary selector is associated.

Thus any selector unit may have its cam blades so arranged as to set the various state controls (for the column totalizer, and for the separate cross totalizers) differently from any other selector unit, and each selector unit may adjust the state controls differently, or certain of the selector units may automatically affect the state controls similarly, while other selector units effect changes in the adjustment of the state controls, and in any sequence.

And by mounting the cam controls on a unitary selector separate from the totalizers and demountable relatively thereto, a greater flexibility, and range of adjustment is permitted a machine so equipped.

The selectors are supported separately from the column totalizers, but are associated therewith or juxtaposed relatively thereto, so as to control the states of their particular column registers simultaneously with their control of the respective cross totalizers. Because of the flexibility permitted by the invention, some forty-two possible combinations being provided in the present illustration, it is clear that a selector may control the state of its associated column totalizer to effect adding while simultaneously setting the state control mechanisms to effect subtraction on one cross-totalizer, and neutralize the remaining cross totalizer, for example, or any other combination of such states.

Furthermore, by mounting the state control cams on selector units and not on the column totalizers themselves, a material reduction in expense is effected, since it is only necessary for the operator to be provided with as many different selector units as will produce the required controls for the proper working of the particular system in use.

A selector may be associated with any column totalizer, it being preferable that the cam blades 541 of the selector shall be of a length sufficient to maintain engagement with the tappets 507 of the nest of control levers 480-485 throughout the computing zone.

The selector shown in Fig. 30 is designed to automatically set the corresponding control levers to effect subtraction in the right-hand cross totalizer, subtraction in the column totalizer with which it is associated, and to neutralize the left-hand cross totalizer, because of the positioning of the cam blades 541 in the first, third and sixth positions from the mouth of the throat of the selector. Other combinations are readily apparent.

Positioning the selectors

Since the selectors may be used frequently with cross totalizers, or even with column totalizers of various capacities, the operator might become confused in setting up the machine to work according to a predetermined system, were it not for the provision of suitable indications designed to assist the operator in properly arranging the controls.

Although the travelling master wheels 205, 238 are brought to the totalizer wheels of highest order first, the operator, when positioning the selectors on the bar 530, will disregard this fact, and will adjust the selectors according to the units totalizer wheels which, of necessity, must all lie in mesh with their master wheels synchronously.

Referring to Figs. 2 and 6, the strap 173 carries at its upper end a forwardly and rearwardly extending index plate 542, the forward end of which plate bears an index mark corresponding at all times with the position of the master wheel 205 for the column totalizers, and the rear end of which plate bears an index mark corresponding with the positions of the respective cross totalizer master wheels 238. Also an index plate 543 (Fig. 23) is mounted on the web of the traveling rail 182 above each cross totalizer master wheel 238, to indicate the positions of the latter with regard to the wheels of their respective cross totalizers.

The right hand side frame 531 of each unit selector carries an upwardly projecting index finger 544 (Fig. 30) to co-act with the rear index mark on the plate 542.

The column totalizers are first positioned on their track bar 177 according to the columns or zones in which the amounts printed are to be calculated, and define such zones.

Both the column and cross totalizers are each provided with graduations along their rear edges indicating the positions of the accumulating wheels of such totalizers, and after positioning the column totalizers as desired relatively to the columns on the work sheet, the key carriage with its column and cross totalizer master wheels, is advanced in letter-spacing direction from left to right, (in the Elliott-Fisher type of machine), to bring the units wheel graduation of the first column totalizer opposite the forward index mark on the index plate 542, whereupon the rear index mark on said plate indicates the position at which the desired unit selector should be attached to its supporting bar 530, with its index finger 544 in line with such rear index mark.

The key carriage is then manually slid along its ways to engage the pick-up beams 231, appurtenant to the respective cross totalizer trucks, with the adjusted selector, as more fully explained hereinafter, and the parts again brought to the units aligned position of the first column totalizer and the index plate. This will result in locating the respective cross totalizer trucks leftward from their normal or home positions. The cross totalizers are then applied to their trucks in such relation to their respective index plates 543, that the units graduations on the cross totalizers lie in line with the master wheel position indicating marks on such index plates, thus completing the adjustment.

The above method of co-relating the selectors with their column totalizers is repeated for each column totalizer after the first.

Operation of state controls by the selectors

Upon entering a calculating zone, the key carriage traveling from left to right, with its grouped automatic state control levers 480-485, will first cause the oppositely beveled heads of the tappets 507 (Figs. 32-37) of the respective control levers to ride underneath the selector member associated with that zone. The heads of those tappets which travel in the vertical planes of the particular cam blades 541 with which the selector may be provided, strike the left hand ends of the alined cam blades 541, this contact serving to more firmly fit the lateral seats at the lower ends of the hooked slots 509 (Figs. 32–37) around the studs 508 on the control levers, and in effect, locking the tappets in their upper positions relatively to the control levers.

As the key carriage continues its advance towards the right, the pressure resistance afforded by the end edges of the cam blades 541 to the passage of the beveled heads of the tappets causes the particular control levers which carry these tappets to rock downwardly against the tensions of their restoring springs 506, and through their respective linkages these movements of the control levers are communicated to their state control shafts 264, 451, 268 and 461, or any of them, to set or silence the corresponding master wheel controls depending upon the combination of cam blades mounted in the selector.

The amount typed in the particular calculating zone is thus either entered additively or substractively, or not entered in the corresponding column totalizer and in the cross totalizers.

Absence of a cam blade 541 in one or more of the six positions provided in the form of selector shown, enables the control lever corresponding in position thereto, to remain in its normal position, which in the embodiment herein illustrated, conditions the column and cross totalizers for addition, it being readily understood that the parts might be arranged for normally effecting subtraction instead of addition.

As the key carriage with its nest of control levers and master wheels escapes from a calculating zone, the heads of the operated tappets 507 ride out from beneath their corresponding cam blades 541, whereupon the tensioned springs 506 rock the depressed control levers and their tappets upwardly to their normal positions preparatory to their contact with the succeeding unitary selector, restoring the add-subtract control to "add" condition and the neutralizer controls to their ineffective positions.

Upon the return of the key carriage to the beginning of a line, the control levers 480–485 and their tappets 507 approach the stationary unitary selectors from the opposite direction.

Consequently, contact of the beveled heads of the tappets with the left hand ends (Fig. 38) of the cam blades 541 will disengage the hooked seats of the tappets from the pins 508 and position the vertical portions of the slots 509 in line with such pins, so that as the tappets ride beneath their cam blades, the tappets will be rocked idly downwardly relatively to their control levers about the pivots 511 and against the tensions of their springs 513, as shown, without affecting the state controls.

As the key carriage passes the last selector, on its return, the springs 513 finally restore the tappets to their normal raised positions, and, due to the angle at which the springs are arranged, they contrive to again fit the hooked seats at the lower ends of the slots 509 of the tappets over the pins 508.

*Selectors determine which cross totalizers shall become operative and control decimal spacing*

Heretofore, it has been the practice, generally, to fixedly mount a state control and the decimal skip space controlling mechanism on the column totalizers (Foothorap, No. 1,421,201, issued June 27, 1922), and to arrange that the usual pick-up mechanism for the cross totalizer, or for the actuator therefor, shall cooperate with a part of the column totalizer (Wahl, 1,270,471, June 25, 1918).

As an improvement upon the former arrangement, and by way of greater centralization of controls, the unitary selectors of the present invention by which the various states of the totalizers are determined, also determine the selection of the cross totalizers.

Furthermore, the control of decimal spacing, also is herein associated with the unitary selectors, and extended in scope to control intercolumnar spacing in instances where the column totalizers are closely spaced.

Depriving the column totalizers of the cross totalizer pick-up and decimal spacing control functions relieves the column totalizers of shock and strain and tends to reduce the liability of errors, and displacements.

*Pick-up for cross totalizers*

Reference has heretofore been made to the cross totalizer trucks 228 (Figs. 3 and 23) mounted for movement on the guide rails 227 relatively to the key carriage, each such truck having an upwardly extending fixture 233 secured thereto, to the upper parts of which, the outer ends of the respective pick-up beams 231 are pivotally connected, at 232.

Springs 234 normally hold the cross totalizer trucks at, and return them to, their normal positions at the right hand limits of their travel.

The pick-up beams 231 extend towards each other and overlap, as shown in Fig. 45, lying side by side along the inner side of the control box 476, parallel with and adjacent to the stringer 477 supporting the control box, and in registry with the longitudinal slot forming the cross bar of the T-shaped opening in the cover of the control box.

The pick-up beams 231 are guided in individual slots 479 in the ends of the control box through which they pass, each beam being offset downwardly from a point adjacent its pivot 232, the reach of the beam gradually inclining upwardly from the offset until its free end lies substantially in the same horizontal plane with its pivot. Springs 550 connected to the tails of the respective pick-up beams tend to rock the free ends thereof upwardly, such movement being limited by contact of the edges of the beams with the fixed closure 514.

Check members 551 project upwardly from points intermediate the ends of the pick-up beams, such check members extending upwardly through the longitudinal slot in the control box closure to engage the unitary selectors.

To enable the unitary selectors to control the pick-up of the cross-totalizers whereby to effect simultaneous operation of the cross totalizers, or either of them, and the successive column totalizers as the totalizer operating mechanism is brought by the advance of the key carriage to the successive computing zones, the lower jaw of each left hand selector frame member 531, as viewed in Fig. 43, is provided near its mouth with a depending fin 552 (Figs. 30 and 31), which, as shown, may be long enough to extend across the parallel paths of both check members 551, but obviously may be short enough to lie in the path of either check member to the exclusion of the other, or may be entirely omitted in instances where the selection of a cross totalizer is not desired, in which last-named event, the amounts accumulated in a column totalizer will not be registered in either cross totalizer.

The springs 234 (Figs. 3 and 23) normally maintain their respective cross totalizer trucks 228 with the cross totalizers mounted thereon, at their right hand limits of travel, (as viewed from the front) and since the pick-up beams 231 are connected with the trucks, the beams are likewise normally positioned at their right hand limits of travel with their check members at the left hand end of the longitudinal opening in the control box closure 514, 515 (see Figs. 43-45).

The cross totalizer trucks and pick-up beams normally travel with the key carriage and grouped state control levers in letter spacing direction to bring the master wheel 205 successively to the stationary column totalizers.

As the key carriage approaches a calculating zone defined by a column totalizer, either or both of the upwardly-projecting check members 551 impinge against and are arrested by the fin 552 on the lower jaw of the selector, thereby arresting the trucks 228 and their cross totalizers which remain stationary as the key carriage traverses the calculating zone, to enable the entry of digits on wheels of corresponding denominations in the cross totalizers and the active column totalizer.

Detents 553 pivoted at 554 on the respective pick-up beams adjacent the check members 551, project upwardly in spaced relation to their individual check members and coact therewith in gripping the arresting fin 552 to prevent accidental disengagement of the pick-up beams and selector, or relative movement thereof during the passage of the key carriage through a calculating zone.

The upper ends of the detents 553 and the check projections 551 are oppositely sloped as shown, to contact with and ride beneath the arresting fins 552 of the selectors as the key carriage advances and returns, respectively. Lips 555 on the tails of the respective detents overlie their pick-up beams, and springs 556 attached to such tails operate to restore the detents to their effective positions immediately upon escaping from beneath the fins, the detents being of slightly less height than the check projections.

As the key carriage and control box leave a calculating zone, after the entry of the units digit on the units wheels of the totalizers, abutments 557 (Figs. 43-45) on the under surface of the closure 514 near the opposite ends thereof, wipe over cams 558 formed on the pick-up beams 231, to rock the latter downwardly on their pivots 232, and release their check members 551, and detents from contact with the arresting fin 552, as shown in dotted lines in Figs. 43 and 44, after which the springs 234 (Fig. 3) snap the cross totalizers back to their normal positions, preparatory to the arrival of the key carriage at the next calculating zone.

Automatic spacing for punctuation

To enable the unitary selectors to control the decimal spacing between denominational orders, as in writing the numbers "4 987 65" and "4987 65", resort is had to an improved form of the mechanism shown in Foothorap, 1,512,282, heretofore mentioned. To this end, the brace 533 (Fig. 30) connecting the rear ends of the frame members 531 of the unitary selector, supports a decimal spacing trip bar 559 (Figs. 3, 30, 31 and 40-42) parallel with the cam blades 541, and having a serrated lower edge. A tooth 560 formed on one end of a double bell crank 561, pivoted at 562 (Fig. 24) to the inner face of the rear wall of the control box 476, co-acts successively with the serrations on the lower edge of the decimal trip bar 559, which operate to rock the bell crank 561 downwardly against the tension of a spring 563 (Fig. 25) as they wipe successively over the tooth 560. The depending arm of the bell crank is offset and formed with a hook 564 releasably engaging a headed stud 565 on the upper end of a vertically depending rod 566, corresponding with the rod 95 of Foothorap Patent 1,512,282, and connected to the letter spacing escapement, not herein shown, but fully disclosed and explained in the said patent. The spring 563 conventionally shown in Fig. 25, corresponds to the spring 35 of Foothorap Patent 1,203,519.

The form of decimal spacing bar shown is arranged for correctly spacing the printing of an amount of six denominations as "4 987 65", it being observed that automatic decimal spacing is provided between the thousands and the hundreds denominations and between the units of dollars and tens of cents denominations.

The tooth of the decimal spacing bell crank 560 conveniently lies in alinement with the row of tappet heads, but does not extend upwardly as far, to compensate for which the serrated edge of the decimal spacing trip bar 559 depends to a plane below the lower edges of the cam blades 541 which effect operation of the state control levers.

Automatic multiple spacing

At times, it is desired to print two columns of closely adjacent figures, as when printing numbers and amounts, for instance, which would appear as follows;

```
987 5    41
883 2    67
741 3    88
``` and to accumulate the totals of both columns.

To accomplish these results, it is necessary to position the respective column totalizers and their selectors in close juxtaposition.

In order to effect the automatic spacing or jumping of the key carriage and its column totalizer master wheel 205 from the units totalizer wheel of the first column totalizer to the wheel of highest denomination in the adjacent totalizer, to carry the master wheel across the thickness of the juxtaposed walls of the two totalizers, and the space between the totalizers, each decimal spacing bar 559 is provided with a toothed extension 567 (Figs. 30, 40-42) projecting laterally beyond the side wall 531 of its selector frame so as to lie in proximity to and co-act with a tooth formed on the end of the decimal spacing bar on the adjacent selector, whereby to maintain the letter space escapement mechanism displaced, and automatically effect a skipping of the key carriage in a single movement from the units wheel of one totalizer to the wheel of highest order in the adjacent totalizer.

It is not necessary that the neighboring ends of the decimal spacing trip bars be in actual contact, so long as the distance therebetween is less than the breadth of the tooth on the co-acting bell crank 560, to prevent restoration of the bell crank to normal intermediate the closely positioned selectors.

Silencing the automatic state determining means

To accommodate the invention to special uses, as when one or more items occur which require special treatment not provided for by the particular automatic conditioning of the machine at that time effective, means is provided which enables the operator, by manually operating a single finger piece, to temporarily discontinue or interrupt the effectiveness of the automatic state control mechanisms, for the purpose of thereafter manually conditioning the machine for the entry of such special items, after which a readjustment of the finger piece re-establishes the former pre-arranged system of automatic state control.

A handle or finger piece 570 (Figs. 22, 23, 27-29) is fast on the front end of an intermitting shaft 571 journaled in the hood 178 of the key carriage and extending from front to rear thereof. The rear end of the shaft projects through the rear wall of the hood and carries an arm 572, (Figs. 25, 26, 28, 29, 40-42), the upper edge of which lies at an angle to and is adapted to co-act with a stud 573 projecting from one end of a crank 574, the opposite end of which crank is pivoted at 575 to an ear 576 projecting from one end wall of the control box 476. The crank has a cam slot 577 formed therein to accommodate a pin 578 fast on a lug 579 depending from an extension of the shiftable cover plate 515 of the control box.

Normally, the inner end 580 of the cover plate 515 is withdrawn from proximity to the tappets 507 of the automatic state control levers 480-485, the restraining rod 516 of the cover lying against and guiding the series of tappets in their movements.

The finger piece 570 may be provided with an indicator 581 (Fig. 23) co-acting with the spaced indicia "D" (disconnect) and "C" (connect), on the hood of the machine.

The finger piece, when rocked to the "D" position, turns the intermitting shaft 571 to press the upper edge of the arm 572 against the stud 573 on the crank 574, stressing the return spring 583, and rocking the crank upwardly from the position shown in Fig. 28 to that shown in Fig. 29, during which the wall of the cam slot 577 crowds the pin 578 to the left (in said figures) to slide the cover plate 515 to the left. A socket 582 in the arm 572, by fitting around the stud 573, limits the throw of the handle 570 in one direction and latches it in its "disconnect" position.

The edge 580 of the cover plate, as the latter shifts to the left, contacts the opposed inclined edges of the state control tappets 507 and first forces the tappets bodily to the left to unseat the hooked portions of their slots 509 from their locking pins 508, and thereafter, by continued pressure against the inclined edges of the tappets, cams the latter downwardly from the position shown in Fig. 41 to that shown in full lines in Fig. 43, against the tensions of the individual tappet springs 513. The tappets 507, when thus depressed, lie below the lower edges of the cam blades 541, and do not contact the latter as the key carriage and its grouped state control levers 480-485 advance in letter spacing direction.

The springs 506 of the state control levers, being superior to the tappet restoring springs 513, maintain their levers in their normal raised positions, as the tappets are depressed by the edge 580 of the cover plate or silencing slide, so as to normally maintain an "adding" state in the totalizer actuating mechanism.

The tapered heads of the tappets may be notched as shown, for the purpose of catching upon the edge 580 of the silencing slide or member 515 to limit the extent of displacement. While the automatic state control is thus interrupted, the operator may variously set the manual controls to condition the machine according to the particular sporadic item or items requiring a different set-up from that provided by the general system.

To restore the add-subtract and neutralizer mechanisms to the automatic control of the selectors, it is sufficient merely to return the intermitting shaft 571 to the "connect" position, which unlatches the arm 572 from the stud 578, whereupon the spring 583 returns the parts to normal, drawing the sliding cover 515 to the right (in the figures) to free the tappets 507 to the action of their individual springs 513, which restore them to their effective positions.

The tappet depressing edge 580 of the sliding cover 515 is recessed as at 584 (Figs. 26, 28, 29 and 45) to avoid interference with the decimal letter spacing bell crank 560, when it silences the state-control tappets, it being desirable to maintain the automatic decimal spacing effective when the state controls are manually set, as well as when automatically set.

Suitable interlocking mechanism, not shown, but well known in the art, may be provided to prevent adjustment of the "connect" and "disconnect" handle 570, and the "hand" and "power" handle 400, while the key carriage is in a calculating zone.

*Manually setting state controls*

After the automatic state control mechanism has been silenced by the intermitting handle 570 and its connected mechanism, the operator may proceed to manually set the state controls to such different combination as is required by the special item to be entered.

As the great majority of operations involve addition, the separate add-subtract controls of the present invention are arranged to be yieldingly held in and automatically returned to their adding positions, the "neutralizer" controls being similarly held in and returned to their idle positions.

It will be remembered that spring 267 (Fig. 22) connected to a stud on the add-subtract control shaft 264 through which the direction of rotation of the column master wheel 205 is determined, normally holds the shaft 264 in and returns it to its "add" position.

Similar springs 258 (Fig. 3) connected to radial pins 259 fast on the respective right and left cross totalizer add-subtract shafts 268 operate in like manner on their shafts.

And the state control lever springs 506 supplement the above-named springs in yieldingly maintaining the several add-subtract controls normally in their "add" positions, and the neutralizer controls in their idle or "off" positions.

Therefore, ordinarily, whenever the state control levers 480-485 are not affected by the cam blades 541 of the self-contained selectors, the state controls return to their normal positions.

In view thereof, means is provided to facilitate shifting the several controls to, and maintaining them in the positions from which they would ordinarily be returned, as long as occasion may require.

The state controls may be manually adjusted by turning the respective add-subtract indicating pointers 266, 274, (Figs. 1, 22 and 23) fast on their respective shafts 264, 268, from the "A" to the "S" positions, and by turning the neutralizer indicating pointers 460, 464 connected with their shafts 451, 461, from their blank to their "N" positions, as heretofore suggested, but I have provided a more readily operable means for manually adjusting the state controls, and for maintaining them where adjusted against the influence of their return springs. To this end, the tails of the add-subtract indicators 266, 274 fast on their control shafts 264, 268, and the tails of the neutralizer indicators 460 and 464 through which the neutralizer shafts 451 and 461 may be controlled, are arranged at an incline across slots 590 (Figs. 23 and 48) formed in the front walls of the hood 178 and of the cross totalizer housings, respectively.

Each slot 590 in the hood 178 accommodates the broadened knurled end of a setting finger or member 591 projecting outwardly from a slide 592 shiftable behind the front wall of the hood, and held in place by a plate 593 fastened to the inner face of the front wall. Lateral pressure in one direction against a knurled finger 591 forces the edge of the latter against the inclined tail of its associated indicating pointer and rocks the pointer and its state control shaft to its opposite limit of movement against the tension of its restoring spring, whereby to shift the reverse gear pinion and differential segment for subtraction, or to displace the clutch shifter arm 218 to neutralize the totalizers, as the case may be. The state-control shafts, by reason of their connections with their respective automatic state control levers 480–485, will rock such levers downwardly, and thus tension the return springs 506. The excursions permitted each of the setting fingers 591 in their slots 590 is sufficient to enable the fingers to pass beneath the free ends of the tails of their indicating pointers, at which point the fingers are arrested, to hold the indicators and hence, their state control shafts, where adjusted, against the tensions of their respective return springs.

Shifting the setting fingers 591 along their slots in the opposite direction releases the indicating pointers and their state control shafts to the action of their return springs which restore the state control mechanisms to normal.

The setting mechanism for the respective state controls of the cross totalizers differ from that above explained for the column totalizers, only in that the setting fingers are in the form of levers 594 (Fig. 22) pivoted at 595 to overlying brackets 596.

Obviously, the setting fingers 591 and 594 must be returned to their idle positions prior to re-establishing the automatic state controls, to avoid interference with the predetermined automatic setting of the state controls by the selectors 531.

*Disabling automatic state control when converting the machine from calculating to typewriting*

Reference has heretofore been made to the "hand" and "power" crank 400 (Figs. 22, 23, 26–29) fast on its shaft 401, rotation of which in one direction or the other, shifts the key lever slide 404 (Fig. 12) to disconnect or connect the companion key levers, and establish or disestablish the control thereof over the power actuator 275.

In addition to the foregoing functions, the hand and power crank also determines the effectiveness and ineffectiveness of the automatic state controls.

To this end, a link 597 pivotally connected by its upper end at 598 to the slide-operating lever 574, is forked at its lower end, one prong of the fork being slotted, as at 599, to accommodate a headed and elongated pin 600 mounted on an arm 601 extending radially from the hand and power shaft 401. The upper end wall of the slot 599 normally lies adjacent the headed pin 600, because of the action of spring 583 on the cam-slotted lever 574.

Figure 26:
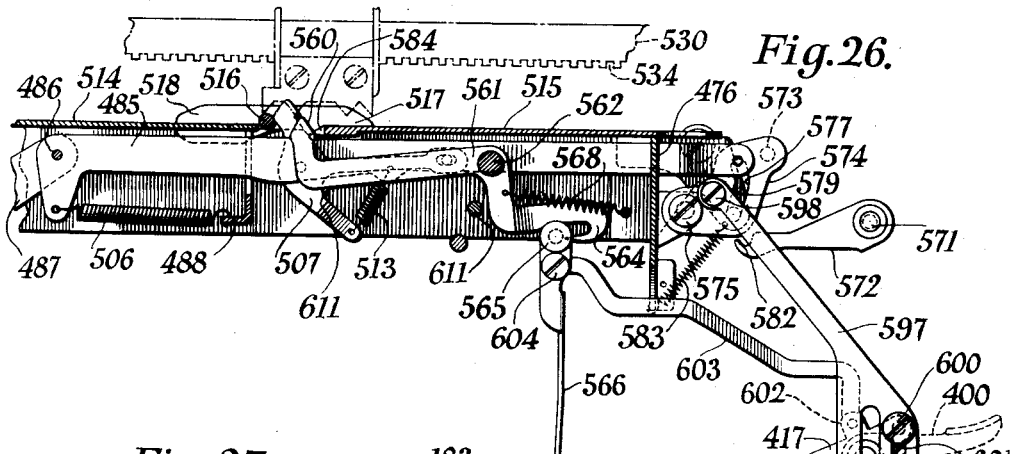
Figure 26 is a detail rear view, illustrating the relation to a selector unit, of one of the state control members and the skip letter spacing member, when disabled by the manually operable means for conditioning the machine for hand or power operation, parts being omitted for clearness.

Assume the parts to be in position establishing the automatic state controls, and that it is desired to set the machine for hand operation, that is, for performing typewriting only. The hand crank 400, when rocked clockwise (Fig. 23) or counter-clockwise when viewed from the rear, as in Figs. 25, 26 and 29, will turn the shaft 400 and its arm 601 to press the pin 600 against the upper end wall of the slot 599 and raise the link 597, thereby swinging the cam-slotted lever 574 upwardly, as shown in Fig. 26. As the lever 574 rocks upwardly, its cam slot 577 operates upon the pin 578 of the sliding cover 515 to shift the latter to the left (Figs. 40–42) so that its free edge 580 cams downwardly the tappets 507 of the automatic state control levers 480–485, just as when the "connect" and "disconnect" hand crank 570 is operated. The tappets then lie below the plane of the cam blades 541 and hence beyond the control thereof.

However, in converting the machine from a combined calculating and writing machine to a purely writing machine, it is desirable, also, to silence the automatic decimal spacing mechanism to prevent the occurrence of unnecessary letter spacings between the letters of a word, for instance.

Therefore, intermediate the arms 417, 601 of the multiple-armed member on the hand and power shaft 401 is an ear 602 to which is pivotally connected the lower end of an irregularly shaped, laterally extending link 603, the upper end of which is pivotally connected at 604 to the head of the depending letter space trip rod 566.

It will be recalled that the tail of the double bell crank 561 grouped with the nest of automatic state control levers 480–485, is hooked, as at 564, to take over the headed stud 565 on the upper end of the letter space trip rod 566.

Upon rocking the shaft 401 counter-clockwise (viewed from the rear) from the "power" position shown in Fig. 25 to the "hand" position shown in Fig. 26, the ear 602 thrusts the link 603 to the left (in the figures) flexing the trip link 566 and forcing its headed stud 565 out of the flaring mouth of the hook 564 of the decimal space controlling bell crank 561, to enable a spring 568 to rock such bell crank and lower the toothed end 560 thereof out of the plane of travel of the serrated edge of the decimal spacing trip bar 559, as shown in Fig. 26.

The hand and power crank 400, when returned clockwise, (as viewed from the rear), to the position shown in Fig. 25, shifts the key control slide 404 from the position shown in Fig. 10 to that shown in Fig. 16, wherein the complementary key levers are disconnected, to condition the keys for power operation.

It also withdraws the cam 417 (Fig. 16) relatively to the beveled end 418 of the arm 419 on shaft 420, thereby relieving the bails 421, 423 to enable the springs 372 (Figs. 7–9) to reposition the coupler links 362 effectively relatively to the coupler engaging members 366.

Furthermore, the shaft 401 lowers the arm 601 with its elongated stud 600, the link 597 following the stud, under the influence of the spring 583 on the cam-slotted lever 574, the operation of which shifts the silencing slide cover 515 to the right, viewing Fig. 26, to release the tappets 507 for return by their individual springs 513 to their effective positions.

The ear 602 also returns with the arm 601 to the position shown in Fig. 25, drawing with it the link 603 and the upper end of the letter escapement trip rod 566, the stud 565 of which rides along the restricted throat of the hook 564 and rocks the bell crank 561 upwardly to restore the toothed end 560 thereof to effective position, against the tension of spring 568. Stops 611 limit the rocking movement of the decimal spacing bell crank, in either direction.

Carriage return key control of the automatic state determining means

Reference has heretofore been made to the carriage return key 70 (Fig. 27) and its control of the carriage return clutch mechanism 110, 111 (Fig. 4) whereby to return the key carriage under power to the left hand margin of the work sheet.

The motor returns the key carriage quickly to the beginning of a line, and to prevent the noise which would be occasioned by contact of the pointed ends of the tappets 507 against the cam blades 541, during such key carriage return, means, operable by the carriage return key, is provided to silence the tappets.

As heretofore explained, the carriage return key, when depressed, rocks the bell crank 122 (Figs. 26 and 27) on the shaft 123 from which the trip finger 124 depends, to operate the universal bail 125 controlling the carriage return clutch mechanism. A push bar 606 connected at its lower end, at 607, to another arm of the bell crank lever 122 extends upwardly, and terminates at its upper end in a lip 608 located beneath and in line with the lower slotted end of the silencing link 597 for the state-control tappets. A stud 609 on the frame of the key carriage projects through a slot 610 intermediate the ends of the push bar 606, to guide the latter in its vertical movement.

The push bar 606, when shifted upwardly upon depression of the carriage return key 70, contacts its upper end with the lower end of the silencing link 597 to force the latter and its cam-slotted lever 574 upwardly and shift the silencing slide 515 to the position shown in Figs. 26 and 42, to lower the tappets 507 to their idle positions.

The carriage return key 70, when released, restores to normal with its connected parts, drawing the push bar 606 downwardly and enabling the spring 583 of the cam-slotted lever 574 to restore the silencing slide 515 and the link 597 to their normal idle positions, thereby releasing the tappets for restoration to their effective positions.

Case shift key control of the state determining means

Occasion may arise when the operator will desire to write a word or words in one or more columns or calculating zones for some special purpose.

Use of the usual letter keys while the key carriage is in a calculating zone would not prevent the occurrence of the automatic decimal spacing which would impair the appearance of the work and reduce the number of letters which could be printed in a column.

Furthermore, it may well be that the wording to be entered in a calculating zone is of such significance as to merit special notice and hence should be printed in capital letters in a contrasting color to that in which the general run of items is printed.

Also such special entry may include the printing of numerals which are not to be accumulated, or form part of the particular calculation for which the state controls may be set at that time.

Means under the control of the usual Elliott-Fisher case shift key 71, (Fig. 27), disclosed, for example, in Foothorap, United States Patents 1,119,149, December 1, 1914, and 1,459,200, June 19, 1923, has been devised to provide for the several contingencies above noted.

In the present invention, a camming stud 615 projecting from one side of the case shift key 71, lies adjacent the angular end of an upwardly projecting arm 616 fast on a stub shaft 617 suitably supported in the key carriage frame. A second arm 618 fast on the stub shaft, extends rearwardly and has pivoted thereto a link 619, connected at its upper end to a rearwardly extending operating arm 620 pivoted at 621 in the key carriage frame. The operating arm 620 (Fig. 28) extends beneath and in operative relation with one of the prongs at the lower forked end of the silencing link 597, the free end of the operating arm being first laterally and then upwardly bent to form a finger 622 lying beneath the outer end of the elongated stud 600 carried by the arm 601 fast on the hand and power shaft 401.

The shift key 71, when depressed, operates in the manner disclosed in the Foothorap patents heretofore mentioned, to rock downwardly a shaft 623 (Fig. 2) carrying the trip ring arm 624 to position a trip ring 625, into the paths of the horns 626 on the adjustable type carriers 627 pivoted on the respective type bars 340.

The shift key also operates the ribbon shift mechanism, not herein shown, but fully disclosed in the Elliott-Fisher machine, and in United States patent to Foothorap, 1,286,573, issued December 3, 1918, to position a field of contrasting color over the printing line.

Figure 27:
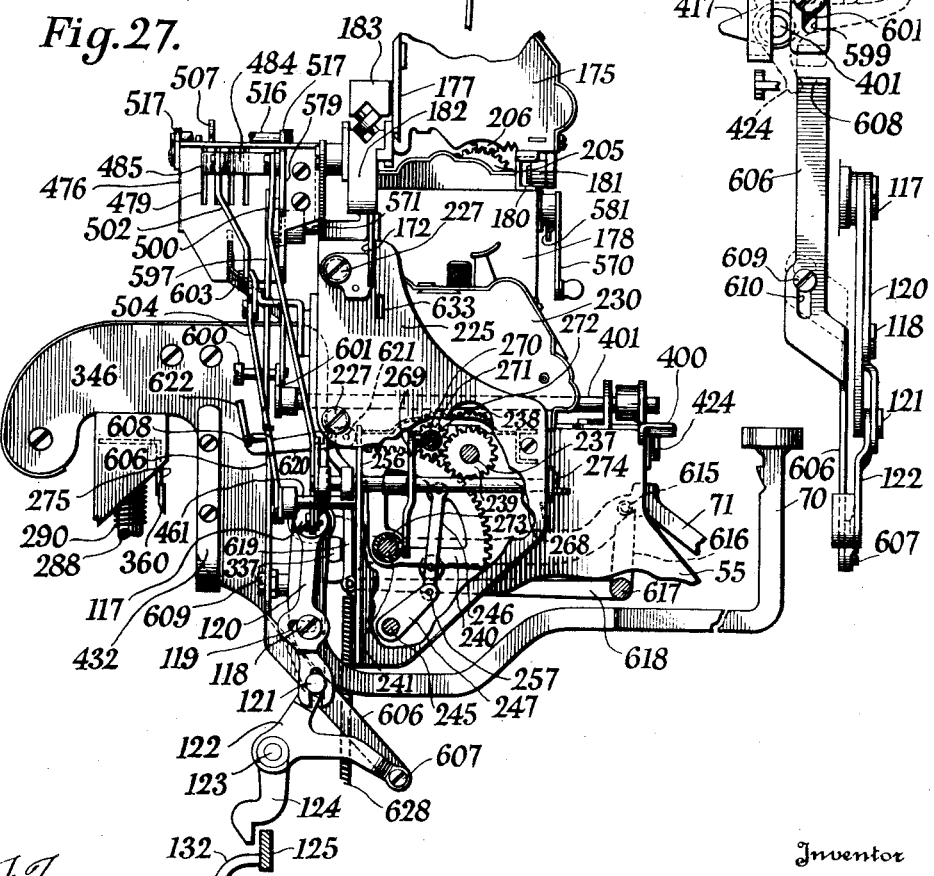
Figure 27 is a fragmentary left-hand side view, showing a special disabling means for the automatic state control mechanisms, such special disabling means being set by depression of the usual Elliott-Fisher carriage return key, and the Elliott-Fisher case and ribbon shift key, respectively.

Furthermore, the shift key 71, when depressed, causes its stud 615 to wipe along the inclined edge of the arm 616 to rock the latter and the arm 618 clockwise (Fig. 27). The arm 618, through the thrust link 619, rocks the short operating arm 620 upwardly, pressing it against the silencing link 597 to shift the silencing slide 515 to effective position to displace the state control tappets 507. The finger 622 on the operating arm contacts the elongated stud 600 on the radial arm 601 of the hand and power shaft 401, to rock the latter and the shaft, together with the ear 602. It will be remembered that a link 603 connects the ear 602 with the letter space escapement trip rod 566, which trip mechanism will be disabled, as heretofore explained, so that no letter spaces will be automatically left where not desired.

Incidentally, the shaft 401, when rocked, will shift the key control slide 404 to connect the complementary members 335, 336 constituting the composite keys, and disable the coupler-setting devices 366, thereby enabling designating numbers to be printed by pressure of the operator's finger on the numeral key levers, and rendering the power drive ineffective.

A spring 628 (Fig. 27) restores the case shift key to normal, after which, the operator may return the shaft 401 and its connected mechanisms to normal, by the handle 400, and thus restore the machine to the condition existing previously to the depression of the case shift key 71.

Manually disabling cross totalizers

Some lines of work may not require the use of either or both of the cross totalizers, but when compiling such work, if the cross totalizers are allowed to remain in their normal positions, they will be idly picked up each time the key carriage arrives in a computing zone, and released when the key carriage leaves such zone, to return under the influence of their springs 234 to their normal positions, preparatory to the arrival of the key carriage in the succeeding computing zone.

The idle operation of the cross totalizers is accompanied by some noise, which, together with the movement of the totalizers, tends to distract the operator.

Of course, it is desired that the cross totalizers be stationary at all times relatively to the key carriage when the machine is used for writing only.

Heretofore, it has been customary to provide latching mechanisms adapted to secure the cross totalizers to their auxiliary frames, and rendered effective simply by shifting the cross-totalizers from their normal positions to their opposite limits of travel, which could be readily accomplished by a flick of the finger sufficient to overcome the tension of the return spring 234.

Objections to this arrangement are that the cross-totalizers may be accidentally impelled to their latched positions, and further, that, because of the ease with which they could be latched in their inoperative positions, the operator often forgot that he had intentionally latched the cross totalizers against operation.

To avoid these disadvantages, the cross totalizer trucks 228, (Figs. 3 and 23), each carry a latch 631 pivoted thereto at 632 and projecting towards the left (Fig. 23), the pivots lying in line with the projecting hooked ends of the latches. Apertures 633 (Figs. 6 and 27) are formed in the left hand side plates 225 and 226, (Figs. 23 and 6) of the respective cross totalizer supporting frames, the apertures lying above and out of line with their respective latches 631, so that should an impulse be imparted to either of the cross totalizers, accidentally or intentionally, to shift the totalizers to their extreme left hand positions against the tensions of their return springs 234, the hooked ends of the latches 631 will strike the imperforate walls of their left hand side plates below the apertures 633, to arrest the cross totalizers, whereupon the springs will immediately restore the cross totalizers to their normal right hand positions.

In the present invention, should the operator desire to lock a cross totalizer out of operation, he will manipulate the finger piece 634 projecting upwardly from each latch to rock the latter upwardly, and, while holding the latch in raised position, will manually shift the cross totalizer to its left hand extreme of travel, which will result in the insertion of the hooked end of the latch 631 within its locking aperture 633, whereupon the operator releases the latch to the action of its spring 635 (Fig. 49) which draws the hooked end of the latch into engagement with the lower wall of its aperture 633 to hold the cross totalizer idle.

In this position, the units wheel of the cross totalizer, of course, lies clear of the master wheel 238.

The operator is thus forced to make a conscious effort in latching the cross totalizers in their idle positions, which is designed to impress upon his mind the fact that he has rendered the cross totalizers ineffective.

The pick-up beams 231 of course, are moved to the left with their respective cross totalizers, the cams 558 (Figs. 43 and 44) riding under their disengaging abutments 557 to swing the check members 551 below the level of the fins 552 on the self-contained selectors.

Manual release of the latches 631 to disengage their hooked ends from the walls of the supporting frames, enables the springs 234 to return the cross totalizers and pick-up beams to their normal positions.

Cross totalizer control of clear sign printing

To print the totals disclosed on the cross totalizer dials of a writing and calculating machine of the round or flat platen type, it is generally necessary for the operator to set the accumulator driving means for subtraction and strike the numeral keys corresponding with the digits shown on the cross totalizer bearing the desired total, the remaining totalizers being conveniently locked out of operation or set to neutral, as preferred.

And to advise the operator as to whether or not he has depressed numeral keys of the proper values and in the proper order, means has heretofore been provided under control of the cross totalizer to permit or prevent the depression of a "clear signal" key, depending upon the clear or non-clear condition of the active cross totalizer. Such a mechanism is shown, for instance, in United States patent to Hart, 1,737,586, issued December 3, 1929, wherein a single cross totalizer controls the operativeness of a single clear signal printing key.

The present invention constitutes an improvement on the former devices by providing a single clear sign printing key common to and controlled by a plurality of cross totalizers.

Such a clear sign printing key 640, (Figs. 6 and 49-52), is shown at the right hand side of the keyboard, such as illustrated in United States patent to Foothorap, 1,505,384, issued August 19, 1924, and is connected by a suitable linkage (not shown) with a type bar (also not shown) equipped to print a distinguishing sign, as a star, for example, all as fully disclosed in the Foothorap patent.

In the present invention, the clear signal printing key 640 carries an upwardly projecting branch 641 passing through a guide slot 642 in the usual cover plate of the Elliott-Fisher machine, the branch being apertured as at 643, which aperture, when the key is in its normal undepressed position, may conveniently lie at the intersection of the branch 641 with the cover plate.

A dog 644 (Fig. 49) which may be pivoted at 645 to the cover plate or other suitable support, extends forwardly over the cover plate, with its lateral tooth positioned opposite and in line with the locking aperture 643 of the clear signal key branch 641. A rod 646 extending transversely across the key carriage, connects an ear 647 on the dog with one end of a crank shaft 648 suitably journaled in the hood 178 of the key carriage. An arm 649, one end of which is fast on the crank shaft 648, carries a skeleton cam 650 adjustably mounted thereon and adapted to coact with the upwardly extending arm of a bell crank 651 pivoted at 652 to the side of the cross totalizer 230. The remaining arm of the bell crank 651 is articulated with the rear end of an elongated arm 653 pivoted to the side of the cross totalizer at 654 and forming, with the bell crank arm to which it is articulated, a toggle connection.

The forward end of the elongated arm 653 supports one end of a cross bar 655 extending across the denominational wheels of the cross totalizer, the opposite end of the cross bar being supported by a short arm (not shown) pivoted to the right hand side of the cross totalizer.

A toothed gear wheel 656 is associated to turn with each denominational wheel, such gear wheels being meshed with the so-called "carrying" wheels of this type of totalizer shown in the before-mentioned Wahl and Kurowski patents, each gear wheel 656 having an abbreviated tooth which, when the denominational wheels disclose zeroes at the sight aperture 657, is located opposite its appropriate rigid feeler 658 of a denominational series of like feelers projecting inwardly from the cross bar 655 in the same vertical planes with the gear wheels 656.

A very light spring 659 connected with the bell crank 651 assists the force of gravity to flex the toggle connection in such direction as to normally swing the cross bar 655 with its feelers 658 towards the gear wheels 656 without imposing any appreciable resistance to the rotation of such gear wheels, the spring also tending to rock forwardly the upwardly extending arm of the bell crank 651. If any of the feelers contact an unmutilated tooth of its gear 656, the rocking movement of the cross bar 655 and its toggle connection is blocked, indicating the presence of an amount on the cross totalizer, and the upper end of the bell crank 651 remains offset from the lower edge of the skeleton cam 650, thereby enabling a spring 660 on the crank shaft 648 to maintain the cam-supporting arm 649 lowered, and through the rod 646, to press the dog 644 into effective position with its tooth entered in the aperture 643 of the branch 641 of the clear signal printing key, thus locking the key against depression, to indicate that the cross totalizer is not clear.

As soon, however, as the numeral wheels of the cross totalizer are all restored to zero by the successive depression of the corresponding numeral keys in the proper order while the machine is conditioned for subtraction, for example, the abbreviated teeth of the gears 656 are brought into registry with the feelers 658, whereupon gravity assisted by the spring 659, rocks the cross-bar 655 counter-clockwise (Fig. 49), the feelers entering the spaces formed by mutilating the teeth of the gear 656, which rocking movement permits the bell crank 651 to swing forwardly to position its upwardly extending arm in the same plane with the lower edge of the skeleton cam 650.

The cam is so adjusted on the arm 649 that by the time the master wheel 238, traveling with the key carriage, has come into mesh with the units wheel of the cross totalizer, the cam, which also travels with the key carriage, is within one step of escaping past to the right of the free end of the upwardly extending arm of the bell crank 651 on the cross totalizer, and the pick-up means is within one step of being unlatched from a selector 531.

Coincident with the letter spacing operation following the printing of the units digit of the total, and the clearing of the totalizer, the pick-up link 231 is automatically released from the selector 531, freeing the cross totalizer to the action of its return spring 234 which draws the cross totalizer and its truck to the right, and causes the upwardly extending arm of bell crank 651, now in its forward position, to wipe along the lower edge of the skeleton cam 650, raising the latter and its supporting arm 649, against the tension of spring 660, and rocking the crank shaft 648 clockwise (Fig. 49) to disengage the dog 644 from the branch 641 of the clear signal printing key, and hold it disengaged, to permit depression of the clear signal key.

The entry of the first digit of a succeeding item, into the cross totalizer, rotates its gear wheel 656 associated with the numeral wheel on which such digit is entered, and the unmutilated teeth of such gear wheel crowd the corresponding feeler 658 outwardly with the cross bar 655, to rock the bell crank 651 rearwardly to the position shown in Fig. 49 wherein its upwardly extending arm is offset relatively to the skeleton cam 650, allowing the cam to rock downwardly and enabling the spring 660, through the train of connections set forth, to restore the dog 644 to locking position.

A dog 661, similar to the dog 644, is likewise pivoted to the cover plate, and extends forwardly along the opposite side of the clear signal key branch 641. A spring 662 tends to rock the tooth of the dog 661 into the aperture 643 of the branch. One arm of an elbow lever 663 (Fig. 6) pivoted at 664 to the supporting rail 182, depends into proximity to an ear 665 on the dog 661, the remaining arm of the elbow lever 663 extending substantially horizontally to the right across the right hand cross totalizer frame above the cross totalizer and carries a skeleton cam 666 adjustably mounted thereon with which co-acts a cross totalizer controlled mechanism, (not shown) identical with that just previously described in connection with the left hand cross totalizer shown in Fig. 49, and operating in the same manner with relation to the cam 666 and elbow lever 663 to withdraw the dog 661 from engagement with the branch 641 of the clear signal printing key.

Obviously, the latching dogs 644 and 661 appropriate to the respective cross totalizers should not be simultaneously effective, at a time when it is desired to print the totals and clear either or both cross totalizers, it being immaterial at other times.

Therefore, there is provided means to silence the latching dog 644 or 661 appropriate to the cross totalizer whose total is not to be cleared, such means including a manually settable disabling lever 667 pivoted at 668 to the under surface of the cover plate, the rear end of such disabling lever being bent upwardly to pass through an arcuate slot 669 in the cover plate and between the free forward ends of the dogs 644 and 661. The forward end of the disabling lever 667 is similarly bent upwardly to project through an arcuate limiting slot 670 and terminates in a finger piece, indicia as "L" and "R" being located on the cover plate adjacent opposite ends of the limiting slot 670 to inform the operator of the particular adjusted position occupied by the disabling lever.

A friction spring, as 671 (Fig. 52), may be used to retain the lever in any of its adjusted positions.

The disabling lever, when rocked to either end of its travel, operates to disengage one or the other of the dogs 644, 661 from the branch 641 of the clear signal printing key and hold such dog disengaged.

After clearing the appropriate cross totalizer, the disabling lever may be swung to the opposite limit of its travel to release for operation the dog appurtenant to the cross totalizer which still registers a total, and to silence the dog related to the cleared cross totalizer.

It will be readily apparent from the foregoing that this invention is most flexible and well adapted to perform the various functions of typewriting and calculating.

Changes may be made in the form and arrangement of the several parts set forth without departing from the spirit and scope of the invention.

What is claimed as new is:—

1. In a power driven writing-calculating mechanism, the combination with a totalizer; a series of devices to differentially actuate the totalizer; a series of type bars; actuators individual to the differential devices to actuate the latter; a driving element common to the actuators; and normally idle couplers to connect selected actuators with the driving element for operation; of selectively operable manipulative means, each such means including a manually operable lever, and a type bar lever connected with its type bar; coupler-adjusting means shiftable relatively to the actuators and the manipulative means by the manually operable levers; the type bar lever being driven by the actuator to actuate the type bar; and means adjustable to connect and to disconnect the manually operable lever and the type bar lever, and to render effective and ineffective the connection between the manually operable lever and the coupler-adjusting means.

2. In a power driven calculating machine, the combination with a totalizer; devices to differentially actuate the totalizer; actuators individual to the differential devices; a driving element for the actuators; normally idle couplers shiftably mounted on their respective actuators, to connect the actuators and the driving element; and a set of selectively operable manipulative members associated with their respective actuators; of a set of coupler-adjusting members; displaceable means to connect the selectively operable manipulative members and the coupler-adjusting members, to enable the manipulative members to operate the coupler-adjusting members to shift the couplers to positions to be engaged by the driving element; and means operable by the actuators to positively shift the displaceable means to render the same ineffective relatively to one of the sets of members.

3. In a power-driven calculating machine, the combination with a totalizer, and devices to differentially actuate the totalizer; of individual actuators connected with the respective differential devices; a driving element for the individual actuators; couplers to connect the actuators and the driving element for operation; selectively operable manipulative means; and coupler-adjusting means individual to, and controlled by, the respective manipulative means to shift the couplers to position to be engaged by the driving element; and co-acting latching devices on the couplers and their corresponding coupler-adjusting means to enable the active coupler-adjusting means to retain its coupler in effective position relatively to the driving element until the engagement of the coupler and the driving element.

4. In a power driven calculating machine, the combination with a totalizer; devices to differentially actuate the totalizer; actuators to operate the respective differential devices; and a driving element for the actuators; of couplers shiftably supported on their actuators to connect the actuators and the driving element for operation thereby; selectively operable manipulative means, each such means including a manually operable lever, and a printer lever; a releasable connection between the manually operable lever and the printer lever of each manipulative means; a type bar connected with the printer lever of each manipulative means; the actuators adapted to operate the printer levers; coupler-adjusting means individual to the respective manipulative means; and means operable by the manually operable lever of each manipulative means to shift the corresponding coupler relatively to its actuator to position to be engaged by the driving element.

5. In a power-driven calculating machine, the combination with a totalizer, and devices to differentially actuate the totalizer; of actuators to operate the respective differential devices; a driving element for the actuators; hangers pivotally connected to the respective actuators; coupling pawls pivoted to the respective hangers, the coupling pawls adapted to connect the actuators and the driving element; selectively operable manipulative means; a stationary support; and coupler-adjusting means mounted on the stationary support for movement relatively to the coupling pawls, and operable by the manipulative means to shift the corresponding coupling pawls into position to be engaged by the driving element.

6. In a power driven calculating machine, the combination with a totalizer; devices to differentially actuate the totalizer; actuators to operate the respective differential devices; and a driving element for the actuators; of couplers shiftably mounted on their respective actuators, to connect the actuators and the driving element; selectively operable manipulative means; coupler-adjusting thrust members, the thrust members, the actuators and the driving element being separately mounted in the frame of the machine; a stationary support for the coupler-adjusting thrust members; and means operable by the manipulative means to shift the corresponding coupler-adjusting thrust members to cause them to shift the appropriate couplers into position for engagement by the driving element.

7. In a power-driven calculating machine, the combination with a totalizer; and devices to differentially actuate the totalizer; of actuators to operate the respective differential devices; a driving element for the actuators; shiftable couplers to connect the actuators and the driving element; selectively operable, manipulative means; pivotally mounted thrust members having cam slots therein, and associated with the respective couplers; and studs operable by the manipulative means and adapted to traverse the cam slots, and to cause the thrust members to shift the couplers into position to be engaged by the driving element.

8. In a power-driven calculating machine, the combination with a totalizer; and devices to differentially actuate the totalizer; of actuators to operate the respective differential devices; a driving element for the actuators; shiftable couplers to connect the actuators and the driving element; selectively operable, manipulative means; coupler-adjusting means individual to the respective manipulative means, and operable thereby to shift the couplers to position to be engaged by the driving element; and inter-acting latching means between the coupler-adjusting means and the couplers, to retain the coupler-adjusting means and the associated coupler in the positions to which they are shifted by operation of the manipulative means until the driving element engages the set coupler.

9. In a power-driven calculating machine, the combination with a totalizer; devices to differentially actuate the totalizer; individual actuators therefor; and a driving element for the individual actuators; of couplers shiftably mounted on the actuators, to connect the same and the driving element; selectively operable manipulative devices; coupler-adjusting members; releasable connections betwen the manipulative devices and the coupler-adjusting members, and operable by the manipulative devices to shift the couplers relatively to their actuators, to position for operation by the driving element; the manipulative devices, each including a set of companion elements, one element of each set being operable by its corresponding actuator, and by another element of its set; means to releasably connect the companion elements of each set; means to connect and to disconnect the releasable connections between the manipulative devices and the coupler-adjusting members; and a control common to both the releasable connecting means for the companion elements, and the last-named means.

10. In a typewriting-calculating machine, the combination with a flat platen; a line spacing frame shiftable forwardly and rearwardly thereover in line spacing direction; a carriage on the line-spacing frame, and shiftable in letter spacing direction and return; a totalizer; totalizer-actuating mechanism; printing mechanism; and keys mounted on the carriage to differentially control the actuating mechanism and to render the printing mechanism operative; of a motor; means operable by the motor to shift the line spacing frame and carriage forwardly and rearwardly in line spacing direction; means operable by the motor to actuate the printing mechanism and the differential totalizer-actuating mechanism; and means controlled by the operator to render either of the two last-named means effective and the other ineffective.

11. In a writing-calculating machine, the combination with a totalizer; and a totalizer-actuating mechanism movable bodily relatively to the totalizer; of a power actuator relatively to which the totalizer-actuating mechanism moves, and adapted to operate the totalizer-actuating mechanism in any position of the latter; supports for the power actuator; automatic safety guards to prevent access to the power actuator; and means traveling with the totalizer-actuating mechanism to displace the guards in certain positions of the totalizer-actuating mechanism relatively to the power actuator, and to release the guards for return to effective position upon the farther travel of the totalizer-actuating mechanism.

12. A motor drive for writing calculating machines, including an actuator; a power-actuator to drive the actuator; a motor to actuate the power actuator; a drive train between the motor and the power-actuator, including a counter-shaft; a friction clutch mounted on the shaft and driven from the motor; a drive gear journaled on, and axially shiftable along, the counter-shaft; a friction spring interposed between the friction clutch and the axially movable gear; a second drive gear journaled on, and shiftable along, the counter-shaft in spaced relation to the first-named gear; a spacing sleeve interposed between and abutting the respective drive gears, at its opposite ends, and slidable along the counter-shaft; and adjustable means on the projecting end of the counter-shaft to limit axial movement of both drive gears in one direction, and to control the tension of the friction spring.

13. In a writing-calculating machine, the combination with a platen; a line spacing frame suitably mounted to shift over the platen in line spacing direction and return; a totalizer; and totalizer-actuating mechanism; of a power actuator; selective manipulative means to control the connection between the power-actuator and the totalizer-actuating mechanism, and to control the extent of differential movement transmitted to the totalizer; a motor; clutch-controlled connections between the motor and the power actuator, and between the motor and the line spacing frame; a single motor circuit connection, including a pair of movable contacts; and separate means operable upon the clutch connections to shift the latter in opposite directions, and to shift their respective movable contacts, one into engagement with the other.

14. In a writing-calculating machine, the combination with a totalizer; a platen; and a carriage shiftable relatively thereto in letter spacing direction, and return; of mechanism to differentially actuate the totalizer, and printing mechanism mounted on the carriage to travel therewith; manipulative devices also mounted on the carriage, including manually operable key elements and printing lever elements; a key element and a lever element constituting each device, to control the amounts to be registered and printed; and a power actuator relatively to which the carriage travels; the power actuator adapted to operate the printing levers and the differential mechanism in any letter space position of the carriage.

15. In a writing-computing machine, the combination with a totalizer; devices to differentially actuate the totalizer; printing devices, actuators to operate the differential devices; and a driving element; of coupling devices shiftably mounted on the actuators for movement into and out of the path of the driving element; a single set of manipulative devices, including key elements and printer levers, a key element and a printer lever included in each manipulative device; coupler-adjusting members operable by the key elements to shift the couplers into the path of the driving element; means to prevent the control of the key elements over the coupler-adjusting members; means to connect each key element with its associated printer lever; and means operable upon the last-named means to disable the same, and to operate the means which prevents the control of the key elements over the coupler-adjusting members.

16. In a writing-computing machine, the combination with type carriers; a totalizer; state controls therefor; an operating device for the state controls; devices to differentially actuate the totalizer; actuators to operate the differential devices; and a driving element; of couplers shiftably mounted on the actuators to enter and withdraw from the path of the driving element; manipulative devices, each including a key lever, and a printer lever; the printer levers being connected with their respective type carriers and operable by the actuators; coupler-adjusting members operable by the key levers to shift the couplers into the path of the driving element; means to disable the control of the key levers over the coupler-adjusting means; means to releasably connect each key lever with its corresponding printer lever; means to disable the connecting means; means to disable the control of the operating device upon the state controls; and an adjustable means common to the several disabling means to render them effective or ineffective.

17. In a writing-computing machine, the combination with a traveling carriage; letter space escapement mechanism therefor; a trip member connected with the letter space escapement; an operating device for the trip member; type carriers; a totalizer; state controls therefor, settable by the operating device; devices to differentially actuate the totalizer; actuators to operate the differential devices; and a driving element; of couplers shiftably mounted on the actuators to engage with and disengage from the driving element; manipulative devices; each including a key lever, and a printer lever, the printer levers being connected with their respective type carriers and operable by the actuators; coupler-adjusting members operable by the key levers, to shift the couplers into engagement with the driving element; means to disable the control of the key levers over the coupler-adjusting members; means to releasably connect each key lever with its associated printer lever; means to disable such connecting means; and means to disable the control of the operating device over the state controls and the letter space escapement trip member.

18. In a writing-computing machine, the combination with a traveling carriage; letter spacing escapement mechanism therefor; a trip member connected with the escapement; operating devices for the trip member; type carriers; a plurality of totalizers; separate state control mechanisms therefor; devices to differentially actuate the totalizers; actuators to operate the differential devices; and a driving element; of couplers shiftable to connect and disconnect the actuators and the driving element; manipulative devices, each including a key lever, and a printer lever; the printer levers being connected with their respective type carriers, and operable by the actuators; coupler-adjusting members operable by the key levers, to shift the couplers into connecting position relatively to the driving element; means to disable the control of the key levers over the coupler-adjusting members; means to releasably connect each key with its appropriate printer lever; means to disable such connecting means; tappets connected with the individual state control mechanisms, and centered at a common letter space interval, for control by the operating devices; means to disable the control of the operating device over the state controls, and the letter space escapement trip member; and means common to the several disabling means, for operating the same.

19. In a writing-computing machine, the combination with type-carriers; a totalizer; state control mechanisms therefor; devices to differentially actuate the totalizer; actuators to operate the differential devices; a driving element; shiftable couplers between the actuators and the driving element; manipulative devices, each including a key lever, and a printer lever; the printer levers being connected with their respective type carriers, and operable by the actuators; and coupler-adjusting members operable by the key levers, to shift the couplers to position for operation by the driving element; of settable means to disable the control of the key levers over the coupler-adjusting members to condition the machine for manual operation; means to releasably connect each key lever and its appropriate printer lever to enable manual operation of the printer levers; settable means to disable such connecting means; tappets connected with their individual state control mechanisms, the tappets being arranged in a group; a traveling operating device adapted to contact the tappets to set the state control mechanisms; a positioning member operable upon the tappets to shift them to effective and ineffective positions relatively to the traveling member; and a control common to the said settable disabling means, and to the positioning member.

20. In a writing-calculating machine, having a platen; a line spacing frame mounted to shift over the platen in line spacing direction and return; a printer carriage mounted on the line spacing frame and shiftable relatively thereto in letter spacing direction and return; printing elements mounted on the carriage to travel therewith; a totalizer; and totalizer-actuating mechanism; the combination of mechanism to differentially actuate the totalizer; a power actuator relatively to which the carriage travels; connections between the power actuator and the printing and totalizer-actuating mechanisms, respectively; manipulative devices mounted on the carriage to select the printing elements for operation, and to control the connection between the power actuator and the totalizer-actuating mechanism, and to determine the extent of differential movement to be transmitted to the totalizer; a motor; connections between the motor and the power actuator; means operable by the motor to drive the frame and carriage forwardly and rearwardly in line spacing direction and return; and means to control the last-named drive means, and the motor-driven means which operates the printing and totalizer-actuating mechanisms to render one means operative and the other inoperative.

21. In a power-driven, writing calculating machine, having a platen, and a totalizer; and a carriage traveling relatively thereto in letter spacing direction and return; the combination of printing and totalizer-actuating mechanisms, including selective means therefor, mounted in the carriage; and a power-actuator relatively to which the carriage travels in letter spacing direction, and operable to drive the printing and totalizer-actuating mechanisms in any position assumed by the carriage in use; the selective means operable to control the connection of the totalizer-actuating means and the power actuator, and the extent of differential movement to be transmitted thereby to the totalizer.

22. In a power-driven, writing-calculating machine, having a platen; and a line spacing frame mounted to shift over the platen in line spacing direction and return; a totalizer; and a carriage arranged to travel on the line spacing frame in letter spacing direction and return, relatively to the totalizer; the combination of printing and totalizer-actuating mechanisms, including selective devices therefor, mounted in the carriage; and a power-actuator relatively to which the carriage travels in letter spacing direction, the power actuator operable to drive the printing and totalizer-actuating mechanisms in any position assumed by the carriage and line spacing frame in use; and means operable by the selective means to effect the connection of the totalizer-actuating means and the power actuator, and determine the extent of differential movement to be transmitted thereby to the totalizer.

23. In a writing-computing machine, having a totalizer; devices to differentially actuate the totalizer; printing devices; actuators to operate the differential devices; and a driving element; the combination of coupling devices shiftably mounted on the actuators for adjustment into and out of the path of the driving element; a set of manipulative devices corresponding in number with the actuators, and including key elements and printer levers, a key element and a printer lever included in each manipulative device; coupler-adjusting members operable by their respective key elements to shift the couplers into the path of the driving element; and means operable by the associated actuator to disable the control by the operated key element of its coupler, whereby to enable the return of the latter to normal position notwithstanding continued depression of the operated key element.

ALFRED G. F. KUROWSKI.